(12) United States Patent
Shimada et al.

(10) Patent No.: US 6,791,984 B2
(45) Date of Patent: Sep. 14, 2004

(54) DYNAMIC BAND-ALLOCATING SUBSCRIBER-LINE-TERMINATING APPARATUS

(75) Inventors: Nagao Shimada, Kawasaki (JP); Tomohiro Shinomiya, Kawasaki (JP); Masatake Miyabe, Kawasaki (JP); Haruo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 769 days.

(21) Appl. No.: 09/748,671

(22) Filed: Dec. 26, 2000

(65) Prior Publication Data

US 2001/0028633 A1 Oct. 11, 2001

(30) Foreign Application Priority Data

Mar. 6, 2000 (JP) ...................................... 2000-060244

(51) Int. Cl.$^7$ .............................................. H04L 12/16
(52) U.S. Cl. ..................... 370/395.4; 370/443; 370/449
(58) Field of Search .......................... 370/395.1, 395.4, 370/395.41, 395.42, 468, 449, 458, 442, 443, 252

(56) References Cited

U.S. PATENT DOCUMENTS

| | | | | |
|---|---|---|---|---|
| 6,389,493 B1 | * | 5/2002 | Barkley et al. | 710/110 |
| 6,542,467 B2 | * | 4/2003 | Umayabashi | 370/236 |
| 6,657,958 B1 | * | 12/2003 | Tanaka | 370/230.1 |
| 2001/0021197 A1 | * | 9/2001 | Foore et al. | 370/468 |

* cited by examiner

Primary Examiner—Chau Nguyen
Assistant Examiner—Richard Chang
(74) Attorney, Agent, or Firm—Katten Muchin Zavis Rosenman

(57) ABSTRACT

A subscriber-line-terminating apparatus for dynamically allocating band portions to a plurality of terminal apparatuses includes an in-buffer-information-amount receiving unit for receiving an in-buffer-information amount from each of the terminal apparatuses; an insufficient-band-computing unit for computing an insufficient band portion required by each of the terminal apparatuses; an in-buffer-information-amount-proportional-band-allocating unit for allocating a band portion corresponding to the in-buffer-information amount to each of the terminal apparatuses and a past-use-band-allocating unit for allocating a past-use band part to each of the terminal apparatuses as a past-use band portion based on a first past-use band variable of the terminal apparatus.

23 Claims, 54 Drawing Sheets

FIG. 5

| Address | Parameter | Set value |
|---|---|---|
| #1 | Total band | 5000 |
| #2 | Total-shared-band upper limit | 5000 |
| #3 | Band-updating-slot count | 1500 |
| #4 | Weight for a presently allocated individual shared band portion | 1 |
| #5 | Weight for a previously calculated first past-use band variable | 3 |

FIG. 6

| Address | ONU number | Fixed-band | In-buffer-information amount | First past-use band variable |
|---|---|---|---|---|
| #1 | 1 | 800 | 203 | 230 |
| #2 | 2 | 200 | 4 | 39 |
| #3 | 3 | 400 | 30 | 50 |
| ... | ... | ... | ... | ... |

76 x = Sum of insufficient band portions/ total-shared-band upper limit

FIG. 11

| In-buffer-information amount |||| Allocation polling count ||||
|---|---|---|---|---|---|---|---|
| onu0 | onu1 | onu2 | onu4 | onu0 | onu1 | onu2 | onu4 |
| 51 | 225 | 270 | 0 | 942 | 1273 | 1049 | 528 |
| 65 | 136 | 71 | 0 | 1007 | 1284 | 948 | 552 |
| 51 | 33 | 74 | 0 | 1023 | 1230 | 979 | 560 |
| 32 | 61 | 86 | 0 | 1000 | 1245 | 995 | 551 |
| 97 | 37 | 52 | 0 | 1059 | 1220 | 969 | 544 |
| 276 | 0 | 66 | 0 | 1207 | 1127 | 944 | 513 |
| 376 | 0 | 72 | 0 | 1319 | 1067 | 919 | 487 |
| 387 | 0 | 56 | 0 | 1387 | 1038 | 895 | 472 |
| 319 | 0 | 77 | 0 | 1390 | 1021 | 915 | 465 |
| 214 | 0 | 59 | 0 | 1369 | 1031 | 923 | 469 |

FIG. 14

| Address | ONU number | Fixed-band | Individual-shared-band upper limit | In-buffer-information amount | First past-use band variable |
|---|---|---|---|---|---|
| #1 | 1 | 800 | 1000 | 203 | 230 |
| #2 | 2 | 200 | 800 | 4 | 39 |
| #3 | 3 | 500 | 400 | 30 | 50 |
| .... | .... | .... | .... | .... | .... |

| Address | ONU number | Fixed-band | Individual-shared-band upper limit | In-buffer-information amount | First past-use band variable | First threshold value | Second threshold value |
|---|---|---|---|---|---|---|---|
| #1 | 1 | 800 | 1000 | 203 | 230 | 2 | 120 |
| #2 | 2 | 200 | 800 | 4 | 39 | 2 | 80 |
| #3 | 3 | 500 | 400 | 120 | 50 | 5 | 100 |
| ... | ... | ... | ... | ... | ... | ... | ... |

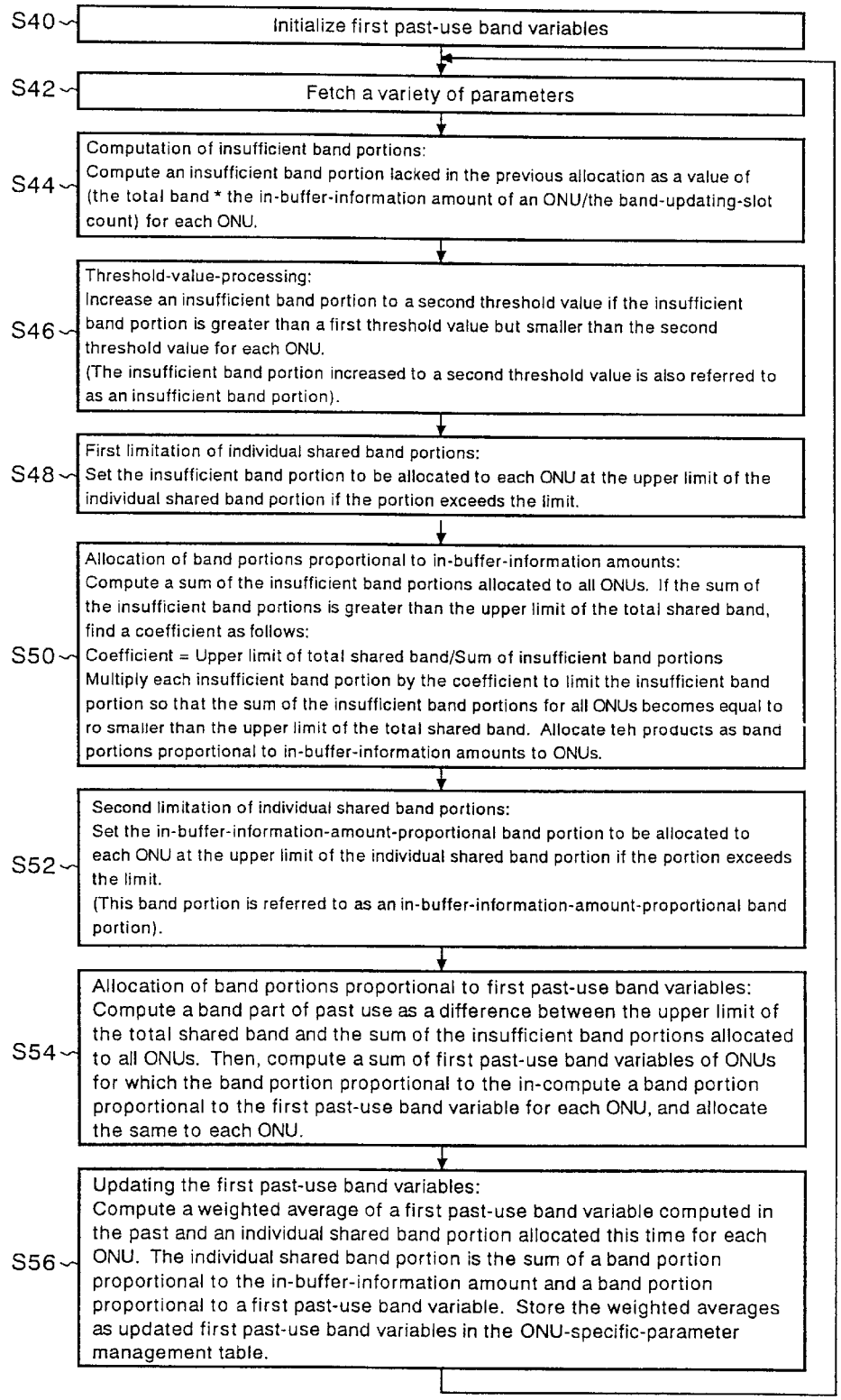

S40 — Initialize first past-use band variables

S42 — Fetch a variety of parameters

S44 — Computation of insufficient band portions:
Compute an insufficient band portion lacked in the previous allocation as a value of (the total band * the in-buffer-information amount of an ONU/the band-updating-slot count) for each ONU.

S46 — Threshold-value-processing:
Increase an insufficient band portion to a second threshold value if the insufficient band portion is greater than a first threshold value but smaller than the second threshold value for each ONU.
(The insufficient band portion increased to a second threshold value is also referred to as an insufficient band portion).

S48 — First limitation of individual shared band portions:
Set the insufficient band portion to be allocated to each ONU at the upper limit of the individual shared band portion if the portion exceeds the limit.

S50 — Allocation of band portions proportional to in-buffer-information amounts:
Compute a sum of the insufficient band portions allocated to all ONUs. If the sum of the insufficient band portions is greater than the upper limit of the total shared band, find a coefficient as follows:
Coefficient = Upper limit of total shared band/Sum of insufficient band portions
Multiply each insufficient band portion by the coefficient to limit the insufficient band portion so that the sum of the insufficient band portions for all ONUs becomes equal to ro smaller than the upper limit of the total shared band. Allocate teh products as band portions proportional to in-buffer-information amounts to ONUs.

S52 — Second limitation of individual shared band portions:
Set the in-buffer-information-amount-proportional band portion to be allocated to each ONU at the upper limit of the individual shared band portion if the portion exceeds the limit.
(This band portion is referred to as an in-buffer-information-amount-proportional band portion).

S54 — Allocation of band portions proportional to first past-use band variables:
Compute a band part of past use as a difference between the upper limit of the total shared band and the sum of the insufficient band portions allocated to all ONUs. Then, compute a sum of first past-use band variables of ONUs for which the band portion proportional to the in-compute a band portion proportional to the first past-use band variable for each ONU, and allocate the same to each ONU.

S56 — Updating the first past-use band variables:
Compute a weighted average of a first past-use band variable computed in the past and an individual shared band portion allocated this time for each ONU. The individual shared band portion is the sum of a band portion proportional to the in-buffer-information amount and a band portion proportional to a first past-use band variable. Store the weighted averages as updated first past-use band variables in the ONU-specific-parameter management table.

F I G. 23

| Address | Parameter | Set value |
|---|---|---|
| #1 | Total band | 5000 |
| #2 | Total-shared-band upper limit | 2000 |
| #3 | Band-updating-slot count | 1500 |
| #4 | CMAX | 10 |
| #5 | Weight for a presently allocated individual shared band portion | 1 |
| #6 | Weight for a previously calculated first past-use band variable | 3 |

| Address | Parameter | Set value |
|---|---|---|
| #1 | Total band | 5000 |
| #2 | Total-shared-band upper limit | 2000 |
| #3 | Band-updating-slot count | 1500 |
| #4 | CMAX | 5 |
| #5 | Weight for a presently allocated individual shared band portion | 1 |
| #6 | Weight for a previously calculated first past-use band variable | 3 |
| #7 | MAX_RATIO | 0.5 |

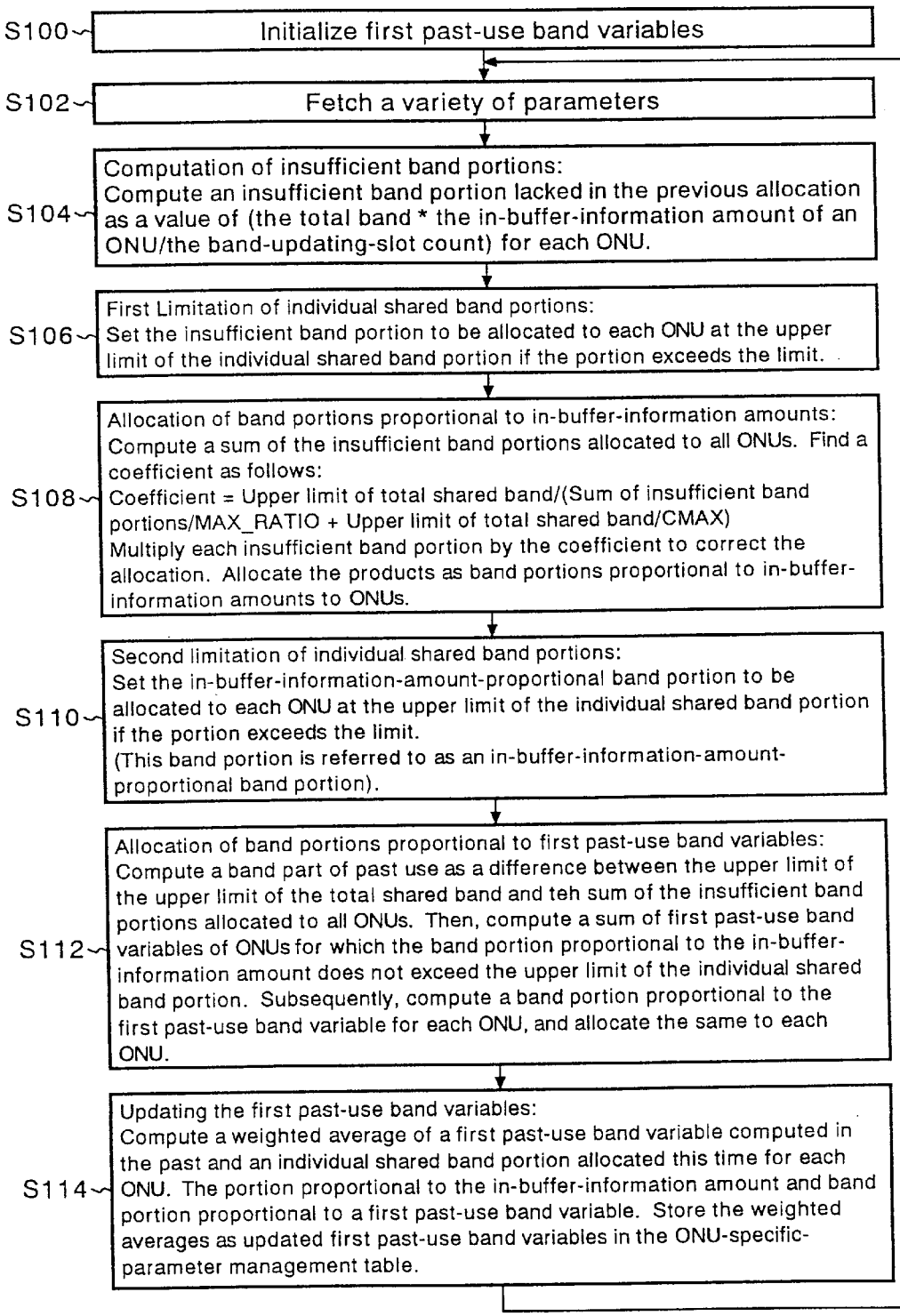

S100 — Initialize first past-use band variables

S102 — Fetch a variety of parameters

S104 — Computation of insufficient band portions:
Compute an insufficient band portion lacked in the previous allocation as a value of (the total band * the in-buffer-information amount of an ONU/the band-updating-slot count) for each ONU.

S106 — First Limitation of individual shared band portions:
Set the insufficient band portion to be allocated to each ONU at the upper limit of the individual shared band portion if the portion exceeds the limit.

S108 — Allocation of band portions proportional to in-buffer-information amounts:
Compute a sum of the insufficient band portions allocated to all ONUs. Find a coefficient as follows:
Coefficient = Upper limit of total shared band/(Sum of insufficient band portions/MAX_RATIO + Upper limit of total shared band/CMAX)
Multiply each insufficient band portion by the coefficient to correct the allocation. Allocate the products as band portions proportional to in-buffer-information amounts to ONUs.

S110 — Second limitation of individual shared band portions:
Set the in-buffer-information-amount-proportional band portion to be allocated to each ONU at the upper limit of the individual shared band portion if the portion exceeds the limit.
(This band portion is referred to as an in-buffer-information-amount-proportional band portion).

S112 — Allocation of band portions proportional to first past-use band variables:
Compute a band part of past use as a difference between the upper limit of the upper limit of the total shared band and teh sum of the insufficient band portions allocated to all ONUs. Then, compute a sum of first past-use band variables of ONUs for which the band portion proportional to the in-buffer-information amount does not exceed the upper limit of the individual shared band portion. Subsequently, compute a band portion proportional to the first past-use band variable for each ONU, and allocate the same to each ONU.

S114 — Updating the first past-use band variables:
Compute a weighted average of a first past-use band variable computed in the past and an individual shared band portion allocated this time for each ONU. The portion proportional to the in-buffer-information amount and band portion proportional to a first past-use band variable. Store the weighted averages as updated first past-use band variables in the ONU-specific-parameter management table.

F I G. 34

| Address | ONU number | Fixed-band | Individual-shared-band upper limit | Guaranteed minimum band portion | In-buffer-information amount | First past-use band variable |
|---------|------------|------------|------------------------------------|--------------------------------|-----------------------------|------------------------------|
| #1 | 1 | 800 | 1000 | 300 | 400 | 230 |
| #2 | 2 | 200 | 200 | 200 | 120 | 39 |
| #3 | 3 | 500 | 500 | 200 | 320 | 50 |
| ... | ... | ... | ... | ... | ... | ... |

| | In-buffer-information amount | Insufficient band portion | Guaranteed minimum band portion | Permitted band portion | Transformation into a total of 3,000 |
|---|---|---|---|---|---|
| ONU1 | 400 | 1928 | 2000 | 1928(1928<2000 ○) | 835 |
| ONU2 | 800 | 3857 | 3000 | 3000(3857>3000 ×) | 1299 |
| ONU3 | 0 | 0 | 3000 | 0(0<3000 ○) | 0 |
| ONU4 | 3450 | 16151 | 2000 | 2000(16151>2000 ×) | 866 |

FIG. 41

| Address | Parameter | Set value |
|---|---|---|
| #1 | Total band | 5000 |
| #2 | Total-shared-band upper limit | 2000 |
| #3 | Band-updating-slot count | 1500 |
| #4 | Weight for a presently allocated individual shared band portion(For updating a first past-use band variable) | 1 |
| #5 | Weight for a previously calculated first past-use band variable(For updating a first past-use band variable) | 3 |
| #6 | Weight for a presently allocated individual shared band portion(For updating a second past-use band variable) | 1 |
| #7 | Weight for a previously calculated second past-use band variable(For updating a second past-use band variable) | 9 |
| #8 | CMAX | 5 |
| #9 | MAX_RATIO | 0.5 |

| Address | ONU number | Fixed-band | Guaranteed minimum band portion | In-buffer-information amount | First past-use band variable | Second past-use band variable | Individual-shared-band upper limit | Allowed rate of change in guaranteed minimum band portion |
|---|---|---|---|---|---|---|---|---|
| #1 | 1 | 800 | 300 | 400 | 230 | 230 | 900 | 12 |
| #2 | 2 | 200 | 200 | 120 | 39 | 39 | 800 | 32 |
| #3 | 3 | 500 | 200 | 320 | 50 | 50 | 470 | 21 |
| ... | ... | ... | ... | ... | ... | ... | ... | ... |

S158 — Allocation of band portions proportional to in-buffer-information amounts:
Compute a sum of the insufficient band portions allocated to all ONUs. Find a coefficient as follows:
Coefficient = Upper limit of total shared band/(Sum of insufficient band portions/MAX_RATIO + Upper limit of total shared band/CMAX)

S160 — Second limitation of individual shared band portions:
Set the in-buffer-information-amount-proportional band portion to be allocated to each ONU at the upper limit of the individual shared band portion if the portion exceeds the limit.
(This band portion is referred to as an in-buffer-information-amount-proportional band portion).

S162 — Allocation of band portions proportional to first past-use band variables:
Compute a band part of past use as a difference between the upper limit of the total shared band and the sum of the insufficient band portions allocated to all ONUs. Then, compute a sum of first past-use band variables of ONUs for which the band portion proportional to the in-buffer-information amount does not exceed the upper limit of the individual shared band portion. Subsequently, compute a band portion proportional to the first past-use band variable for each ONU, and allocate the same to each ONU.

S164 — Guaranteeing minimum band portions:
If the sum of the insufficient band portions allocated to all ONUs is greater than the upper limit of the total shared band, multiply a sum of a band portion proportional to an in-buffer-information amount and a band portion proportional to a first past-use band variable by the third coefficient for each ONU, for which the sum of the band portion proportional to the in-buffer-information amount and the band portion proportional to a first past-use band variable does not exceed the upper limit of the total shared band, to reduce the sum. The third coefficient is expredded by the following equation:
Coefficient = Upper limit of total shared band/Sum of the insufficient band portions
Then, calculate a guaranteed minimum band part in accordance with the following equation:
Guaranteed minimum band part = Upper limit of total shared band − (Sum of band portions proportional to in-buffer-information amounts + Sum of band portions proportional to first past-use band variables) × Third coefficient = Upper limit of total shared band × (1 − Third coefficient)
Subsequently, allocate the guaranteed minimum band part to ONU so that a portion of the guaranteed minimum bamd part allocated to any ONU is proportional to the smaller value of the guaranteed minimum band portion and the insufficient band portion of the ONU.

S166 — Updating the first past-use band variables:
Compute a weighted average of a first past-use band variable computed in the past and an individual shared band portion allocated this time for each ONU. The individual shared band portion is the sum of a band portion proportional to the in-buffer-information amount, a band portion proportional to a first past-use band variable and a band portion proportional to the smaller portion. Store the weighted averages as updated first past-use band variables in the ONU-specific-parameter management table.
Compute a weighted average of a second past-use band variable computed in the past and an individual shared band portion allocated this time for each ONU. Store the weighted averages as updated second past-use band variables in the ONU-specific-parameter management table.

②

F I G. 45

| | In-buffer-information amount | Insufficient band portion | Guaranteed minimum band portion | Second past-use band variable | Corrected band portion | Permitted band portion | Transformation into a total of 3,000 |
|---|---|---|---|---|---|---|---|
| ONU1 | 400 | 1928 | 2000 | 1900 | 2100 | 1928 (1928<2000 ○) | 900 |
| ONU2 | 800 | 3857 | 3000 | 3500 | 2700 | 2700 (3857>2700 ×) | 1260 |
| ONU3 | 0 | 0 | 3000 | 600 | 3300 | 0 (0<3000 ○) | 0 |
| ONU4 | 3450 | 16151 | 2000 | 3000 | 1800 | 1800 (16151>1800 ×) | 840 |

FIG. 48

| Address | Parameter | Set value |
|---|---|---|
| #1 | Total band | 5000 |
| #2 | Total-shared-band upper limit | 2000 |
| #3 | Band-updating-slot count | 1500 |
| #4 | Weight for a presently allocated individual shared band portion | 2 |
| #5 | Weight for a previously calculated first past-use band variable | 6 |
| #6 | Weight for an upper limit of the individual shared band portion | 1 |

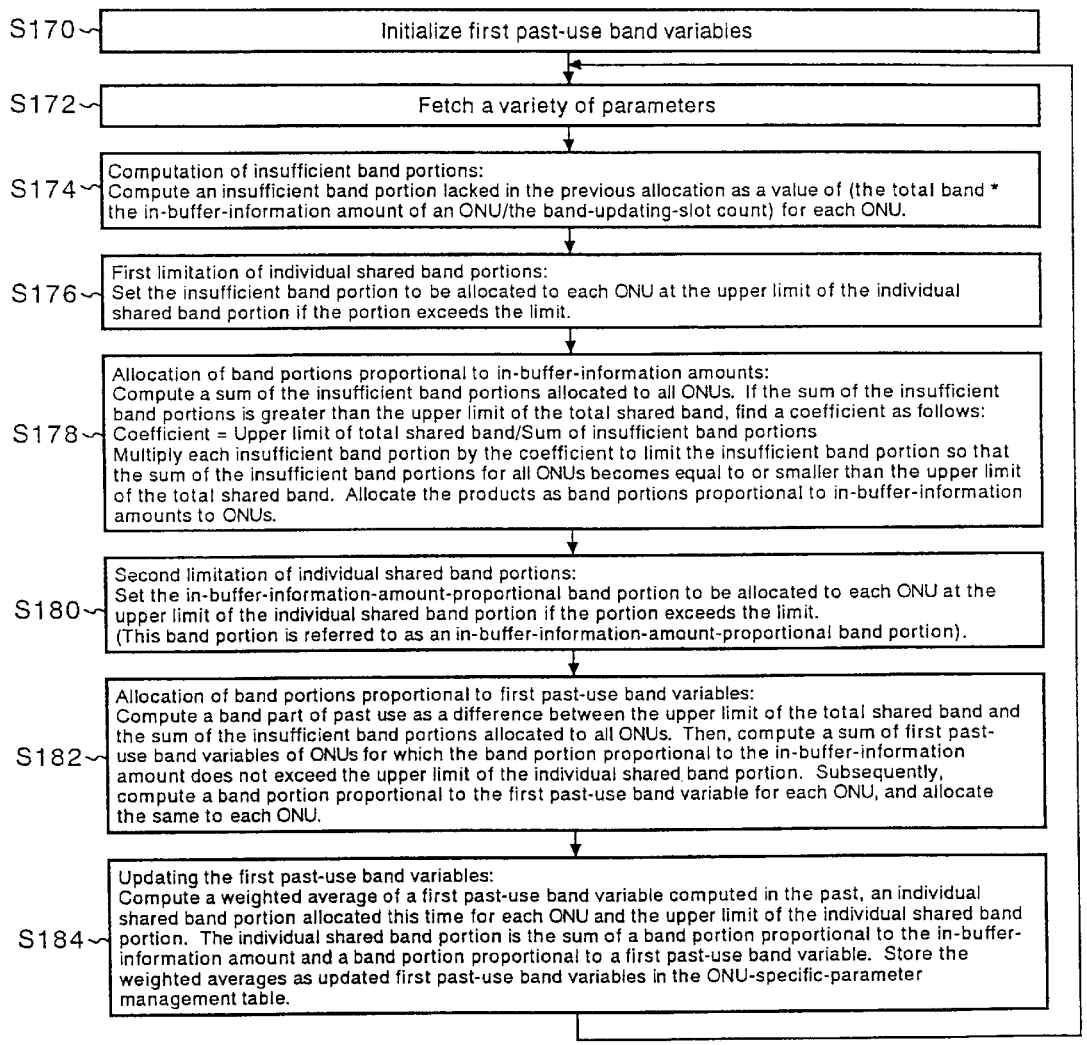

S170 — Initialize first past-use band variables

S172 — Fetch a variety of parameters

S174 — Computation of insufficient band portions:
Compute an insufficient band portion lacked in the previous allocation as a value of (the total band * the in-buffer-information amount of an ONU/the band-updating-slot count) for each ONU.

S176 — First limitation of individual shared band portions:
Set the insufficient band portion to be allocated to each ONU at the upper limit of the individual shared band portion if the portion exceeds the limit.

S178 — Allocation of band portions proportional to in-buffer-information amounts:
Compute a sum of the insufficient band portions allocated to all ONUs. If the sum of the insufficient band portions is greater than the upper limit of the total shared band, find a coefficient as follows:
Coefficient = Upper limit of total shared band/Sum of insufficient band portions
Multiply each insufficient band portion by the coefficient to limit the insufficient band portion so that the sum of the insufficient band portions for all ONUs becomes equal to or smaller than the upper limit of the total shared band. Allocate the products as band portions proportional to in-buffer-information amounts to ONUs.

S180 — Second limitation of individual shared band portions:
Set the in-buffer-information-amount-proportional band portion to be allocated to each ONU at the upper limit of the individual shared band portion if the portion exceeds the limit.
(This band portion is referred to as an in-buffer-information-amount-proportional band portion).

S182 — Allocation of band portions proportional to first past-use band variables:
Compute a band part of past use as a difference between the upper limit of the total shared band and the sum of the insufficient band portions allocated to all ONUs. Then, compute a sum of first past-use band variables of ONUs for which the band portion proportional to the in-buffer-information amount does not exceed the upper limit of the individual shared band portion. Subsequently, compute a band portion proportional to the first past-use band variable for each ONU, and allocate the same to each ONU.

S184 — Updating the first past-use band variables:
Compute a weighted average of a first past-use band variable computed in the past, an individual shared band portion allocated this time for each ONU and the upper limit of the individual shared band portion. The individual shared band portion is the sum of a band portion proportional to the in-buffer-information amount and a band portion proportional to a first past-use band variable. Store the weighted averages as updated first past-use band variables in the ONU-specific-parameter management table.

FIG. 53

| Address | Parameter | Set value |
|---------|-----------|-----------|
| #1 | Total band | 5000 |
| #2 | Total-shared-band upper limit | 2000 |
| #3 | Band-updating-slot count | 1500 |

| In-buffer-information amount | | | | Allocation polling count | | | |
|---|---|---|---|---|---|---|---|
| onu0 | onu1 | onu2 | onu4 | onu0 | onu1 | onu2 | onu4 |
| 1 | 101 | 0 | 0 | 72 | 3648 | 36 | 36 |
| 534 | 2 | 0 | 0 | 3757 | 21 | 7 | 7 |
| 0 | 360 | 0 | 0 | 10 | 3762 | 10 | 10 |
| 563 | 2 | 0 | 0 | 3757 | 21 | 7 | 7 |
| 0 | 383 | 0 | 0 | 9 | 3765 | 9 | 9 |
| 379 | 1 | 0 | 0 | 3752 | 20 | 10 | 10 |
| 1 | 556 | 0 | 0 | 12 | 3768 | 6 | 6 |
| 349 | 1 | 0 | 0 | 3748 | 22 | 11 | 11 |
| 0 | 332 | 0 | 0 | 12 | 3756 | 12 | 12 |
| 365 | 1 | 0 | 0 | 3752 | 20 | 10 | 10 |

DYNAMIC BAND-ALLOCATING SUBSCRIBER-LINE-TERMINATING APPARATUS

BACKGROUND OF THE INVENTION

1. Field of the Invention

In general, the present invention relates to a subscriber-line-terminating apparatus. More particularly, the present invention relates to dynamic allocation of a band required for transmission of information to optical network units.

2. Description of the Related Art

ATM-PON is an access communication system making use of characteristics of both an ATM (Asynchronous Transfer Mode) technology and a PON (Passive Optical Network) technology. The ATM technology makes integrated processing possible by dividing a variety of multimedia services of various kinds such as sounds, pictures and data into cells each having a fixed length. On the other hand, the PON technology makes a system cost low by letting a plurality of users share an optical transmission facility. An ATM-PON system comprises, among others, a subscriber-line-terminating apparatus (abbreviated hereafter to an SLT) installed typically at a telephone office, a plurality of optical network units (abbreviated hereafter to ONUS) installed at buildings and homes and an ATM exchange. The SLT is connected to the ONUs by a splitter called a star coupler, which is a passive device, through optical fibers. A direction from the SLT to an ONU is referred to as a descending direction. On the other hand, a direction from an ONU to the SLT is known as an ascending direction. Information is included in an ATM cell. Information is transmitted in cell units with each cell having additional bytes of data required for communication through a PON on a transmission line. Information is transmitted from the SLT to a plurality of ONUs in the descending direction as a signal comprising successive ATM cells. An ONU receives the transmitted information only after verifying that the information includes data indicating that the information is destined for the ONU. Each ONU sets ATM cells to a time slot obtained information transmission permission by the SLT for avoiding collision so as to transfer the same so that an ascending signal from an ONU to an SLT is commiunicated. The SLT allocates a time slot for an ascending signal to a specific ONU by transmission of a polling signal appending a transmission right for the specific ONU to a descending signal.

Polling in the ATM-PON system is implemented by providing a polling cell called a PLOAM cell at a specific location in a descending frame comprising typically 56 cells. An identifier for identifying an ONU serving as a recipient of a transmission right is set in the PLOAM cell. In this way, a descending signal can be transmitted to a plurality of ONUs. In the conventional system, polling is carried out for allocation of fixed-band portions. In this description, a band portion is a partial band allocated to an ONU. That is to say, a band portion allocated to each ONU is fixed. However, this conventional technique is not capable of well keeping up with a case in which traffic occurs irregularly as a burst as is the case with data traffic. By setting the polling at a time close to the occurrence of a peak rate of information generations, all information can be transmitted even if a burst is generated. With this method, however, polling operations at few bursts will be all wasted so that the transmission band cannot be used with a high degree of efficiency. In order to solve this problem, the polling is set at a time close to an average value of information generations to absorb fluctuations in information generation interval and to avoid congestion. In this case, however, a buffer memory with a very large size is required. In order to solve this buffer-size problem, there was invented a dynamic allocation technique capable of allocating band portions with a high degree of efficiency in a system with a transmission quantity varying dynamically as disclosed in Japanese Patent Laid-open No. Hei 10-242981. This technique is referred to as a conventional method.

In the conventional method, the SLT requests each ONU that the ONU notify the SLT of the amount of information stored in a buffer owned by the ONU by using an ascending signal. The SLT makes such a request by using a descending PLOAM cell. The amount of information stored in a buffer owned by each ONU is referred to as an in-buffer-information amount. In accordance with the descending PLOAM cell, the ONU retrieves the in-buffer-information amount and generates a request for a band portion for transmission of the information. The requested band portions is to be allocated to the ONU by the SLT on a polling basis. The request for the band portion to be allocated on a polling basis is multiplexed with ascending information in an ascending signal, which is then transmitted to the SLT. The SLT extracts the in-buffer-information amount from the request for the band portion to be allocated on a polling basis received from each ONU through a transmission line. Then, the SLT allocates a fixed-band portion determinately allocated on a polling basis to each ONU initially. The SLT then assigns a portion of a shared band allocated on a polling basis as described later to a free time slot. Subsequently, polling information is mixed with descending information in a descending signal transmitted to each ONU. A procedure to allocate a portion of a shared band on a polling basis is explained briefly as follows. First of all, a band unit is allocated to ONUs on a polling basis, that is, allocated to ONUs each having an in-buffer-information amount of at least equal to a threshold value of 0. The threshold value is incremented by 1 and a band unit is again allocated to ONUs on a polling basis, that is, allocated to ONUs each having an in-buffer-information amount of at least equal to a threshold value of 1. Thereafter, each time the threshold value is incremented, the same procedure is executed for the updated threshold value. As the threshold value reaches such a large value that there are no longer ONUs to which a band unit is to be allocated on a polling basis, the threshold value is restored to 0 to start the procedure from the beginning. As a result of the processing, a polling count of an ONU, that is, the number of polling operations in which a shared band unit is allocated to the ONU or the number of shared band units allocated to the ONU, is proportional to the in-buffer-information amount plus 1. Assume for example that the in-buffer-information amounts of ONU 1 and ONU2 are 50 and 300 respectively whereas the total size of the shared band is 1,000 units. In this case, the number of shared-band units allocated to ONU 1 is 143 (=1,000×51/352) and the number of shared-band units allocated to ONU 2 is 857 (=1,000×301/352).

However, the conventional method has the following 3 problems.

1: The Size of a Band Portion or the Number of Band Units Allocated to Each ONU Greatly Vibrates with the Lapse of Time.

As described above, the number of band units allocated by the SLT to each ONU is proportional to the most recent in-buffer-information amount plus 1. Thus, almost no band is allocated to an ONU with a small in-buffer-information amount. However, an ONU with a small in-buffer-information amount is not in a state of communicating no information. The small in-buffer-information amount is caused by the fact that a band portion previously allocated thereto by the SLT is greater than the magnitude of the actual communication. Since an ONU with a small in-buffer-information amount is not polled by the SLT, the in-buffer-information amount increases abruptly. When the in-buffer-information amount increases abruptly, the SLT allocates a sufficiently large band portion to the ONU. Thus, the in-buffer-information amount decreases abruptly. These operations to allocate band portions to ONUs are carried out at intervals of updating an allocated band portion. As a result, the size of a band portion allocated to an ONU fluctuates greatly. FIG. 55 is a diagram showing tabular results of allocation based on polling in the conventional system obtained by simulation. In the simulation, the total band is used as a shared band with a size of 3,792 units shared by 5 units ONU 0 to ONU 4. As is obvious from the figure, the size of a band portion allocated to each ONU, that is, the allocation polling count of each ONU on the right side of the table, vibrates greatly with the lapse of time in the downward direction of the table.

The vibration of the size of an allocated band portion causes a fluctuation and a delay in arrival time of information. In the case of such traffic, information leaks in a small-size buffer existing on a transmission line, causing the quality to deteriorate. In addition, the qualities of connection sharing the buffer and the transmission line also deteriorate as well. For this reason, the SLT must be provided with means such as a buffer with a large size for absorbing vibrations prior to transmission to a network, and such a buffer raises the cost of the SLT considerably. In addition, a fluctuation and a delay resulting from a vibration substantially deteriorates the quality of a real-time service such as a service of providing sounds and motion pictures. The problem encountered as a big vibration of a size of a band portion allocated to an ONU is attributed to the fact that the size of a band portion to be allocated to the ONU is simply set at a value proportional to the in-buffer-information amount without computing a correct size of a band portion to be allocated from the in-buffer-information amount.

2: Fair Band Allocation is not Sustained Among ONUs.

Data traffic conforming to a TCP/IP adopted in a network such as the Internet can be TCP traffic subjected to flow control based on the TCP protocol of the upper-level apparatus between user terminals such as personal computers and workstations, or UDP traffic not subjected at all to flow control based on a UDP protocol of an upper-level apparatus. In the TCP traffic, data is transmitted under flow control between user terminals. As a result, the in-buffer-information amount of an ONU is in a stable state of a small value and does not increase to a large value. In the case of the UDP traffic, on the other hand, no flow control is executed. Thus, when communication is started, the in-buffer-information amount increases abruptly. For this reason, if an ONU for only TCP traffic coexists with an ONU for only UDP traffic in the conventional technique, a band portion of a large size is allocated to the ONU for only UDP traffic so that almost no band portion is allocated to the ONU for only TCP traffic. As a result, band portions are not allocated fairly.

3: A Minimum Band Portion is not Taken into Consideration.

In the ATM technology, from a QoS (Quality of Service) point of view, services are classified into classes such as an ABR service and a GFR service. A GFR service is a service for which a minimum band part is set in a shared band portion. When a GFR service is rendered, it is necessary to allocate a shared band portion to each ONU by taking a minimum band size into consideration. With the conventional technique, however, this scheme is impossible.

It is thus an object of the present invention to provide an SLT capable of suppressing a phenomenon in which the size of a shared band portion vibrates.

It is another object of the present invention to provide an SLT capable of sustaining fair allocation of band portions among ONUs.

It is a further object of the present invention to provide an SLT capable of allocating band portions by taking a minimum band size into consideration.

SUMMARY OF THE INVENTION

In accordance with an aspect of the present invention, there is provided a subscriber-line-terminating apparatus (SLT) for terminating lines of a plurality of terminal apparatuses and dynamically allocating band portions to the terminal apparatuses by dynamic allocation of time slots to be used by the terminal apparatuses for information-transmission use to the terminal apparatuses and transmission of polling information indicating allocation of time slots to the terminal apparatuses to the terminal apparatuses, the SLT comprising: an in-buffer-information-amount-receiving unit for receiving an in-buffer-information amount indicating an amount of information, which is stored in a predetermined buffer employed in each of the terminal apparatuses and remains to be transmitted, from each of the terminal apparatuses; an insufficient-band-computing unit for computing an insufficient band portion required by each of the terminal apparatuses for transmitting information stored in the buffer on the basis of the in-buffer-information amount received from each of the terminal apparatuses; an apparatus-specific-parameter management table for storing the in-buffer-information amount and a first past-use band variable indicating a band portion dynamically allocated in the past to one of the terminal apparatuses for each of the terminal apparatuses; an in-buffer-information-amount-proportional-band-allocating unit for allocating a band portion corresponding to the in-buffer-information amount to each of the terminal apparatuses on the basis of the insufficient band portion for the terminal apparatus and a total-shared-band upper limit indicating an upper limit of a sum of band portions dynamically allocated to all the terminal apparatuses; a past-use-band-allocating unit, which is used for apportioning a past-use band part into past-use band portions each to be allocated to one of the terminal apparatuses on the basis of the first past-use band variable of the terminal apparatus in case a sum of the band portions proportional to the in-buffer-information amounts of all the terminal apparatuses is smaller than the total-shared-band upper limit where the past-use band part is a difference between the sum of the band portions proportional to the in-buffer-information amounts of all the terminal apparatuses and the total-shared-band upper limit; a first past-use-band-variable-updating unit for updating the first past-use band variable for each of the terminal apparatuses on the basis of a band portion, which is dynamically allocated to the terminal apparatus and includes the band portion proportional to the in-buffer-information amount as well as the past-use band portion, and storing the updated first past-use band variable for each of the terminal apparatus into the apparatus-specific-parameter management table; a shared-band-polling-information-generating unit for generating polling information showing allocation of time slots to the terminal apparatuses on the basis of band portions, which are dynamically allocated to the terminal apparatuses and each include the band portion proportional to the in-buffer-information amount as well as the past-use band portion; and a polling-information-transmitting unit for transmitting the polling information to the terminal apparatuses.

It is desirable to provide an SLT according to the aspect of the present invention wherein the in-buffer-information-amount-proportional-band-allocating unit increases a band portion corresponding to the in-buffer-information amount to be allocated to each of the terminal apparatuses by multiplying each of the insufficient band portions by a coefficient greater than 1 in case the sum of the insufficient band portions for all the terminal apparatuses is smaller than the total-shared-band upper limit.

In another desirable SLT according to the aspect of the present invention, the apparatus-specific-parameter management table includes a guaranteed minimum band portion for each of the terminal apparatuses; there is further provided a minimum-band-guaranteeing unit which is used for computing a guaranteed minimum band part of the terminal apparatuses as a product of the total-shared-band upper limit and a first coefficient smaller than 1 and apportioning the guaranteed minimum band part into individual guaranteed minimum band portions each to be allocated to one of the respective terminal apparatuses on the basis of the guaranteed minimum band portion cataloged in the apparatus-specific-parameter management table for the terminal apparatus in case a sum of the insufficient band portions for all the terminal apparatuses is greater than the total-shared-band upper limit; in case a sum of the insufficient band portions for all the terminal apparatuses is greater than the total-shared-band upper limit, the in-buffer-information-amount-proportional-band-allocating unit multiplies each of the insufficient band portions for all the terminal apparatuses by a second coefficient smaller than the value of an expression [(the total-shared-band upper limit/the sum of the insufficient band portions for all the terminal apparatuses)×(1−the first coefficient)], and allocates products of the insufficient band portions for all the terminal apparatuses and the second coefficient as band portions corresponding to the in-buffer-information amounts of the terminal apparatuses to the respective terminal apparatuses; and in case a sum of the guaranteed minimum band portions allocated to the terminal apparatuses and the band portions corresponding to the in-buffer-information amounts allocated to the terminal apparatuses is smaller than the total-shared-band upper limit, the past-use-band-allocating unit apportions a past-use band part into past-use band portions each to be allocated to one of the respective terminal apparatuses on the basis of the first past-use band variable of the terminal apparatus where the past-use band part is a difference between the sum of the guaranteed minimum band portions allocated to the terminal apparatuses and the band portions corresponding to the in-buffer-information amounts allocated to the terminal apparatuses and the total-shared-band upper limit.

The above and other objects, features and advantages of the present invention as well as the manner of realizing them will become more apparent, whereas the invention itself will be best understood from a study of the following description and appended claims with reference to the attached drawings showing some preferred embodiments of the invention.

BRIEF DESCRIPTION OF THE DRAWINGS

FIG. 5 is a diagram showing the configuration of an ONU-common-parameter management table used in the ATM-PON IF unit shown in FIG. 4;

FIG. 6 is a diagram showing the configuration of an ONU-specific-parameter management table used in the ATM-PON IF unit shown in FIG. 4;

FIG. 11 is a diagram showing a typical result of allocation of the shared band;

FIG. 14 is a diagram showing the configuration of an ONU-specific-parameter management table used in the ATM-PON IF unit shown in FIG. 12;

FIG. 18 is a diagram showing the configuration of an ONU-specific-parameter management table used in the ATM-PON IF unit shown in FIG. 16;

FIG. 19 shows a flowchart representing operations of the shared-band control unit;

FIG. 23 is a diagram showing the configuration of an ONU-common-parameter management table used in the ATM-PON IF unit shown in FIG. 20;

FIG. 29 is a diagram showing the configuration of an ONU-common-parameter management table used in the ATM-PON IF unit shown in FIG. 26;

FIG. 30 shows a flowchart representing operations of the shared-band control unit;

FIG. 34 is a diagram showing the configuration of an ONU-specific-parameter management table used in the ATM-PON IF unit shown in FIG. 32;

FIG. 38 is a diagram showing a typical result of allocation of band portions proportional to the smaller value of a guaranteed minimum band portion and an insufficient band portion;

FIG. 41 is a diagram showing the configuration of an ONU-common-parameter management table used in the ATM-PON IF unit shown in FIG. 39;

FIG. 42 is a diagram showing the configuration of an ONU-specific-parameter management table used in the ATM-PON IF unit shown in FIG. 39;

FIG. 44 shows a continuation flowchart of the flowchart shown in FIG. 43;

FIG. 45 is a diagram showing a typical result of allocation of band portions proportional to the smaller value of a guaranteed minimum band portion and a corrected band portion;

FIG. 48 is a diagram showing the configuration of an ONU-common-parameter management table used in the ATM-PON IF unit shown in FIG. 46;

FIG. 49 shows a flowchart representing operations of the shared-band control unit;

FIG. 53 is a diagram showing the configuration of an ONU-common-parameter management table used in the ATM-PON IF unit shown in FIG. 51;

FIG. 55 is a diagram showing a typical result of the conventional allocation of a shared band.

DETAIL DESCRIPTION OF THE PREFERRED EMBODIMENTS

Figure 1:
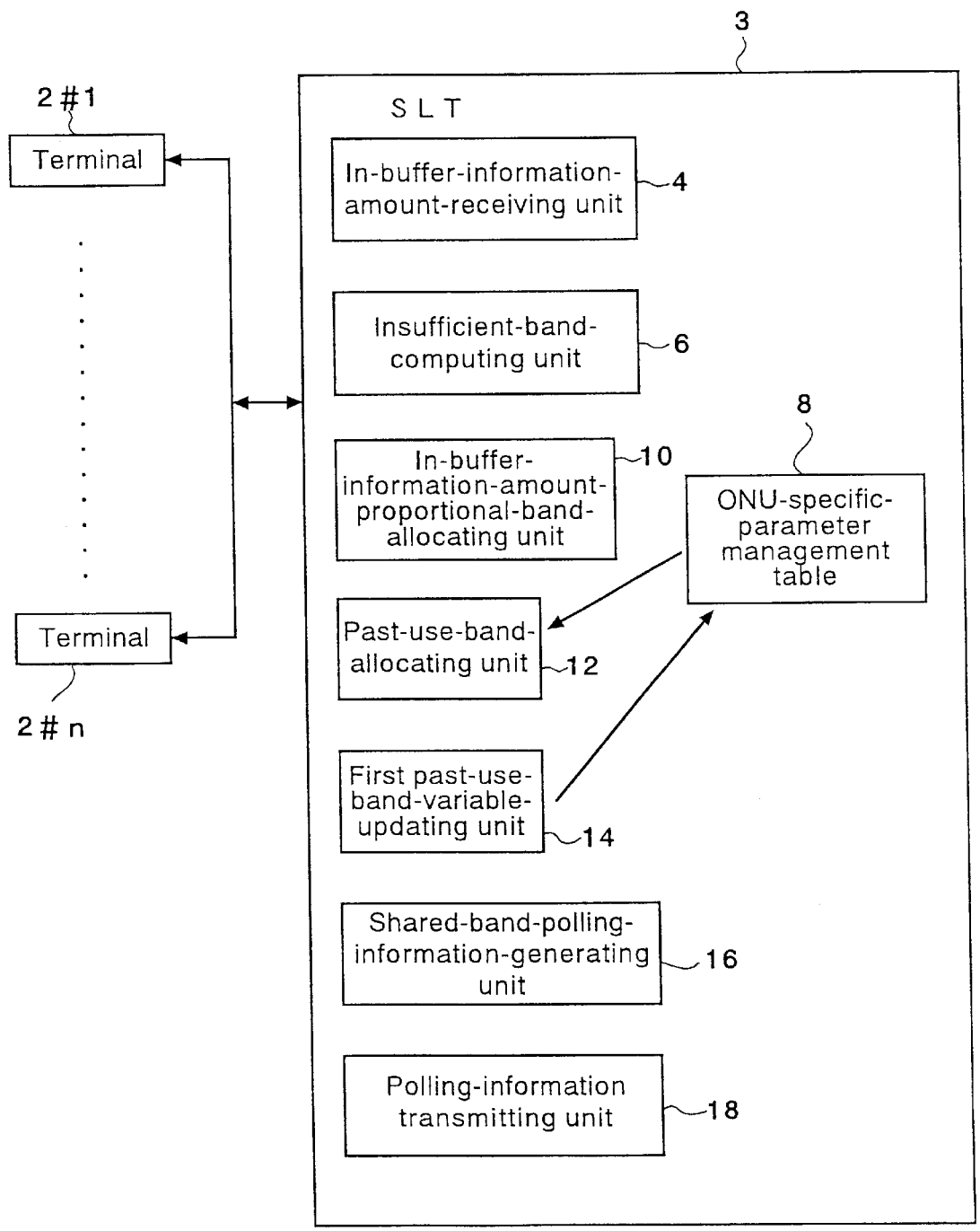
FIG. 1 is a diagram showing the principle of the present invention.

Before explaining preferred embodiments of the present invention, the principle of the invention is described. FIG. 1 is a diagram showing the principle of the present invention. As shown in FIG. 1, an SLT 3 terminates subscriber lines of terminals 2#i where i=1 to n, comprising an in-buffer-information-amount-receiving unit 4, an insufficient-band-computing unit 6, an ONU-specific-parameter management table 8, an in-buffer-information-amount-proportional-band-allocating unit 10, a past-use-band-allocating unit 12, a first past-use-band-variable-updating unit 14, a shared-band-polling-information-generating unit 16 and a polling-information transmitting unit 18. The terminals 2#i where i=1 to n each have a buffer with a predetermined size for storing information. Each of the terminals 2#i where i=1 to n transmits an in-buffer-information amount indicating the amount of information stored in the buffer to the SLT 3. The in-buffer-information-amount-receiving unit 4 receives the in-buffer-information amount from the terminals 2#i where i=1 to n and stores it into the ONU-specific-parameter management table 8. The insufficient-band-computing unit 6 computes an insufficient band portion required for transmitting information indicated by the in-buffer-information amount to each of the respective terminals 2#i where i=1 to n. An insufficient band portion is a band portion lacked in the preceding allocation cycle.

The in-buffer-information-amount-proportional-band-allocating unit 10 allocates in-buffer-information amount proportional band portions typically proportional to insufficient band portions of the terminals 2#i where i=1 to n to the respective terminals 2#i. The in-buffer-information-amount-proportional band portions are thus calculated on the basis of the insufficient band portions of a plurality of terminals 2#i where i=1 to n and a total-shared-band upper limit, which is an upper limit of band portions allocated dynamically to the terminals 2#i. The sum of the in-buffer-information-amount-proportional band portions allocated in the past to the terminals 2#i where i=1 to n may be smaller than the upper limit of the total shared band. The difference between the sum of the in-buffer-information-amount-proportional band portions allocated in the past to the terminals 2#i where i=1 to n and the upper limit of the total shared band is referred to as a past-use band. If the sum of the in-buffer-information-amount-proportional band portions allocated in the past to the terminals 2#i where i=1 to n is smaller than the upper limit of the total shared band, the past-use-band-allocating unit 12 allocates band portions proportional to first past-use band variables of the terminals 2#i where i=1 to n to the respective terminals 2#i as band portions proportional to first past-use band variables. In this way, band portions proportional to first past-use band variables are allocated to the terminals 2#i where i=1 to n by considering band portions allocated dynamically to the terminals 2#i in the past. Thus, variations in band (=insufficient band portion+past-use band portion) allocated dynamically to the terminals 2#i where i=1 to n can be suppressed even if the in-buffer-information amount in any of the terminals 2#i changes abruptly.

The first past-use-band-variable-updating unit 14 updates the first past-use band variable of each of the terminals 2#i where i=1 to n in accordance with a band representing the sum of a band portion proportional to an in-buffer-information amount and a band portion proportional to a first past-use band variable allocated presently to the terminal 2#i and stores the updated first past-use band variable into the ONU-specific-parameter management table 8. The shared-band-polling-information-generating unit 16 generates polling information indicating allocation of time slots to the terminals 2#i where i=1 to n. The polling information is generated on the basis of in-buffer-information-amount proportional band portions and past-use band portions allocated to the terminals 2#i where i=1 to n. The polling-information transmitting unit 18 transmits the polling information to the terminals 2#i where i=1 to n. The terminals 2#i where i=1 to n each insert an in-buffer-information amount into a time slot allocated thereto and transmit it to the SLT 3.

Figure 2:
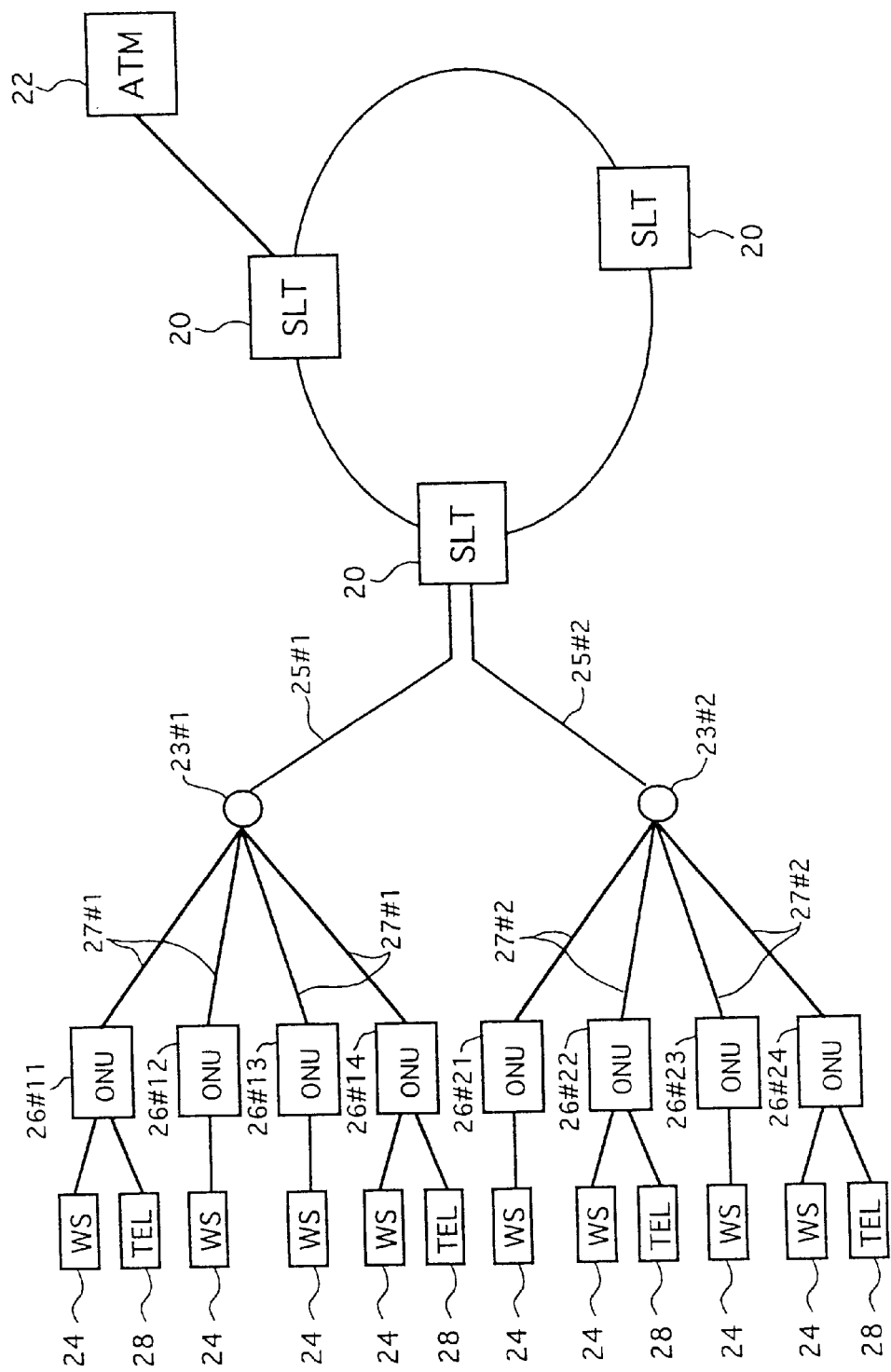
FIG. 2 is a diagram showing the configuration of a network implemented by an embodiment of the present invention.

FIG. 2 is a diagram showing the configuration of a network implemented by an embodiment of the present invention. As shown in FIG. 2, the network comprises a plurality of SLTs 20, an ATM exchange 22, a plurality of ONUs 26, a plurality of workstations (WS') 24 and a plurality of telephones (TELS) 28. The workstations 24 and the telephones 28 each serve as a user terminal. An SLT 20 covers a group of ONUs 26#ij where i=1 and 2 whereas j=1, 2 and so on, serving as an interface with other SLTS 20 and the ATM exchange 22. Each of ports i in an SLT 20 where i=1 and 2 covers a plurality of ONUs 26#ij where j=1, 2 and so on. A port i of an SLT 20 is connected to each of the ONUs 26#ij where j=1, 2 and so on by an optical fiber 25#i, a splitter 23#i and an optical fiber 27#i for transmitting a signal. Each of the ONUs 26#ij where i=1 and 2 whereas j=1, 2 and so on covers 1 or 2 user terminals which can each be a WS 24, a TEL 28 and a personal computer not shown in the figure. Thus, each of the ONUs 26#ij where i=1 and 2 whereas j=1, 2 and so on serves as an interface between the user terminals covered thereby and the SLT 20. The ATM exchange 22 passes on a signal received typically from an SLT 20 to an output line according to a VPI/VCI included in an ATM cell received from the SLT 20. A user terminal such as a WS 24 or a TEL 28 communicates with another user terminal through ONUs 26#ij covering the user terminals in accordance with a predetermined protocol such as the TCP or UDP protocol.

Figure 3:
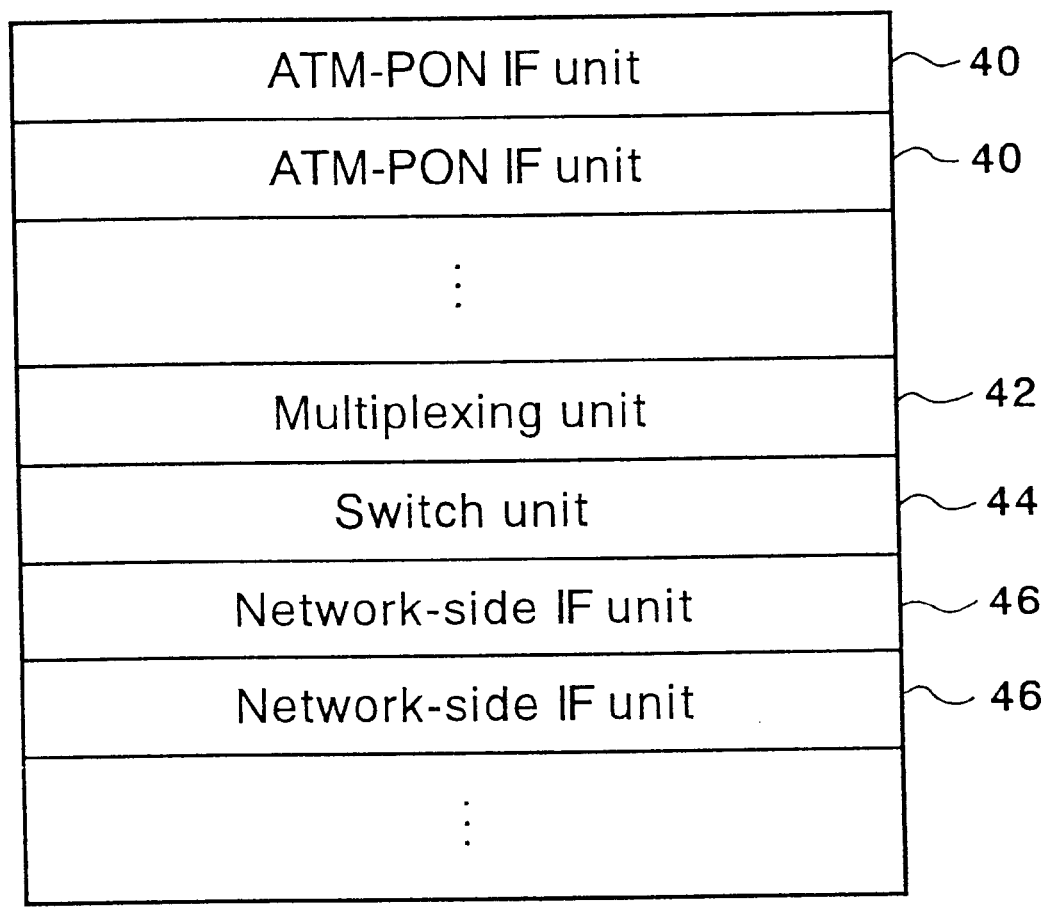
FIG. 3 is a diagram showing the configuration of an SLT included in the network shown in FIG. 2.

FIG. 3 is a diagram showing the configuration of an SLT 20 included in the network shown in FIG. 2. As shown in FIG. 3, the SLT 20 comprises a plurality of ATM-PON IF units 40, a multiplexing unit 42, a switch unit 44 and a plurality of network-side IF units 46. Each of the ATM-PON IF units 40 has the following functions:

1: The ATM-PON IF unit 40 receives an in-buffer-information amount from each of the ONU 26#ij where j=1 to n and allocates a dynamically allocatable shared band to the corresponding ONU 26#ij. The allocated shared band comprises a band portion proportional to the in-buffer-information amount of each of the ONUs 26#ij where j=1 to n, and a band portion proportional to the first past-use band variable, which indicates a band (that is, an individual shared band portion) dynamically allocated to each of the ONUs 26#ij where j=1 to n in the past.

2: The ATM-PON IF unit 40 generates polling information showing allocation of a time slot to each of the ONUS 26#ij where j=1 to n according to an individual shared band portion dynamically allocated the ONU 26#ij and a fixed-band portion determinately allocated to the ONU 26#ij. The individual shared band portion is the sum of a band portion proportional to an in-buffer-information amount and a band portion proportional to a first past-use band variable.

3: The ATM-PON IF unit 40 multiplexes descending information with the polling information, transmitting them to each of the ONUs 26#ij where j=1 to n.

4: The ATM-PON IF unit 40 receives ascending information from each of the ONUs 26#ij where j=1 to n and passes on the information to the switch unit 44.

The multiplexing unit 42 multiplexes ATM cells and transmitting them to the network. The switch unit 44 receives an ATM cell from the ATM-PON IF unit 40 or a network-side IF unit 46 and passed on the cell to an ATM-PON IF unit 40 or a network-side unit 46 of an output line indicated by a VPI/VCI included in the cell. Each of the network-side units 46 has a function of transmitting an ATM cell received from the switch unit 44 to the network, and a function of transmitting an ATM cell received from the network to the switch unit 44.

First Embodiment

Figure 4:
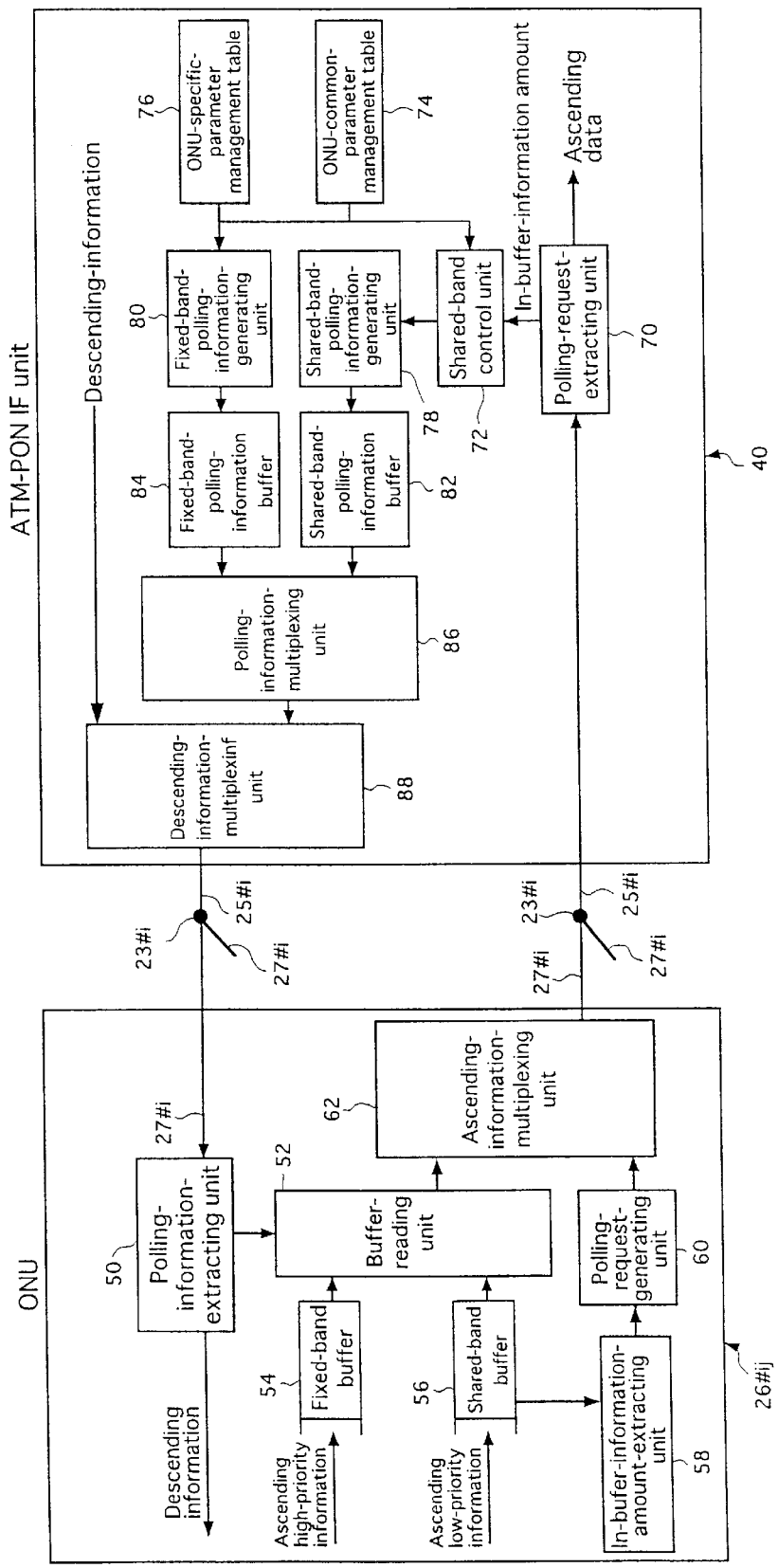
FIG. 4 is a functional block diagram showing an ATM-PON IF unit and an ONU, which are implemented by a first embodiment of the present invention.

FIG. 4 is a functional block diagram showing an ATM-PON IF unit 40 and an ONU 26#ij, which are implemented by a first embodiment of the present invention. As shown in FIG. 4, the ATM-PON IF unit 40 comprises a polling-request-extracting unit 70, a shared-band control unit 72, an ONU-common-parameter management table 74, an ONU-specific-parameter management table 76, a shared-band-polling-information-generating unit 78, a fixed-band-polling-information-generating unit 80, a shared-band-polling-information buffer 82, a fixed-band-polling-information buffer 84, a polling-information-multiplexing unit 86 and a descending-information-multiplexing unit 88. In this embodiment, the ATM-PON IF unit 40 terminates lines from a plurality of ONUs 26#ij shown in FIG. 3 where i=1 or 2 and j=1 to n.

The polling-request-extracting unit 70 extracts ascending information from an ascending information frame received from an ONU 26#ij, and extracts an in-buffer-information amount from a polling request signal set in a divided slot in the frame. The divided slot is a time slot for communicating the in-buffer-information amount. The polling-request-extracting unit 70 supplies the ascending information to the switch unit 44. The in-buffer-information amount is stored in the ONU-specific-parameter management table 76 at an entry for the identified ONU 26#ij. The time slot for communicating the in-buffer-information amount is a predetermined time slot in the ascending information frame. Typically, a time slot for communicating the in-buffer-information amount is shared by a group comprising a plurality of ONUs 26#ij where j=1 to n.

The ATM-PON IF unit 40 allocates a time slot for communicating the in-buffer-information amount to such a group typically by setting the number of the group in a descending PLOAM cell. As will be described later, the in-buffer-information amount is the amount of information stored in a shared-band buffer 56 provided in each of the ONUs 26#ij where j=1 to n. The in-buffer-information amount can be expressed in terms of byte units or time slots. An in-buffer-information amount stored in the ONU-specific-parameter management table 76 is expressed in terms of time-slot units for the sake of convenience. Thus, an in-buffer-information amount expressed in units other than the time-slot unit is converted into a value expressed in terms of time-slot units before being stored in the ONU-specific-parameter management table 76. In the following description, an in-buffer-information amount is expressed in terms of time-slot units.

The shared-band control unit 72 carries out the following pieces of processing for each of the ONUs 26#ij where j=1 to n at band updating intervals.

1: The shared-band control unit 72 computes an insufficient band portion from an in-buffer-information amount received from each of the ONUs 26#ij where j=1 to n. An insufficient band portion is a band portion required by an ONU 26#ij for outputting all ascending information indicated by an in-buffer-information amount within a band-updating period. A band portion may be expressed in terms of transfer-rate units (bps), band smallest units (of typically 8 Kbps) of the ONUs 26#ij where j=1 to n covered by the ATM-PON IF unit 40 or time slots. A formula for computing a band portion lacked in the previous allocation can be understood as follows. If an actual polling count in the previous band-updating period exceeds a polling count required by an ONU 26#ij, the in-buffer-information amount of the ONU 26#ij is 0. If an actual polling count in the previous band-updating period is smaller than a polling count required by an ONU 26#ij, on the other hand, information stored in the buffer has an amount corresponding to the difference in polling count. That is to say, the in-buffer-information amount can be considered to be equal to the number of insufficient band units to be allocated on a polling basis. The size of an allocated band portion is proportional to the polling count and can thus be computed in accordance with Eq. (1) as follows:

Allocated band portion size=Polling count×Total band/Band-updating-slot count (1)

where the total band is the entire band allocated to the ONUs 26#ij where j=1 to n covered by the ATM-PON IF unit 40. The unit of the total band is the same as the unit of the insufficient band portion described earlier. The band-updating-slot count is the number of all time slots included in a band-updating period. A band-updating period is a period during which processing to allocate band units is carried out. From the above relation, an insufficient band portion for each of the ONUs 26#ij where j=1 to n can be computed in accordance with Eq. (2) as follows:

Insufficient band portion of an ONU 26#ij=Total band×Polling count/Band-updating-slot count=Total band×In-buffer-information amount of the ONU 26#ij/Band-updating-slot count (2)

2: If the sum of the insufficient band portions for all the ONUs 26#ij where j=1 to n is greater than the upper limit of the total shared band, each insufficient band portion is multiplied by a coefficient, which is found from a band-correcting function f given by Eq. (3) below, to correct the insufficient band portions so that the sum of the insufficient band portions for all the ONUs 26#ij where j=1 to n becomes equal to or smaller than the upper limit of the total shared band. The corrected insufficient band portion and the uncorrected insufficient band portion are referred to as an in-buffer-information-amount-proportional band portion since the band is proportional to the in-buffer-information amount.

f=Upper limit of total shared band/Sum of insufficient band portions (3)

where the upper limit of the total shared band is a maximum of an entire shared band that can be allocated to the ONUS 26#ij where j=1 to n and its unit is the same as the unit of the insufficient band portion.

3: If the sum of currently allocated shared band portions proportional to in-buffer-information amounts is smaller than the upper limit of the total shared band, a residual band remains in the shared band as a past-use band. In this case, portions of the past-use band proportional to first past-use band variables are allocated to the ONUs 26#ij where j=1 to n. The past-use band is a difference between the sum of shared band portions proportional to in-buffer-information amounts and the upper limit of the total shared band. The first past-use band variable of an ONU 26#ij is a value indicating an individual shared band portion allocated in the past to the ONU 26#ij. The individual shared band portion of an ONU 26#ij is the sum of a band portion proportional to an in-buffer-information amount for the ONU 26#ij and a past-use band portion of the ONU 26#ij.

4: The first past-use band variable for each of the ONUs 26#ij where j=1 to n is updated in accordance with Eq. (4) as follows:

The first past-use band variable=$(w\_new1 \times bw + w\_old1 \times rireki\_old1)/(w\_new1 + w\_old1)$ (4)

where notation bw denotes a shared band portion allocated to each of the ONUs 26#ij where j=1 to n this time, notation rireki_old1 denotes the first past-use band variable computed in a previous band-updating operation, notation w_new1 denotes a weight for the shared band portion bw and notation w_old1 denotes a weight for rireki_old1. The shared band portion bw is the sum of a band portion proportional to an in-buffer-information amount and a band portion proportional to a first past-use band variable. The weights w_new1 and w_old1 are each a positive real number. As is obvious from Eq. (4), the first past-use band variable is computed as a weighted average based on the weights w_new1 and w_old1 in order to leave information on a shared band portion allocated to each of the ONUs 26#ij where j=1 to n previously as a part of the first past-use band variable. By allocating a past-use band in accordance with such a first past-use band variable, an abrupt allocation of a shared band portion can be avoided. It should be noted that, if it is desired to allocate the past-use band by much considering a band portion allocated in the past, the weight w_old1 is set at a value greater than the weight w_new1. In this embodiment, information on only one shared band portion allocated in the past is reflected in the first past-use band variable as described above. It is worth noting, however, that information on a plurality of shared band portions allocated in the past can be reflected in the first past-use band variable. In this case, shared band portions allocated to each individual ONU 26#ij in a plurality of previous band-updating periods are stored in a memory and the first past-use band variable is computed as a weighted average of the stored shared band portions and a shared band portion allocated this time.

5: Individual shared band portions allocated this time to the ONUs 26#ij where j=1 to n are reported to the shared-band-polling-information-generating unit 78. FIG. 5 is a diagram showing the configuration of the ONU-common-parameter management table 74 used in the ATM-PON IF unit shown in FIG. 4. The ONU-common-parameter management table 74 is a memory such as a RAM for storing ONU-common-parameters relevant to allocation of band portions to the ONUs 26#ij where j=1 to n. The ONU-common-parameters include the total band, the upper limit of a total shared band, the number of band-updating slots, a weight of a presently allocated individual shared band portion and a weight of a previously calculated first past-use band variable. To put it in detail, a total band of 5,000 is stored at address #1. A total shared band upper limit of 2,000 is stored at address #2. A band-updating-slot count of 1,500 is stored at address #3. A weight of 1 for a presently allocated individual shared band portion is stored at address #4. A weight of 3 for a previously calculated first past-use band variable is stored at address #5. It should be noted that the total band and the upper limit of a total shared band are each expressed in terms of minimum-band portions, which are each 8 Kbps.

FIG. 6 is a diagram showing the configuration of the ONU-specific-parameter management table 76 used in the ATM-PON IF unit shown in FIG. 4. The ONU-specific-parameter management table 76 is a memory such as a RAM for storing parameters unique to the individual ONUs 26#ij where j=1 to n. The parameters are relevant to allocation of band portions to the ONUs 26#ij where j=1 to n. At address #j, ONU-specific-parameters for the individual ONUs 26#ij where j=1 to n are stored. The ONU-specific-parameters include an ONU number, a fixed-band portion, an in-buffer-information amount and a first past-use band variable. The ONU number is equal to the value of the subscript j and assigned to the ONUs 26#ij where j=1 to n. The fixed-band portion is a band allocated determinately to each of the ONUs 26#ij where j=1 to n. The in-buffer-information amount is a most recent in-buffer-information amount of each of the ONUs 26#ij where j=1 to n. The first past-use band variable indicates an individual shared band portion allocated to each of the ONUs 26#ij where j=1 to n in a previous band-updating operation.

The shared-band-polling-information-generating unit 78 generates as much polling information as indicated by the polling count for allocating an individual shared band portion to an ONU 26#ij as reported by the shared-band control unit 72. The polling information is generated for each of the ONUs 26#ij where j=1 to n in every band-updating period. The shared-band-polling-information-generating unit 78 writes the polling information into the shared-band-polling-information buffer 82. The fixed-band-polling-information-generating unit 80 reads out a fixed-band portion of each of the ONUs 26#ij where j=1 to n from the ONU-specific-parameter management table 76 and generates as much polling information as indicated by the polling count for allocating the fixed-band portion to an ONU 26#ij. The polling information is generated for each of the ONUs 26#ij where j=1 to n in every band-updating period. The fixed-band-polling-information-generating unit 80 writes the polling information into the fixed-band-polling-information buffer 84.

The shared-band-polling-information buffer 82 is a FIFO (First-In-First-Out) buffer for storing polling information for shared band portions. On the other hand, the fixed-band-polling-information buffer 84 is a FIFO buffer for storing polling information for fixed-band portion units. The polling-information-multiplexing unit 86 reads out polling information from the fixed-band-polling-information buffer 84 before reading polling information from the shared-band-polling-information buffer 82. As the fixed-band-polling-information buffer 84 becomes empty, the multiplexing unit 86 reads out polling information from the shared-band-polling-information buffer 82. The multiplexing unit 86 then assigns ONUs 26#ij to time slots in the ascending information frame.

The descending-information-multiplexing unit 88 receives descending information output by the switch unit 44 and polling information output by the multiplexing unit 86. The descending-information-multiplexing unit 88 inserts the descending information into a predetermined time slot and the polling information into typically a PLOAM cell prior to transmission.

Each of the ONUs 26#ij where j=1 to n comprises a polling-information-extracting unit 50, a buffer-reading unit 52, a fixed-band buffer 54, a shared-band buffer 56, an in-buffer-information-amount-extracting unit 58, a polling-request-generating unit 60 and ascending-information-multiplexing unit 62. The polling-information-extracting unit 50 extracts polling information received from the transmission line 27#i. The extracted polling information includes information for time-slot assignment and information for use by the ONU 26#ij to report an in-buffer-information amount to the SLT. Polling information destined for this ONU 26#ij is reported to the buffer-reading unit 52. Descending information destined for this ONU 26#ij is output to a user terminal connected to this ONU 26#ij such as the WS 24 or the TEL 28. The buffer-reading unit 52 reads out information from the fixed-band buffer 54 with a timing of an assigned time slot before reading out information from the shared-band buffer 56. As the fixed-band buffer 54 becomes empty, the buffer-reading unit 52 reads out information from the shared-band buffer 56.

The fixed-band buffer 54 is a buffer for storing high-priority information from a user terminal such as the WS 24 or the TEL 28. On the other hand, the shared-band buffer 56 is a buffer for storing low-priority information from a user terminal such as the WS 24 or the TEL 28. The in-buffer-information-amount-extracting unit 58 detects an in-buffer-information amount indicating the amount of information stored in the shared-band buffer 56 during a period shorter than the band-updating period. The polling-request-generating unit 60 generates a polling request signal by inserting the in-buffer-information amount into a detected time slot for an in-buffer-information amount in accordance with an in-buffer-information amount polling signal extracted by the polling-information-extracting unit 50. The ascending-information-multiplexing unit 62 multiplexes ascending information read out by the buffer-reading unit 52 and the polling request signal generated by the polling-request-generating unit 60, outputting a signal resulting from the multiplexing to the transmission line 27#i.

Figure 7:
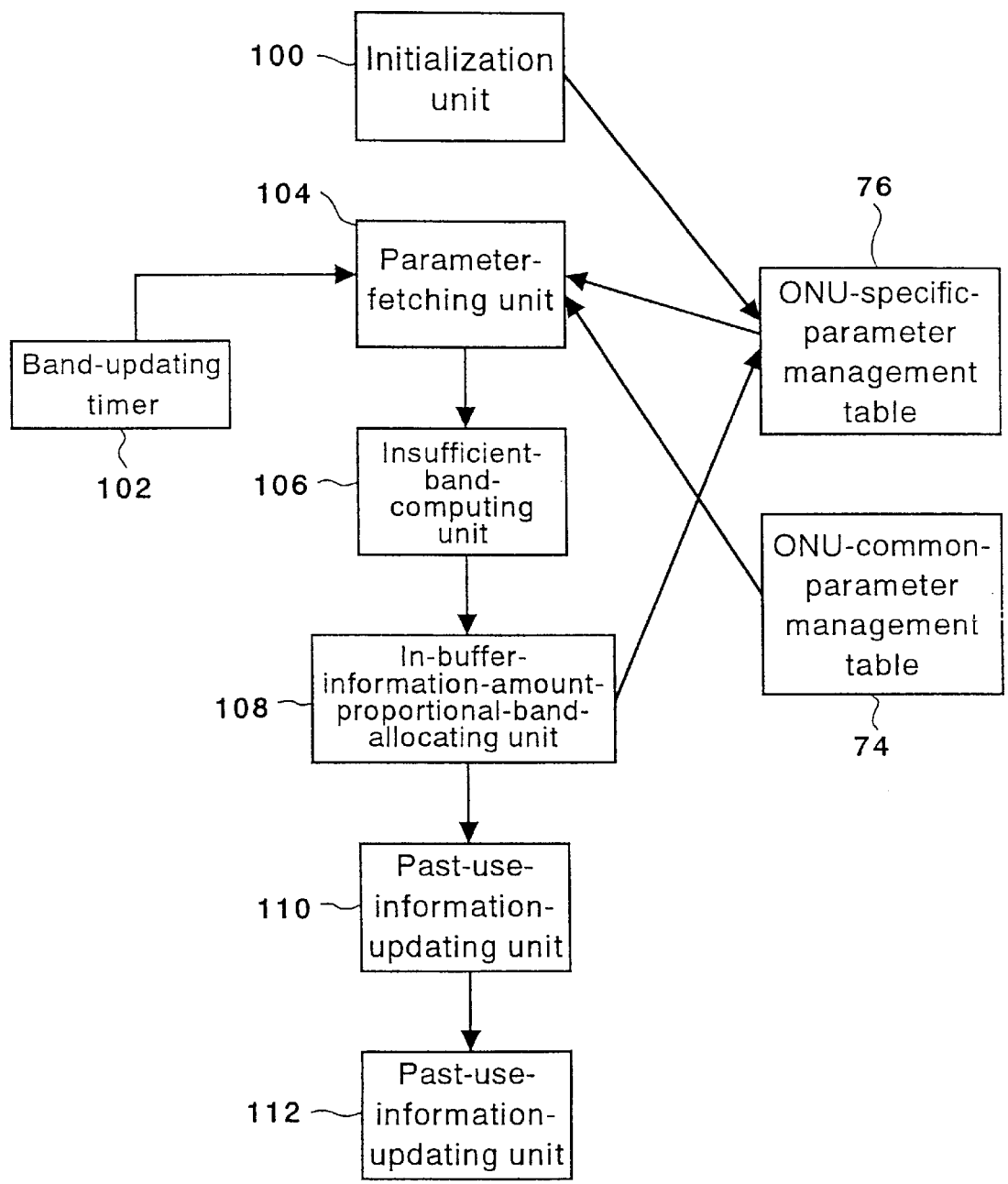
FIG. 7 is a functional block diagram showing a shared-band control unit employed in the ATM-PON IF unit shown in FIG. 4.

FIG. 7 is a functional block diagram showing the shared-band control unit 72 employed in the ATM-PON IF unit shown in FIG. 4. As shown in FIG. 7, the shared-band control unit 72 comprises an initialization unit 100, a band-updating timer 102, a parameter-fetching unit 104, an insufficient-band-computing unit 106, an in-buffer-information-amount-proportional-band-allocating unit 108, a past-use-band-allocating unit 110 and a past-use-information-updating unit 112.

The initialization unit 100 initializes the first past-use band variable of each of the ONUs 26#ij and stores the initialized variables into the ONU-specific-parameter management table 76. Typically, the first past-use band variable is initialized at an average value obtained as a result of division of the upper limit of the total shared band portion by n, that is, the number of ONUs 26#ij where j=1 to n. An average value is selected in order to give fair initial allocation of the band portions proportional to first past-use band variables. For each band-updating period, the band-updating timer 102 informs the parameter-fetching unit 104 that the band-updating period has lapsed. Notified of the lapsing event of the band-updating period by the band-updating timer 102, the parameter-fetching unit 104 reads out a variety of parameters from the ONU-common-parameter management table 74 and the ONU-specific-parameter management table 76, supplying the parameters to the insufficient-band-computing unit 106. The insufficient-band-computing unit 106 computes an insufficient band portion of the ONUs 26#ij in accordance with Eq. (2).

If the sum of the insufficient band portions allocated to all the ONUs 26#ij where j=1 to n is greater than the upper limit of the total shared band, the in-buffer-information-amount-proportional-band-allocating unit 108 multiplies each insufficient band portion by a coefficient f, which is found from the band-correcting function given by Eq. (3), to limit the insufficient band portion so that the sum of the insufficient band portions for all the ONUs 26#ij where j=1 to n becomes equal to or smaller than the upper limit of the total shared band. The product of the insufficient band of each of the ONUs 26#ij where j=1 to n and the coefficient f is used as a band portion proportional to an in-buffer-information amount for each of the ONUs 26#ij where j=1 to n.

If the sum of in-buffer-information-amount-proportional band portions allocated to all the ONUs 26#ij where j=1 to n is smaller than the upper limit of the total shared band, the past-use-band-allocating unit 110 carries out the following processing. First of all, the past-use-band-allocating unit 110 computes a band part of past use as a difference between the upper limit of the total shared band and the sum of in-buffer-information-amount-proportional band portions allocated to all the ONUs 26#ij where j=1 to n. Then, the past-use-band-allocating unit 110 computes a sum of first past-use band variables of all the ONUs 26#ij where j=1 to n. Subsequently, the past-use-band-allocating unit 110 computes a band portion proportional to the first past-use band variable for each of the ONUs 26#ij where j=1 to n. Finally, the past-use-band-allocating unit 110 allocates a past-use band portion to each of the ONUs 26#ij.

The sum of the band portion proportional to the in-buffer-information amount and the band portion proportional to the first past-use band variable, which are allocated to the ONUs 26#ij where j=1 to n by the in-buffer-information-amount-proportional-band-allocating unit 108 and the past-use-band-allocating unit 110 respectively as described above, is supplied to the shared-band-polling-information-generating unit 78 as an individual shared band portion.

The past-use-information-updating unit 112 updates the first past-use band variable of each of the ONUs 26#ij where j=1 to n in accordance with Eq. (4) and stores the updated first past-use band variables into the ONU-specific-parameter management table 76.

Figure 8:
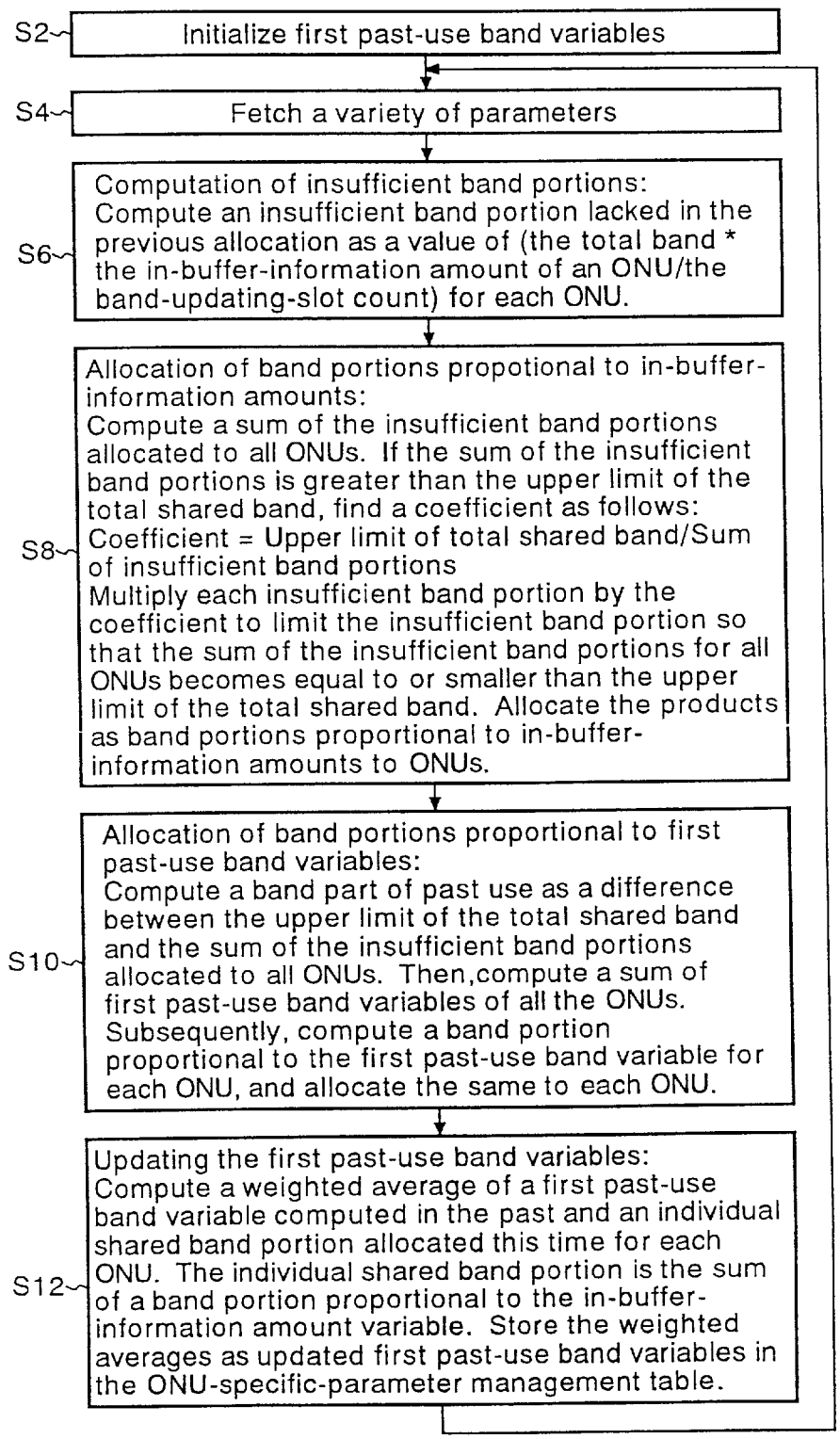
FIG. 8 shows a flowchart representing operations of the shared-band control unit.

FIG. 8 shows a flowchart representing operations of the shared-band control unit 72. The operation of the ATM-PON IF unit 40 is explained by referring to the flowchart shown in this figure as follows.

1: Initialization of the First Past-Use Band Variables

The flowchart shown in FIG. 8 begins with a step S2 at which the initialization unit 100 employed in the shared-band control unit 72 initializes the first past-use band variables and stores the initialized variables in the ONU-specific-parameter management table 76. As described above, the first past-use band variable is initialized typically at an average value obtained as a result of division of the upper limit of the total shared band portion by n, that is, the number of ONUs 26#ij where j=1 to n.

2: Extraction of In-Buffer-Information Amounts

The in-buffer-information-amount-extracting unit 58 employed in each of the ONUs 26#ij where j=1 to n detects an in-buffer-information amount representing the amount of ascending information low-priority information received from the user terminal and stored in the shared-band buffer 56, and reports the detected in-buffer-information amount to the polling-request-generating unit 60. The detected in-buffer-information amount is expressed in terms of time-slot units. The polling-request-generating unit 60 outputs the in-buffer-information amount with a timing indicated by polling information in an in-buffer-information-amount notification time slot extracted by the polling-information-extracting unit 50. The buffer-reading unit 52 reads out ascending information high-priority information from the fixed-band buffer 54 before reading out information from the shared-band buffer 56. As the fixed-band buffer 54 becomes empty, the buffer-reading unit 52 reads out ascending information from the shared-band buffer 56. Then, the buffer-reading unit 52 outputs the ascending information read out from the fixed-band buffer 54 and the shared-band buffer 56 with a timing indicated by polling information in an in-buffer-information-amount-notification time slot extracted by the polling-information-extracting unit 50.

The ascending-information-multiplexing unit 62 multiplexes the ascending information with the in-buffer-information amount, and outputs a signal obtained as a result of the multiplexing to the transmission line 27#i. The multiplexed signal comprising the ascending information and the in-buffer-information amount is transmitted through the transmission line 27#i and merged with signals transmitted by other ONUs 26#ij in the splitter 23#i. A signal resulting from the merging is then supplied to the polling-request-extracting unit 70 employed in an ATM-PON IF unit 40 of the SLT 20. Each polling-request-extracting unit 70 extracts the ascending information and the in-buffer-information amount destined for the polling-request-extracting unit 70. The ascending information is supplied to the switch unit 44 whereas the in-buffer-information amount is stored into the ONU-specific-parameter management table 76 at an address #j corresponding to each of the ONUs 26#ij where j=1 to n transmitting the ascending information and the in-buffer-information amount.

3: Allocation of the Shared Band 3-1: For each band-updating period, the band-updating timer 102 informs the parameter-fetching unit 104 that the band-updating period has lapsed.

3-2: At a step S4 of the flowchart shown in FIG. 8, the parameter-fetching unit 104 retrieves a total band of 5,000, a total shared band upper limit of 2,000, a band-updating slot count of 1,500, a weight of 1 for a presently allocated individual shared band portion and a weight of 3 for a previously calculated first past-use band variable from the ONU-common-parameter management table 74 shown in FIG. 5. The parameter-fetching unit 104 also retrieves an ONU number, an in-buffer-information amount and a first past-use band variable for each of the ONUs 26#ij where j=1 to n from the ONU-specific-parameter management table 76 shown in FIG. 6.

3-3: At a step S6 of the flowchart shown in FIG. 8, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

Figure 9:
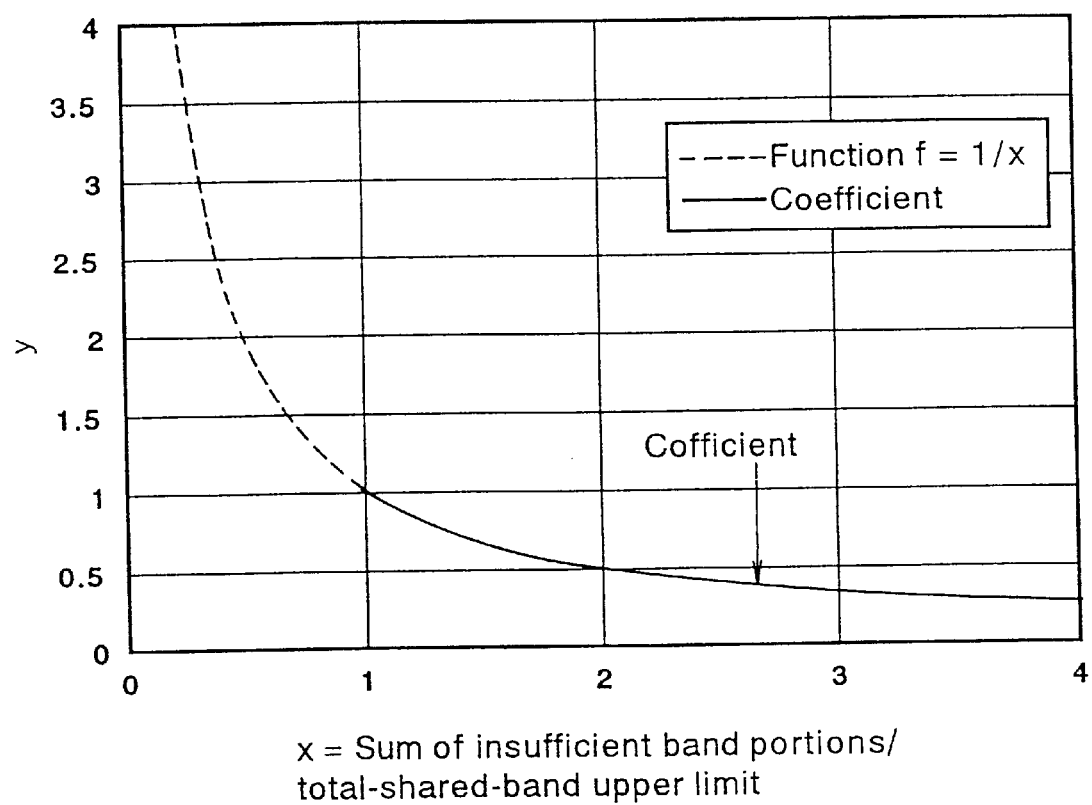
FIG. 9 is a diagram showing a curve representing the value of a coefficient y as a function of a variable.

3-4: At a step S8 of the flowchart shown in FIG. 8, the in-buffer-information-amount-proportional-band-allocating unit 108 carries out the following processing. First of all, the in-buffer-information-amount-proportional-band-allocating unit 108 computes a sum of the insufficient band portions allocated to all of the ONUs 26#ij where j=1 to n. If the sum of the insufficient band portions allocated to all the ONUs 26#ij where j=1 to n is greater than the upper limit of the total shared band, the in-buffer-information-amount-proportional-band-allocating unit 108 finds a coefficient y from a band-correcting function f(x)=1/x given by Eq. (3) where x is a ratio of the sum of the insufficient band portions allocated to all the ONUs 26#ij where j=1 to n to the upper limit of the total shared band. FIG. 9 is a diagram showing a curve representing the value of a coefficient y as a function of x. Since the sum of the insufficient band portions allocated to all the ONUs 26#ij where j=1 to n is greater than the upper limit of the total shared band, x is greater than unity (x>1). Thus, the coefficient y=1/x has a value not exceeding 1 as shown by a solid line in FIG. 9. Then, the in-buffer-information-amount-proportional-band-allocating unit 108 multiplies each insufficient band portion by the coefficient y, which is found from the band-correcting function f(x), to limit the insufficient band portion so that the sum of the insufficient band portions for all the ONUs 26#ij where j=1 to n becomes equal to the upper limit of the total shared band. The product of the insufficient band of each of the ONUs 26#ij where j=1 to n and the coefficient y is used as a band portion proportional to an in-buffer-information amount to each of the ONUs 26#ij where j=1 to n.

3-5: If the sum of the insufficient band portions allocated to all the ONUs 26#ij where j=1 to n is smaller than the upper limit of the total shared band, the past-use-band-allocating unit 110 carries out the following processing at a step S10 of the flowchart shown in FIG. 8. An insufficient band portion allocated to any of the ONUs 26#ij in the following description is a band portion proportional to an in-buffer-information amount of the ONU 26#ij. First of all, the past-use-band-allocating unit 110 computes a band part of past use as a difference between the upper limit of the total shared band and the sum of the insufficient band portions allocated to all the ONUs 26#ij where j=1 to n. Then, the past-use-band-allocating unit 110 computes a sum of first past-use band variables of all the ONUs 26#ij. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. Since each first past-use band variable reflects an individual shared band portion allocated in the past, the band portion proportional to a first past-use band variable does not change abruptly even if the in-buffer-information amount changes all of a sudden.

Figure 10:
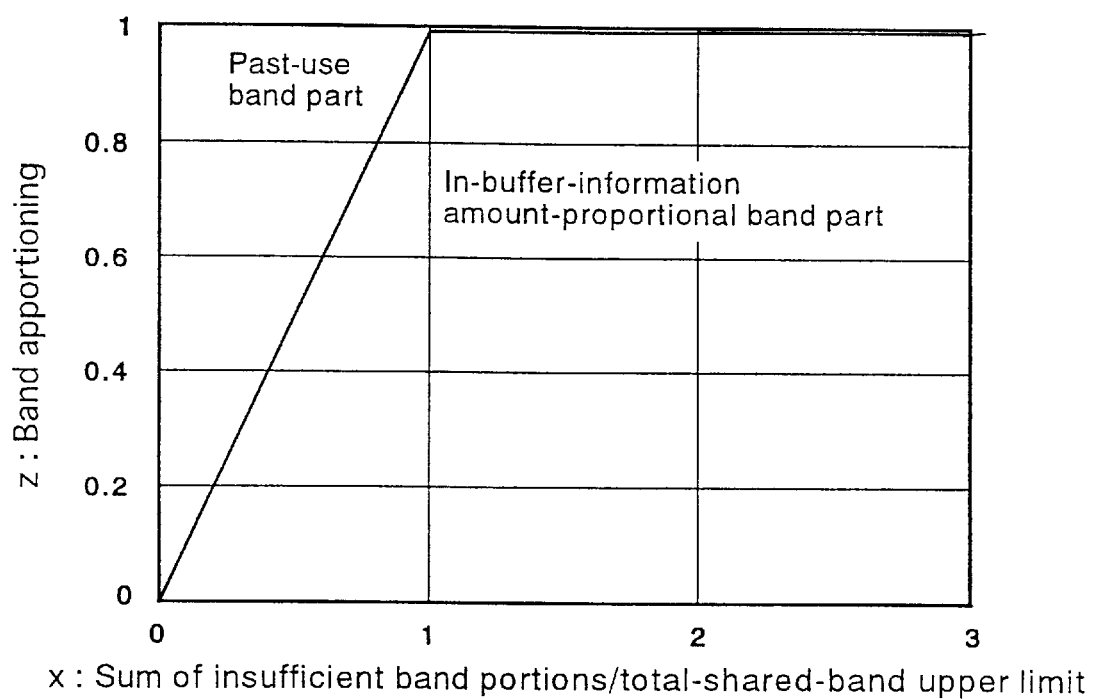
FIG. 10 is a diagram showing apportioning of a shared band.

FIG. 10 is a diagram showing apportioning of the shared band into a band part of past use and a band part proportional to an in-buffer-information amount with an apportioning ratio expressed as a function of x where x is the ratio of the sum of the insufficient band portions allocated to all the ONUs 26#ij where j=1 to n to the upper limit of the total shared band. As shown in FIG. 10, if the sum of the insufficient band portions allocated to all the ONUs 26#ij where j=1 to n is greater than the upper limit of the total shared band (x>1), all the shared band is allocated as band portions proportional to in-buffer-information amounts to all the ONUs 26#ij where j=1 to n. If the sum of the insufficient band portions allocated to all the ONUs 26#ij where j=1 to n is smaller than the upper limit of the total shared band (x<1), on the other hand, the shared band is apportioned into a band part proportional to in-buffer-information amounts (or the part below the curve) and a band part of past use proportional to first past-use band variables (or the part above the curve). That is to say, the remaining band, that is, the difference between the sum of the insufficient band portions allocated to all the ONUs 26#ij where j=1 to n and the upper limit of the total shared band, is allocated as a band part of past use. The band part proportional to in-buffer-information amounts (or the part below the curve) and the band part proportional to first past-use band variables are allocated to each of the ONUs 26#ij where j=1 to n as an individual shared band portion.

FIG. 11 is a diagram showing a typical result of allocation of the shared band obtained by simulation. It should be noted that the simulation was carried out by assuming that the total band is all used as a shared band. As is obvious from FIG. 11, a phenomenon exhibiting large vibration of the allocation polling count of an ONU with the lapse of time in the vertical direction of the table is not observed for each ONU.

3-6: At a step S12 of the flowchart shown in FIG. 8, the past-use-information-updating unit 112 computes a weighted average of a first past-use band variable computed in the past and an individual shared band portion allocated this time for each of the ONUs 26#ij where j=1 to n in accordance with Eq. (4). As described earlier, the individual shared band portion is the sum of a band portion proportional to an in-buffer-information amount and a band portion proportional to a first past-use band variable. The weighted averages are stored each as an updated first past-use band variable in the ONU-specific-parameter management table 76. Also as described earlier, the individual shared band portion, that is, the sum of a band portion proportional to the in-buffer-information amount and a band portion proportional to a first past-use band variable, which are allocated to each of the ONUs 26#ij where j=1 to n, is reported to the shared-band-polling-information-generating unit 78.

4: The shared-band-polling-information-generating unit 78 generates as much polling information as indicated by the polling count for allocating an individual shared band portion to an ONU 26#ij as reported by the shared-band control unit 72. The polling information is generated for each of the ONUs 26#ij where j=1 to n in every band-updating period. The shared-band-polling-information-generating unit 78 writes the polling information into the shared-band-polling-information buffer 82.

5: The fixed-band-polling-information-generating unit 80 reads out a fixed band portion of each of the ONUs 26#ij where j=1 to n from the ONU-specific-parameter management table 76 and generates as much polling information as indicated by the polling count for allocating the fixed-band portion to an ONU 26#ij. The polling information is generated for each of the ONUs 26#ij where j=1 to n in every band-updating period. The fixed-band-polling-information-generating unit 80 writes the polling information into the fixed-band-polling-information buffer 84.

6: The polling-information-multiplexing unit 86 reads out polling information from the fixed-band-polling-information buffer 84 before reading polling information from the shared-band-polling-information buffer 82. As the fixed-band-polling-information buffer 84 becomes empty, the multiplexing unit 86 reads out polling information from the shared-band-polling-information buffer 82. The multiplexing unit 86 then assigns ONUs 26#ij to time slots in the ascending information frame.

7: The descending-information-multiplexing unit 88 receives descending information output by the switch unit 44 and polling information output by the multiplexing unit 86. The descending-information-multiplexing unit 88 inserts the descending information into a predetermined time slot and the polling information into typically a PLOAM cell of a descending signal prior to transmission of the descending signal through the transmission line 25#i. The descending signal is split at the splitter 23#i to transmission lines 27#i connected to the ONUs 26#ij where j=1 to n.

As described above, in the first embodiment, first of all, shared band portions lacked in the previous allocation are allocated. The remaining shared band is allocated as band portions proportional to first past-use band variables. Each of the first past-use band variables is always updated to a weighted average of a first past-use band variable computed in the past and an individual shared band portion allocated this time. An individual shared band portion is the sum of a band portion proportional to the in-buffer-information amount and a band portion proportional to a first past-use band variable. Since each first past-use band variable reflects an individual shared band portion allocated in the past, the allocated band portion proportional to a first past-use band variable does not change abruptly even if the in-buffer-information amount changes all of a sudden. Thus, it is possible to suppress the problem of the band-vibration phenomenon encountered in the conventional method. As a result, it is also possible to eliminate the vibration of the size of a buffer employed in each of ONUS, which causes a fluctuation and a delay in arrival time of information such as sounds and motion pictures so that the quality of the real-time services can be improved. In addition, it is possible to get rid of a cost of adding an extra circuit for suppressing the vibration of the amount of incoming traffic to the SLT.

Second Embodiment

Figure 12:
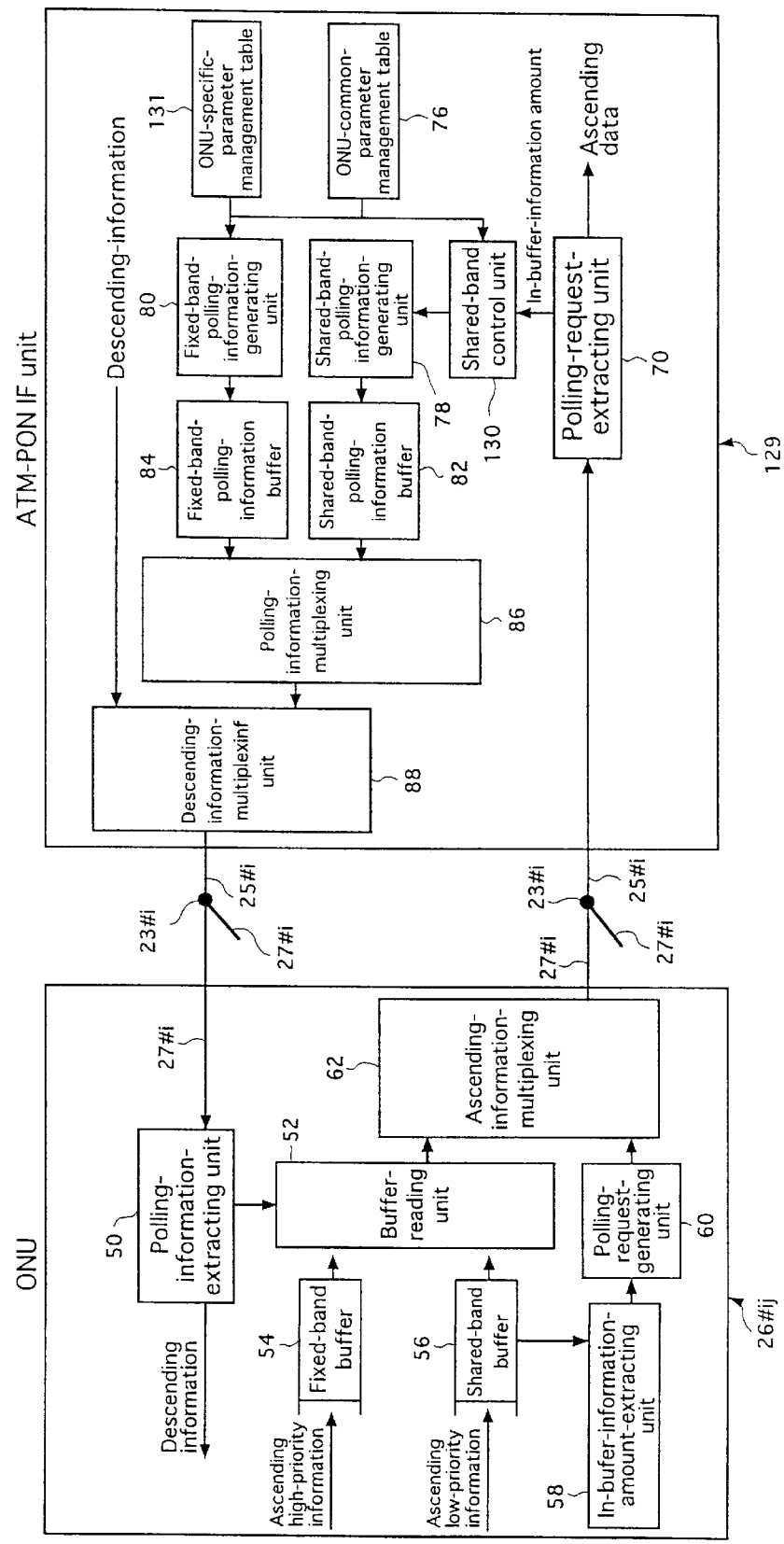
FIG. 12 is a functional block diagram showing an ATM-PON IF unit implemented by a second embodiment of the present invention.

FIG. 12 is a functional block diagram showing an ATM-PON IF unit 129 implemented by a second embodiment of the present invention. Components of the second embodiment virtually identical with those employed in the first embodiment shown in FIG. 4 are denoted by the same reference numerals as the latter. The ATM-PON IF unit 129 implemented by a second embodiment is different from the ATM-PON IF unit 40 implemented by the first embodiment in that, in the case of the second embodiment, an upper limit is set for an individual shared band portion allocated to each of the ONUs 26#ij where j=1 to n, and an individual shared band portion allocated to an ONU 26#ij is always set at a value not exceeding the upper limit. By the same token, a shared-band control unit 130 implemented by a second embodiment is different from the shared-band control unit 72 employed in the ATM-PON IF unit 40 shown in FIG. 4 in that the shared-band control unit 130 limits an individual shared band portion allocated to each of the ONUs 26#ij where j=1 to the upper limit.

Figure 13:
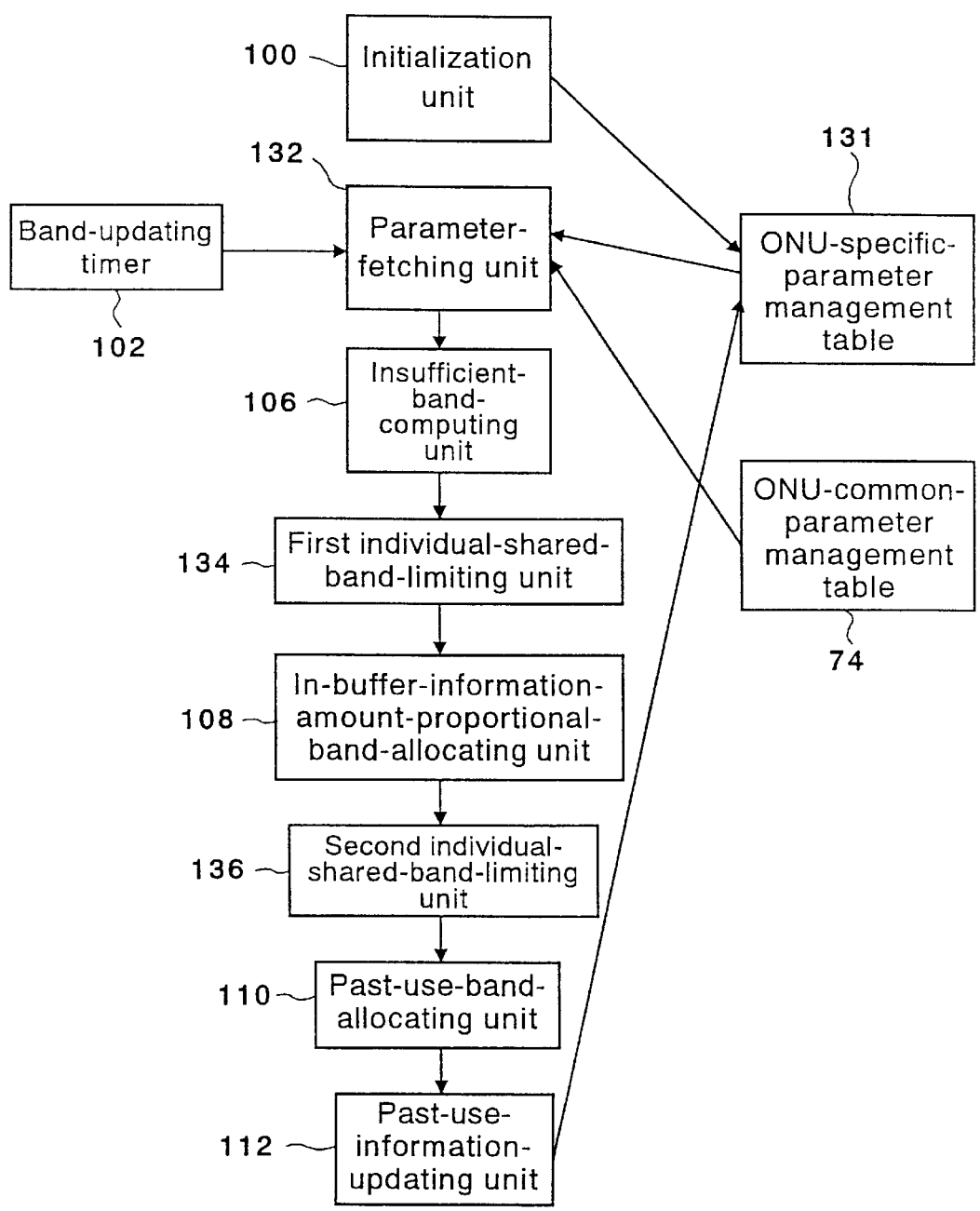
FIG. 13 is a functional block diagram showing a shared-band control unit employed in the ATM-PON IF unit shown in FIG. 12.

FIG. 13 is a functional block diagram showing the shared-band control unit 130 employed in the ATM-PON IF unit 129 shown in FIG. 12. Components of the shared-band control unit 130 virtually identical with those employed in the shared-band control unit 72 shown in FIG. 7 are denoted by the same reference numerals as the latter. A parameter-fetching unit 132 is different from the parameter-fetching unit 104 shown in FIG. 7 in that the parameter-fetching unit 132 also fetches the upper limit of the individual shared band portion allocated to each of the ONUs 26#ij where j=1 to n from an ONU-specific-parameter management table 131 in addition to a variety of parameters fetched by the parameter-fetching unit 104. A first individual-shared-band-limiting unit 134 sets an insufficient band portion to be allocated to each of the ONUs 26#ij where j=1 to n at the upper limit of the individual shared band portion if the portion exceeds the limit. On the other hand, a second individual-shared-band-limiting unit 136 sets an in-buffer-information-amount-proportional band portion allocated by the in-buffer-information-amount-proportional-band-allocating unit 108 at the upper limit of the individual shared band portion if the portion exceeds the limit.

FIG. 14 is a diagram showing the configuration of the ONU-specific-parameter management table 131 used in the ATM-PON IF unit 129 shown in FIG. 12. As shown in FIG. 14, in addition to the information stored in the ONU-specific-parameter management table 76 shown in FIG. 6, the ONU-specific-parameter management table 131 includes the upper limit of an individual shared band portion for each of the ONUs 26#ij where j=1 to n. Each of the ONUs 26#ij where j=1 to n may handle UDP traffic with an increasing in-buffer-information amount and TCP traffic with an in-buffer-information amount controlled to a limit. In such a case, it is feared that the shared band is monopolized by ONUs 26#ij, which handle UDP traffic with an increasing in-buffer-information amount. For this reason, an upper limit is set for each of individual shared band portions allocated to such ONUs 26#ij.

By setting such upper limits, a larger individual shared band portion can be allocated to each of the ONUs 26#ij handling only TCP traffic, allowing fair band allocation to be sustained. An upper limit of an individual shared band portion can be set for each of the ONUS 26#ij where j=1 to n. Thus, in dependence on operation requirements, an upper limit of an individual shared band portion can be set not only for an ONU 26#ij handling UDP traffic, but of course for an ONU 26#ij handling other traffic such as the TCP traffic. In addition, normally, a communication business enterprise makes a contract setting a PCR (a maximum band) for each connection with the user or the subscriber. If the upper limit of an individual shared band portion is set at a sum of PCRs, it will be possible to limit the amount of traffic even if the traffic would exceed a limit prescribed by the contract. Thus, there will be no effect on other users, who abide by the contract.

Figure 15:
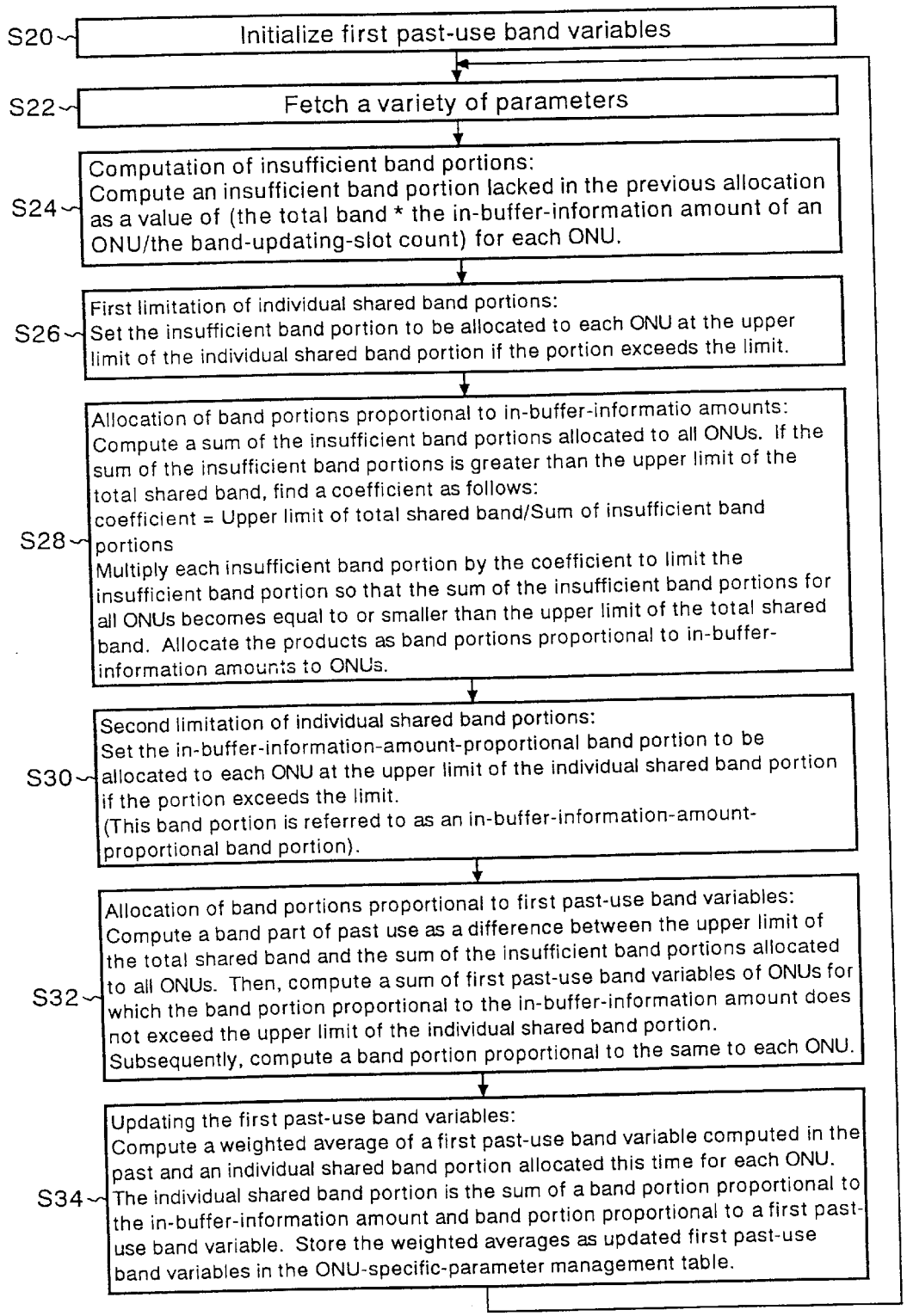
FIG. 15 shows a flowchart representing operations of the shared-band control unit.

FIG. 15 shows a flowchart representing operations of the shared-band control unit 130. Since the operations of the blocks employed in the ATM-PON IF unit 129 shown in FIG. 12 except the shared-band control unit 130 and the ONU-specific-parameter management table 131 are virtually the same as their counterparts shown in FIG. 4, only the operation of the shared-band control unit 130 shown in FIG. 13 is explained by referring to the flowchart shown in FIG. 15 as follows.

1: Initialization of the First Past-Use Band Variables

The flowchart shown in FIG. 15 begins with a step S20 at which the initialization unit 100 employed in the shared-band control unit 130 initializes the first past-use band variables and stores the initialized variables in the ONU-specific-parameter management table 76.

2: Allocation of the Shared Band 2-1: For each band-updating period, the band-updating timer 102 informs the parameter-fetching unit 132 that the band-updating period has lapsed.

2-2: At a step S22 of the flowchart shown in FIG. 15, the parameter-fetching unit 132 retrieves a total band of 5,000, a total shared band upper limit of 2,000, a band-updating slot count of 1,500, a weight of 1 for a presently allocated individual shared band portion and a weight of 3 for a previously calculated first past-use band variable from the ONU-common-parameter management table 74 shown in FIG. 5. The parameter-fetching unit 132 also retrieves an ONU number, an upper limit of an individual shared band, an in-buffer-information amount and a first past-use band variable for each of the ONUs 26#ij where j=1 to n from the ONU-specific-parameter management table 131 shown in FIG. 14.

2-3: At a step S24 of the flowchart shown in FIG. 15, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S26 of the flowchart shown in FIG. 15, the first individual-shared-band-limiting unit 134 sets the insufficient band portion to be allocated to each of the ONUs 26#ij where j=1 to n at the upper limit of the individual shared band portion if the portion exceeds the limit. In the case of the ONU 26#i1, for example, the upper limit of the individual shared band portion is 1,000 as shown in the ONU-specific-parameter management table 131 of FIG. 14. In this case, the first individual-shared-band-limiting unit 134 sets the insufficient band portion to be allocated to the ONU 26#i1 at 1,000.

2-5: At a step S28 of the flowchart shown in FIG. 15, the in-buffer-information-amount-proportional-band-allocating unit 108 carries out the following processing. First of all, the in-buffer-information-amount-proportional-band-allocating unit 108 computes a sum of the insufficient band portions allocated to all of the ONUs 26#ij where j=1 to n. If the sum of the insufficient band portions allocated to all the ONUs 26#ij where j=1 to n is greater than the upper limit of the total shared band, the in-buffer-information-amount-proportional-band-allocating unit 108 finds a coefficient y from a band-correcting function f(x)=1/x given by Eq. (3) where x is a ratio of the sum of the insufficient band portions allocated to all the ONUs 26#ij where j=1 to n to the upper limit of the total shared band. Then, the in-buffer-information-amount-proportional-band-allocating unit 108 multiplies each insufficient band portion by the coefficient y, which is found from the band-correcting function f(x), to limit the insufficient band portion so that the sum of the insufficient band portions for all the ONUs 26#ij where j=1 to n becomes equal to or smaller than the upper limit of the total shared band. The product of the insufficient band portion of each of the ONUs 26#ij where j=1 to n and the coefficient y is used as an in-buffer-information-amount-proportional band portion, which is proportional to the in-buffer-information amount, to each of the ONUs 26#ij where j=1 to n.

2-6: At a step S30 of the flowchart shown in FIG. 15, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-7: If the sum of the insufficient band portions allocated to all the ONUs 26#ij where j=1 to n is smaller than the upper limit of the total shared band, the past-use-band-allocating unit 110 carries out the following processing at a step S32 of the flowchart shown in FIG. 15. First of all, the past-use-band-allocating unit 110 computes a band part of past use as a difference between the upper limit of the total shared band and the sum of the insufficient band portions allocated to all the ONUs 26#ij where j=1 to n. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. At that time, the sum of the band portion proportional to the in-buffer-information amount and the band portion proportional to a first past-use band variable is limited so as not to exceed the upper limit of the individual shared band portion for the ONU 26#ij.

2-8: At a step S34 of the flowchart shown in FIG. 15, the past-use-information-updating unit 112 computes a weighted average of a first past-use band variable computed in the past and an individual shared band portion allocated this time for each of the ONUS 26#ij where j=1 to n in accordance with Eq. (4). As described earlier, the individual shared band portion is the sum of a band portion proportional to the in-buffer-information amount and a band portion proportional to a first past-use band variable. The weighted averages are stored each as an updated first past-use band variable in the ONU-specific-parameter management table 76. Also as described earlier, the individual shared band portion, that is, the sum of a band portion proportional to the in-buffer-information amount and a band portion proportional to a first past-use band variable, which are allocated to each of the ONUs 26#ij where j=1 to n, is reported to the shared-band-polling-information-generating unit 78. In this case, the individual shared band portion allocated to each of the ONUs 26#ij where j=1 to n does not exceed the upper limit thereof.

As described above, in addition to the effects provided by the first embodiment, the second embodiment also exhibits the following effect. By setting an upper limit of an individual shared band portion for each ONU, it is no longer feared that that the shared band is monopolized by ONUS, which each handle UDP traffic with an increasing in-buffer-information amount. That is to say, since shared-band portions are also properly allocated to ONUS each handling TCP traffic only, fair band allocation of band portions among ONUS is maintained.

Third Embodiment

Figure 16:
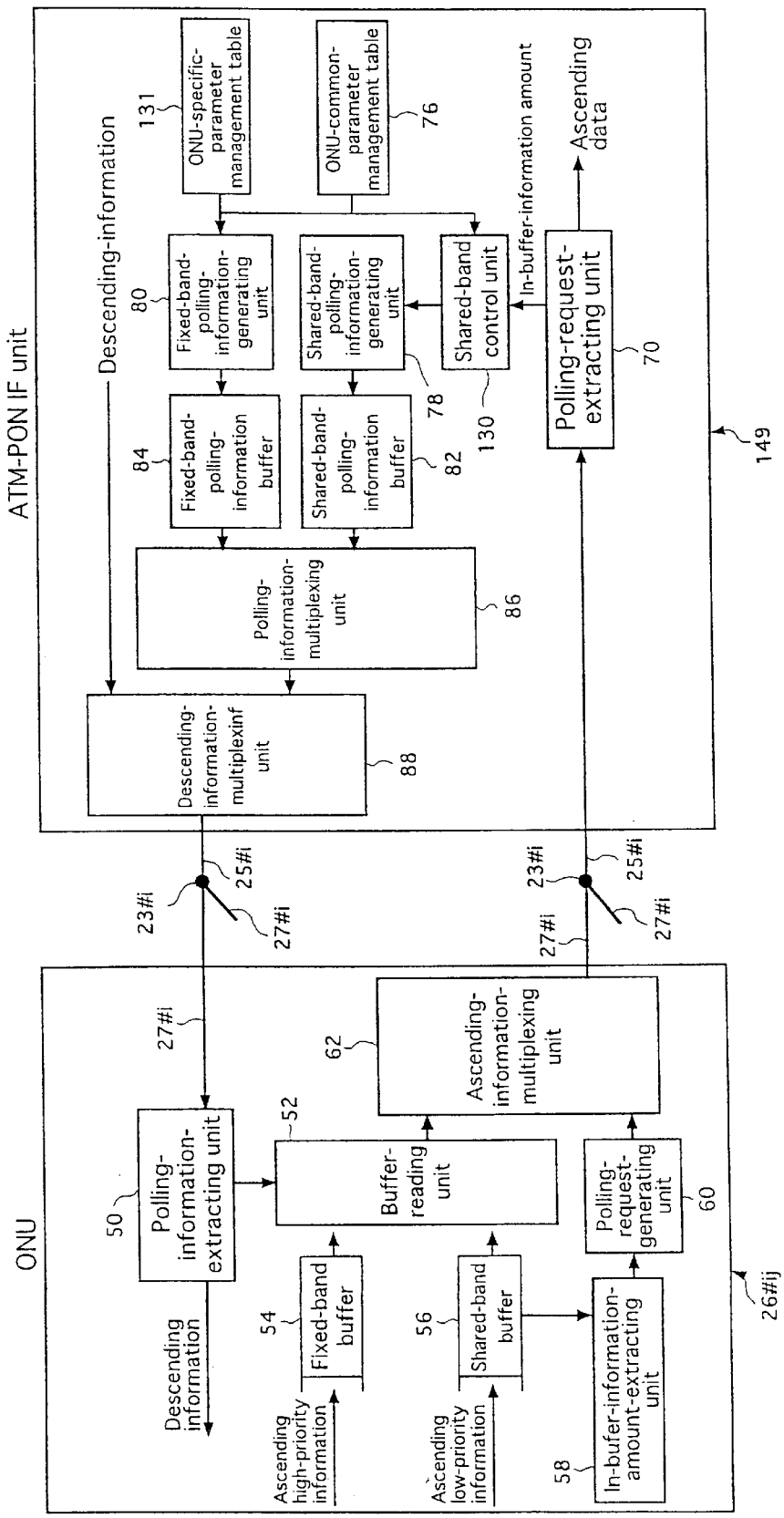
FIG. 16 is a functional block diagram showing an ATM-PON IF unit implemented by a third embodiment of the present invention.

FIG. 16 is a functional block diagram showing an ATM-PON IF unit 149 implemented by a third embodiment of the present invention. Components of the third embodiment virtually identical with those employed in the second embodiment shown in FIG. 12 are denoted by the same reference numerals as the latter. The ATM-PON IF unit 149 implemented by a third embodiment is different from the ATM-PON IF unit 129 implemented by the second embodiment in that, in the case of the third embodiment, if an insufficient band portion computed from an in-buffer-information amount for any of the ONUS 26#ij where j=1 to n is greater than a first threshold value but smaller than a second threshold value, the insufficient band portion is raised to the second one.

In the case of TCP traffic, flow control among user terminals is executed. Thus, an in-buffer-information amount does not show a polling count for the insufficient band portion. In TCP traffic, flow control among user terminals determines a transmission rate. Therefore, if the insufficient band portion increases, the transmission rate also increases accordingly. For this reason, allocation of a band portion exceeding the insufficient band portion computed from an in-buffer-information amount is considered to be efficient allocation. Thus, if an insufficient band portion computed from an in-buffer-information amount for any of the ONUs 26#ij where j=1 to n is greater than a first threshold value but smaller than a second threshold value, the insufficient band portion is raised to the second one.

Figure 17:
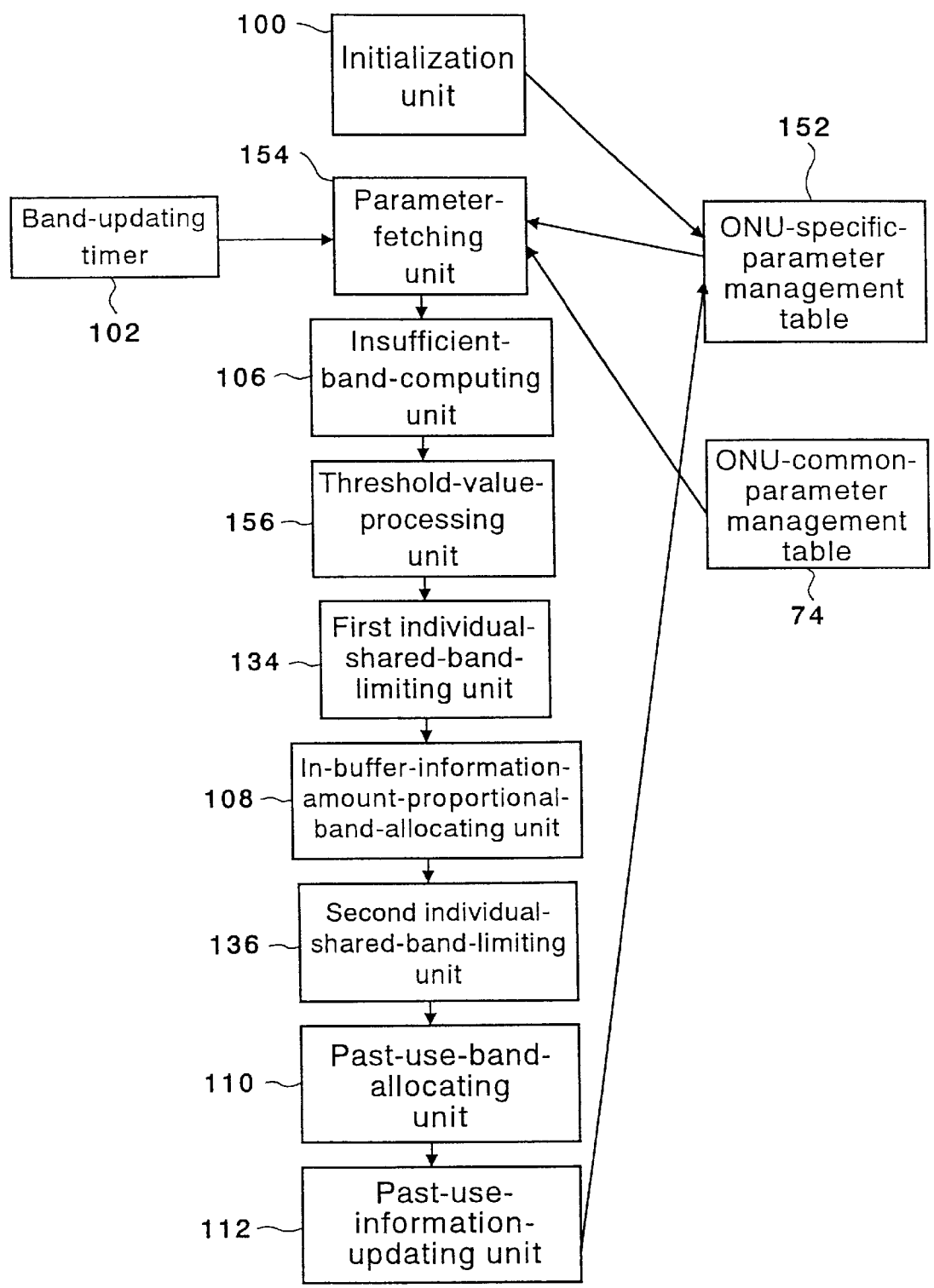
FIG. 17 is a functional block diagram showing a shared-band control unit employed in the ATM-PON IF unit shown in FIG. 16.

FIG. 17 is a functional block diagram showing a shared-band control unit 150 employed in the ATM-PON IF unit 149 shown in FIG. 16. Components of the shared-band control unit 150 virtually identical with those employed in the shared-band control unit 130 shown in FIG. 13 are denoted by the same reference numerals as the latter. A parameter-fetching unit 154 is different from the parameter-fetching unit 132 shown in FIG. 13 in that the unit 154 also fetches the first and second threshold values for each of the ONUs 26#ij where j=1 to n from an ONU-specific-parameter management table 152 in addition to a variety of parameters fetches by the parameter-fetching unit 132. A threshold-value-processing unit 156 increases an insufficient band portion to the second threshold value if the insufficient band portion computed from an in-buffer-information amount for any of the ONUs 26#ij where j=1 to n is greater than the first threshold value but smaller than the second one.

FIG. 18 is a diagram showing the configuration of the ONU-specific-parameter management table 152 used in the ATM-PON IF unit 149 shown in FIG. 16. As shown in FIG. 18, the ONU-specific-parameter management table 152 also includes first and second threshold values for each of the ONUs 26#ij where j=1 to n in addition to the parameters cataloged in the ONU-specific-parameter management table 131. First and second threshold values are set for each of the ONUs 26#ij where j=1 to n in order to allow finer control to be executed in accordance with factors such as a fixed band portion allocated to each of the ONUs 26#ij where j=1 to n.

FIG. 19 shows a flowchart representing operations of the shared-band control unit 150. Since the operations of the blocks employed in the ATM-PON IF unit 149 shown in FIG. 16 except the shared-band control unit 150 and the ONU-specific-parameter management table 152 are virtually the same as their counterparts shown in FIG. 12, only the operation of the shared-band control unit 150 shown in FIG. 17 is explained by referring to the flowchart shown in FIG. 19 as follows.

1: Initialization of First Past-Use Band Variables

The flowchart shown in FIG. 19 begins with a step S40 at which the initialization unit 100 employed in the shared-band control unit 150 initializes the first past-use band variables and stores the initialized variables in the ONU-specific-parameter management table 152.

2: Allocation of the Shared Band 2-1: For each band-updating period, the band-updating timer 102 informs the parameter-fetching unit 154 that the band-updating period has lapsed.

2-2: At a step S42 of the flowchart shown in FIG. 19, the parameter-fetching unit 152 retrieves a total band of 5,000, a total shared band upper limit of 2,000, a band-updating slot count of 1,500, a weight of 1 for a presently allocated individual shared band portion and a weight of 3 for a previously calculated first past-use band variable from the ONU-common-parameter management table 74 shown in FIG. 6. The parameter-fetching unit 152 also retrieves an ONU number, an upper limit of an individual shared band, an in-buffer-information amount, a first past-use band variable, a first threshold value and a second threshold value for each of the ONUs 26#ij where j=1 to n from the ONU-specific-parameter management table 152 shown in FIG. 18.

2-3: At a step S44 of the flowchart shown in FIG. 19, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S46 of the flowchart shown in FIG. 19, the threshold-value-processing unit 156 increases an insufficient band portion to a second threshold value if the insufficient band portion is greater than a first threshold value but smaller than the second threshold value for each of the ONUs 26#ij where j=1 to n. In the following description, both an insufficient band portion increased to a second threshold value and an insufficient band portion not increased to a second threshold value are referred to as an insufficient band portion.

2-5: At a step S48 of the flowchart shown in FIG. 19, the first individual-shared-band-limiting unit 134 sets the insufficient band portion to be allocated to each of the ONUs 26#ij where j=1 to n at the upper limit of the individual shared band portion if the portion exceeds the limit.

2-6: At a step S50 of the flowchart shown in FIG. 19, the in-buffer-information-amount-proportional-band-allocating unit 108 carries out the following processing. First of all, the in-buffer-information-amount-proportional-band-allocating unit 108 computes a sum of the insufficient band portions allocated to all of the ONUs 26#ij where j=1 to n. If the sum of the insufficient band portions allocated to all the ONUs 26#ij where j=1 to n is greater than the upper limit of the total shared band, the in-buffer-information-amount-proportional-band-allocating unit 108 finds a coefficient y from a band-correcting function $f(x)=1/x$ given by Eq. (3) where x is a ratio of the sum of the insufficient band portions allocated to all the ONUs 26#ij where j=1 to n to the upper limit of the total shared band. Then, the in-buffer-information-amount-proportional-band-allocating unit 108 multiplies each insufficient band portion by the coefficient y, which is found from the band-correcting function f, to limit the insufficient band portion so that the sum of the insufficient band portions for all the ONUs 26#ij where j=1 to n becomes equal to or smaller than the upper limit of the total shared band. The product of the insufficient band of each of the ONUs 26#ij where j=1 to n and the coefficient y is used as an in-buffer-information-amount-proportional band portion, which is proportional to the in-buffer-information amount, to each of the ONUs 26#ij where j=1 to n.

2-7: At a step S52 of the flowchart shown in FIG. 19, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-8: If the sum of the insufficient band portions allocated to all the ONUs 26#ij where j=1 to n is smaller than the upper limit of the total shared band, the past-use-band-allocating unit 110 carries out the following processing at a step S54 of the flowchart shown in FIG. 19. First of all, the past-use-band-allocating unit 110 computes a band part of past use as a difference between the upper limit of the total shared band and the sum of the insufficient band portions allocated to all the ONUs 26#ij where j=1 to n. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. At that time, the sum of the band portion proportional to the in-buffer-information amount and the band portion proportional to a first past-use band variable is limited so as not to exceed the upper limit of the individual shared band portion allocated to the ONU 26#ij.

2-9: At a step S56 of the flowchart shown in FIG. 19, the past-use-information-updating unit 112 computes a weighted average of a first past-use band variable computed in the past and an individual shared band portion allocated this time for each of the ONUs 26#ij where j=1 to n in accordance with Eq. (4). As described earlier, the individual shared band portion is the sum of a band portion proportional to the in-buffer-information amount and a band portion proportional to a first past-use band variable. The weighted averages are stored each as an updated first past-use band variable in the ONU-specific-parameter management table 76. Also as described earlier, the individual shared band portion, that is, the sum of a band portion proportional to the in-buffer-information amount and a band portion proportional to a first past-use band variable, which are allocated to each of the ONUS 26#ij where j=1 to n, is reported to the shared-band-polling-information-generating unit 78.

As described above, in addition to the effects provided by the second embodiment, the third embodiment also exhibits the following effect. For an ONU handling TCP traffic, if an insufficient band portion computed from an in-buffer-information amount for the ONU is greater than a first threshold value but smaller than a second threshold value, the insufficient band portion is raised to the second one. Thus, the insufficient band portion allocated to the ONU is increased, resulting in a raised transmission rate of the TCP traffic.

Fourth Embodiment

Figure 20:
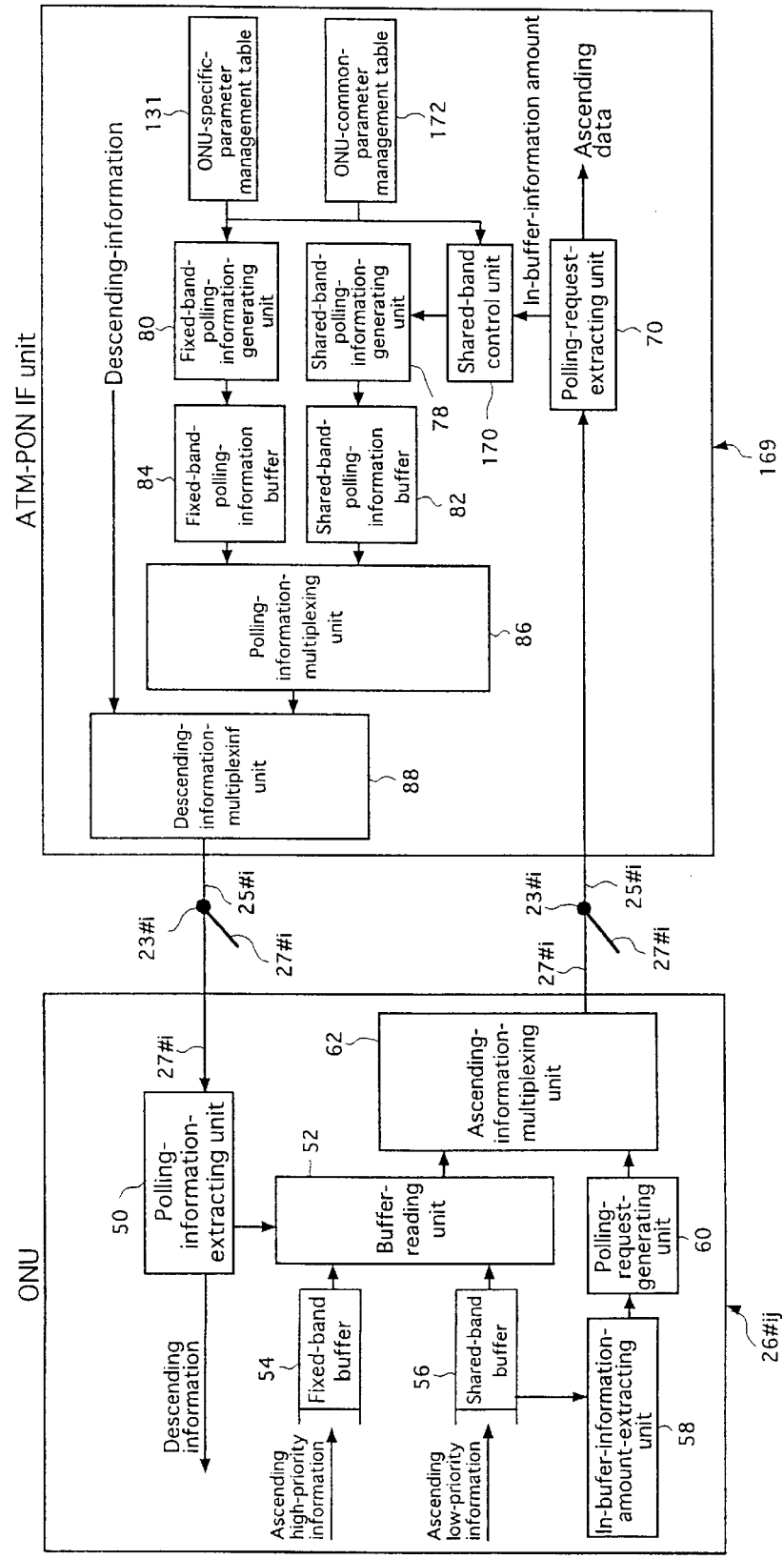
FIG. 20 is a functional block diagram showing an ATM-PON IF unit implemented by a fourth embodiment of the present invention.

FIG. 20 is a functional block diagram showing an ATM-PON IF unit 169 implemented by a fourth embodiment of the present invention. Components of the fourth embodiment virtually identical with those employed in the second embodiment shown in FIG. 12 are denoted by the same reference numerals as the latter. The ATM-PON IF unit 169 implemented by the fourth embodiment increases the band portion proportional to the in-buffer-information amount more than the first embodiment by decreasing the band portion proportional to a first past-use band variable if the sum of the insufficient band portions computed from in-buffer-information amounts of the ONUs 26#ij where j=1 to n is smaller than the upper limit of the total shared band, resulting in a residual band. This is because, in the case of TCP traffic, flow control among user terminals is executed. Thus, an in-buffer-information amount does not show a polling count for an insufficient band portion. In the case of TCP traffic, flow control among user terminals determines a transmission rate. Therefore, if the insufficient band portion increases, the transmission rate also increases accordingly. For this reason, allocation of a band portion exceeding an insufficient band portion computed from an in-buffer-information amount is considered to be efficient allocation.

Figure 21:
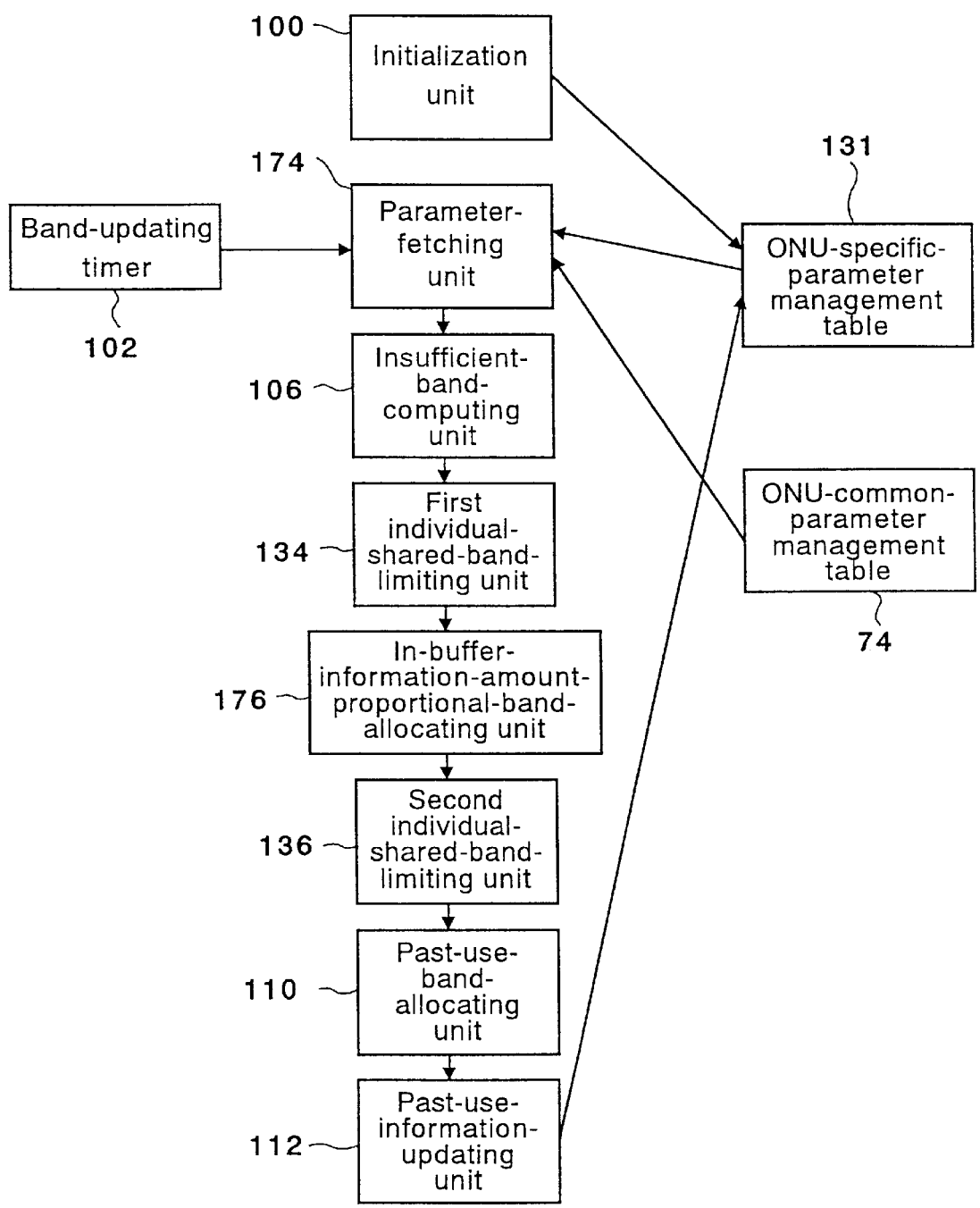
FIG. 21 is a functional block diagram showing a shared-band control unit employed in the ATM-PON IF unit shown in FIG. 20.

FIG. 21 is a functional block diagram showing a shared-band control unit 170 employed in the ATM-PON IF unit 169 shown in FIG. 20. Components of the shared-band control unit 170 virtually identical with those employed in the shared-band control unit 130 shown in FIG. 13 are denoted by the same reference numerals as the latter. A parameter-fetching unit 174 is different from the parameter-fetching unit 132 shown in FIG. 13 in that the parameter-fetching unit 174 also fetches a parameter CMAX from an ONU-common-parameter management table 172 in addition to a variety of parameters fetched by the parameter-fetching unit 132. The parameter CMAX is a real number greater than 1. An in-buffer-information-amount-proportional-band-allocating unit 176 increases an insufficient band portion limited by the first individual-shared-band-limiting unit 134 by multiplying the insufficient band portion by a coefficient in order to correct the allocation if the sum of the insufficient band portions computed from in-buffer-information amounts of the ONUs 26#ij where j=1 to n and limited by the first individual-shared-band-limiting unit 134 is smaller than the upper limit of the total shared band. The coefficient is the larger one of 1 and the value of a function g(x) expressed by Eq. (5) given below. A coefficient of at least 1 is used as a multiplier in order to increase each band portion proportional to the in-buffer-information amount.

$$g(x)=1/(x+1/\text{CMAX}) \quad (5)$$

where the symbol x denotes a ratio of the sum of the insufficient band portions to the upper limit of the total shared band. It should be noted that, since $(x+1/\text{CMAX}) \geq 1/\text{CMAX}$, $g(x) \leq \text{CMAX}$, which is a real number of at least 1. While the function g(x) expressed by Eq. (5) is used as a multiplier to increase the in-buffer-information amount in this embodiment, another function g(x) can be used as long as the other function g(x) satisfies a relation $0 \leq g(x) < f(x)$ for $0 \leq x \leq 1$ where $f(x)=1/x$. The function g(x) is limited by the relation $g(x)<f(x)$ since, for a coefficient value equal to f(x), the shared band will be all allocated as band portions proportional to in-buffer-information amounts. Thus, by limiting the function g(x) by the relation $g(x)<f(x)$, it is possible to avoid a state of allocation in which no part of the shared band is left for band portions proportional to first past-use band variables. A product of $(g(x)-1)$ and the upper limit of the total shared band is an increase in band portions proportional to in-buffer-information amounts over the second embodiment.

If the sum of the insufficient band portions computed from in-buffer-information amounts of the ONUs 26#ij where j=1 to n is greater than the upper limit of the total shared band, on the other hand, the in-buffer-information-amountproportional-band-allocating unit 176 finds the coefficient as a value of the band-correcting function f(x) expressed by Eq. (3). The coefficient is used as a multiplier of the insufficient band portion for each of the ONUs 26#ij where j=1 to n.

Figure 22:
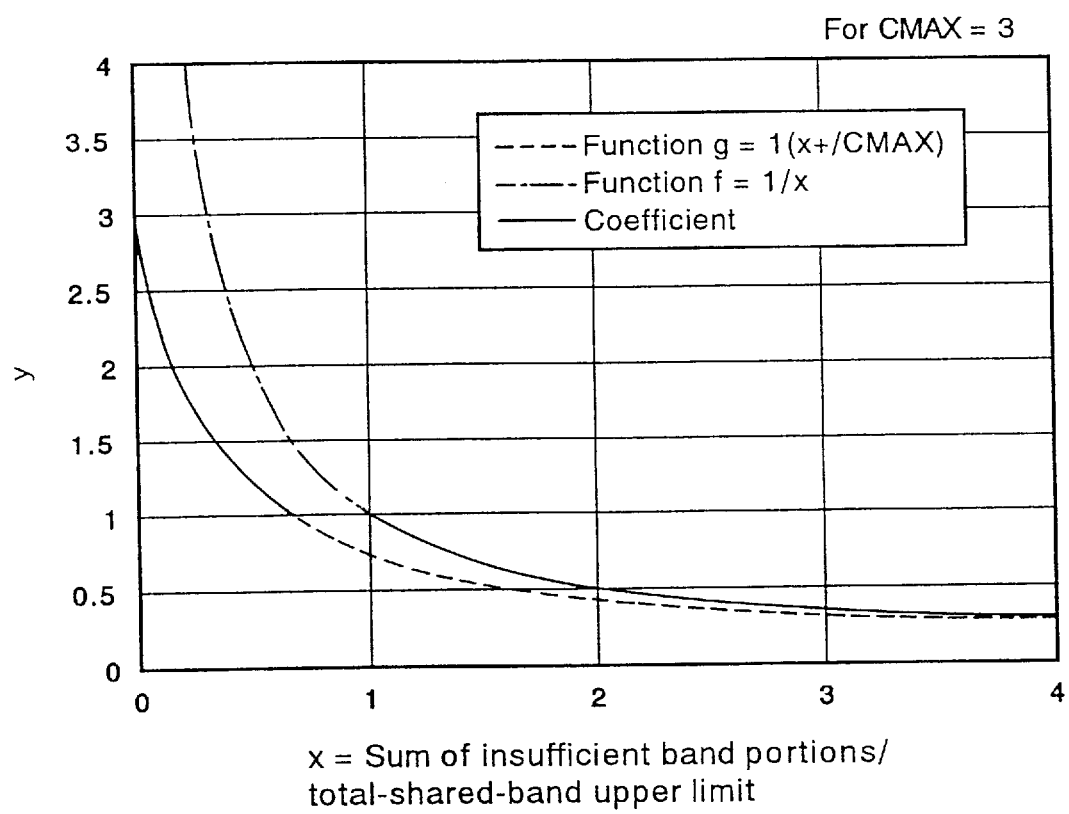
FIG. 22 is a diagram showing curves each representing the value of a coefficient y as a function of a variable.

FIG. 22 is a diagram showing curves each representing the value of a coefficient as a function of x for CMAX=3 where the symbol x denotes a ratio of the sum of the insufficient band portions to the upper limit of the total shared band. For $1 \leq x$, a solid line shown in FIG. 22 represents the same relation between the coefficient and the ratio x as the second embodiment. For $0 \leq x \leq 1$, on the other hand, the value of the coefficient represented by the solid line satisfies relations $0 \leq \text{Coefficient} \leq 3$ (=CMAX) and Coefficient<f(x). For $0 \leq x \leq 1$, the difference between the coefficient and the function f(x) represents the magnitude of a band portion proportional to a first past-use band variable. Thus, by changing CMAX, it is possible to control the difference between the functions f(x) and g(x), that is, the apportioning of the shared band into a band portion part to be allocated as band portions proportional to in-buffer-information amount and a band part to be allocated as band portions proportional to first past-use band variables.

FIG. 23 is a diagram showing the configuration of the ONU-common-parameter management table 172 used in the ATM-PON IF unit 169 shown in FIG. 20. As shown in FIG. 23, the ONU-common-parameter management table 172 includes a CMAX parameter of typically 10 in addition to a variety of parameters cataloged in the ONU-common-parameter management table 74 shown in FIG. 6.

Figure 24:
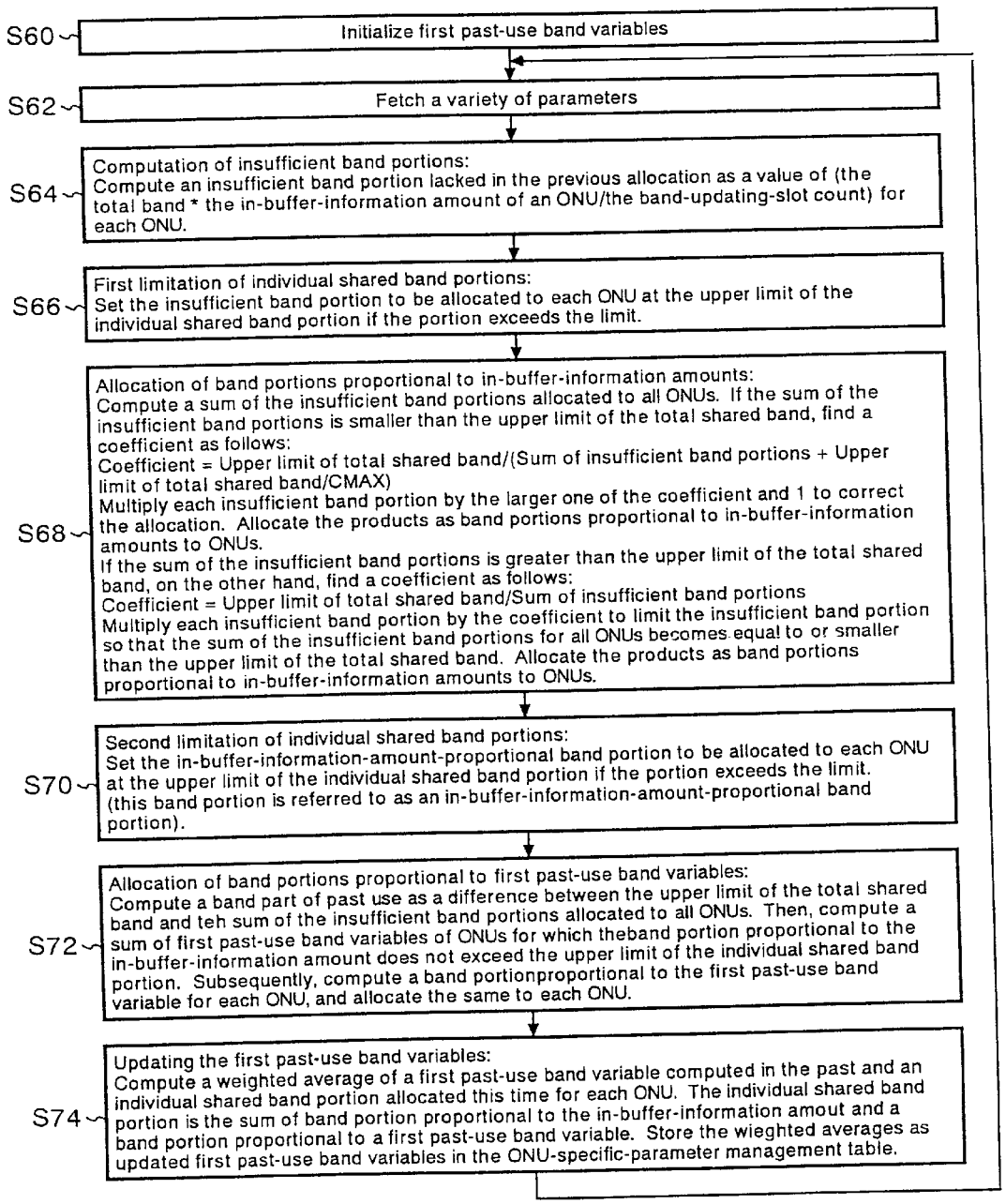
FIG. 24 shows a flowchart representing operations of the shared-band control unit.

FIG. 24 shows a flowchart representing operations of the shared-band control unit 170. Since the operations of the blocks employed in the ATM-PON IF unit 169 shown in FIG. 20 except the shared-band control unit 170 and the ONU-common-parameter management table 172 are virtually the same as their counterparts shown in FIG. 12, only the operation of the shared-band control unit 170 shown in FIG. 21 is explained by referring to the flowchart shown in FIG. 24 as follows.

1: Initialization of First Past-Use Band Variables

The flowchart shown in FIG. 24 begins with a step S60 at which the initialization unit 100 employed in the shared-band control unit 170 initializes the first past-use band variables and stores the initialized variables in the ONU-specific-parameter management table 131.

2: Allocation of the Shared Band 2-1: For each band-updating period, the band-updating timer 102 informs the parameter-fetching unit 174 that the band-updating period has lapsed.

2-2: At a step S62 of the flowchart shown in FIG. 24, the parameter-fetching unit 174 retrieves a total band of 5,000, a total shared band upper limit of 2,000, a band-updating slot count of 1,500, a weight of 1 for a presently allocated individual shared band portion, a weight of 3 for a previously calculated first past-use band variable and CMAX of 10 from the ONU-common-parameter management table 172 shown in FIG. 23. The parameter-fetching unit 174 also retrieves an ONU number, an upper limit of an individual shared band, an in-buffer-information amount and a first past-use band variable for each of the ONUs 26#ij where j=1 to n from the ONU-specific-parameter management table 131 shown in FIG. 14.

2-3: At a step S64 of the flowchart shown in FIG. 24, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S66 of the flowchart shown in FIG. 24, the first individual-shared-band-limiting unit 134 sets the insufficient band portion to be allocated to each of the ONUs 26#ij where j=1 to n at the upper limit of the individual shared band portion if the portion exceeds the limit.

2-5: At a step S68 of the flowchart shown in FIG. 24, the in-buffer-information-amount-proportional-band-allocating unit 176 carries out the following processing. First of all, the in-buffer-information-amount-proportional-band-allocating unit 176 computes a sum of the insufficient band portions allocated to all of the ONUs 26#ij where j=1 to n. If the sum of the insufficient band portions allocated to all the ONUs 26#ij where j=1 to n is greater than the upper limit of the total shared band, the in-buffer-information-amount-proportional-band-allocating unit 176 finds a coefficient y from a band-correcting function f(x)=1/x given by Eq. (3) where x is a ratio of the sum of the insufficient band portions allocated to all the ONUs 26#ij where j=1 to n to the upper limit of the total shared band. Then, the in-buffer-information-amount-proportional-band-allocating unit 176 multiplies each insufficient band portion by the coefficient y, which is found from the band-correcting function f, to limit the insufficient band portion so that the sum of the insufficient band portions for all the ONUs 26#ij where j=1 to n becomes equal to or smaller than the upper limit of the total shared band. The product of the insufficient band of each of the ONUs 26#ij where j=1 to n and the coefficient y is used as an in-buffer-information-amount-proportional band portion, which is proportional to the in-buffer-information amount, to each of the ONUs 26#ij where j=1 to n. If the sum of the insufficient band portions allocated to all the ONUs 26#ij where j=1 to n is smaller than the upper limit of the total shared band, on the other hand, the insufficient band portion is multiplied by a coefficient to increase the allocated band portion proportional to the in-buffer-information amount. The coefficient is the larger one of 1 and the value of a function g(x) expressed by Eq. (5).

2-6: At a step S70 of the flowchart shown in FIG. 24, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

Figure 25:
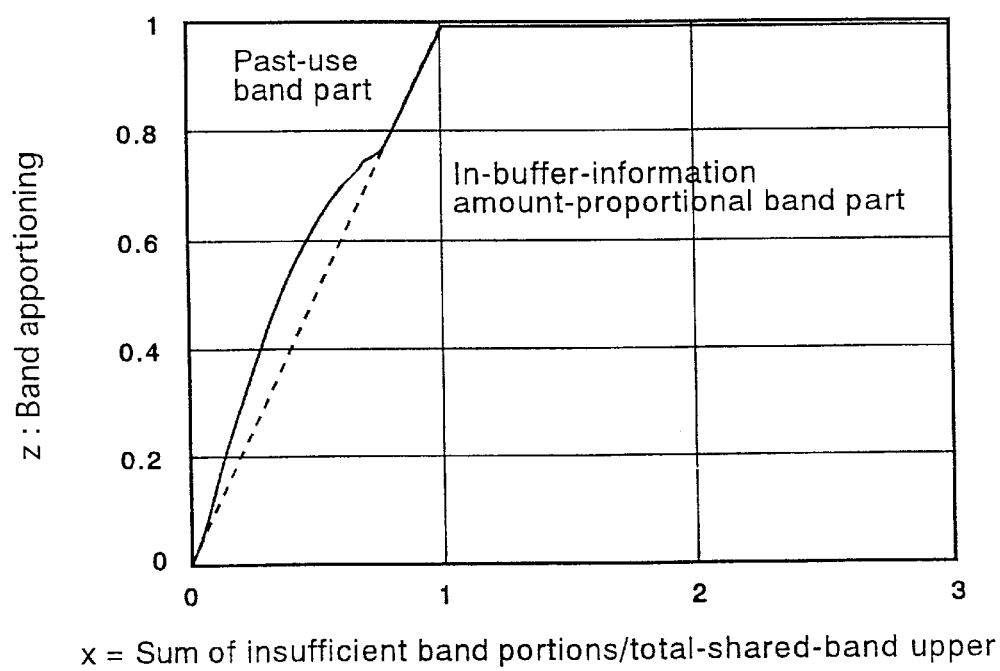
FIG. 25 is a diagram showing apportioning of a shared band.

2-7: If the sum of the insufficient band portions allocated to all the ONUs 26#ij where j=1 to n is smaller than the upper limit of the total shared band, the past-use-band-allocating unit 110 carries out the following processing at a step S72 of the flowchart shown in FIG. 24. First of all, the past-use-band-allocating unit 110 computes a band part of past-use as a difference between the upper limit of the total shared band and the sum of the insufficient band portions allocated to all the ONUs 26#ij where j=1 to n. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. At that time, the sum of the band portion proportional to the in-buffer-information amount and the band portion proportional to a first past-use band variable is limited so as not to exceed the upper limit of the individual shared band portion allocated to the ONU 26#ij. FIG. 25 is a diagram showing apportioning of the shared band. For 0<x<1, that is, for a coefficient shown in FIG. 22 greater than 1, the in-buffer-band-part is increased by a difference between the solid line and the dashed line shown in FIG. 25 in comparison with the first embodiment.

2-8: At a step S74 of the flowchart shown in FIG. 24, the past-use-information-updating unit 112 computes a weighted average of a first past-use band variable computed in the past and an individual shared band portion allocated this time for each of the ONUs 26#ij where j=1 to n in accordance with Eq. (4). As described earlier, the individual shared band portion is the sum of a band portion proportional to the in-buffer-information amount and a band portion proportional to a first past-use band variable. The weighted averages are stored each as an updated first past-use band variable in the ONU-specific-parameter management table 76. Also as described earlier, the individual shared band portion, that is, the sum of a band portion proportional to the in-buffer-information amount and a band portion proportional to a first past-use band variable, which are allocated to each of the ONUs 26#ij where j=1 to n, is reported to the shared-band-polling-information-generating unit 78.

As described above, in addition to the effects provided by the second embodiment, the fourth embodiment also exhibits the following effect. If the sum of the insufficient band portions allocated to all the ONUs 26#ij where j=1 to n is smaller than the upper limit of the total shared band, a band portion larger than an insufficient band portion computed from an in-buffer-information amount can be allocated. Thus, the insufficient band portion allocated to the ONU is increased, resulting in a raised transmission rate of the TCP traffic.

Fifth Embodiment

Figure 26:
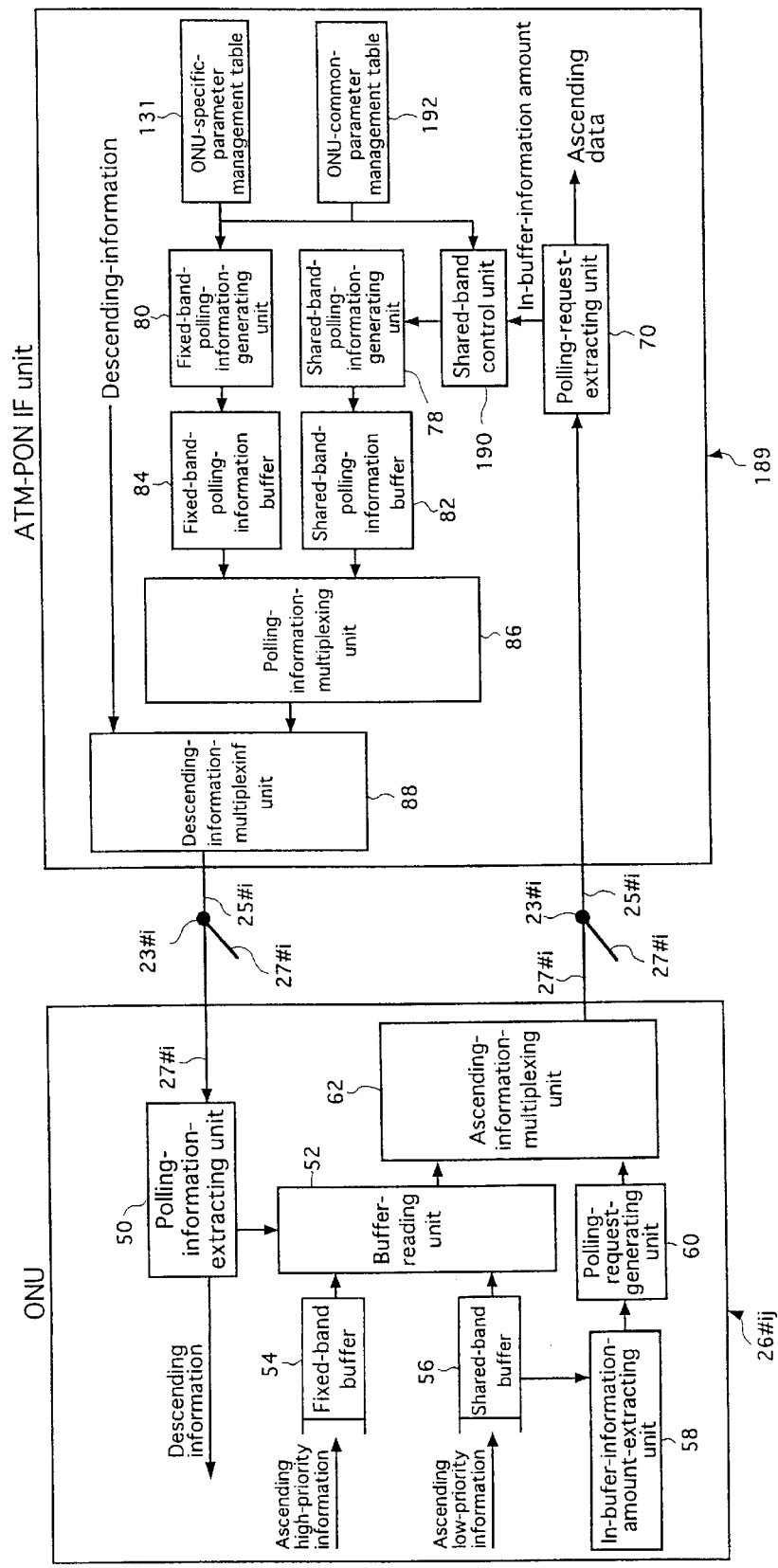
FIG. 26 is a functional block diagram showing an ATM-PON IF unit implemented by a fifth embodiment of the present invention.

FIG. 26 is a functional block diagram showing an ATM-PON IF unit 189 implemented by a fifth embodiment of the present invention. Components of the fifth embodiment virtually identical with those employed in the fourth embodiment shown in FIG. 20 are denoted by the same reference numerals as the latter. The ATM-PON IF unit 189 implemented by the fifth embodiment is different from the ATM-PON IF unit 169 implemented by the fourth embodiment in that the ATM-PON IF unit 189 always allocates a past-use band portion proportional to a weighted average of individual shared band portions allocated in the past without regard to whether or not a sum of the insufficient band portions computed from the in-buffer-information amounts of the ONUs 26#ij where j=1 to n is greater or smaller than the upper limit of the total shared band.

Figure 27:
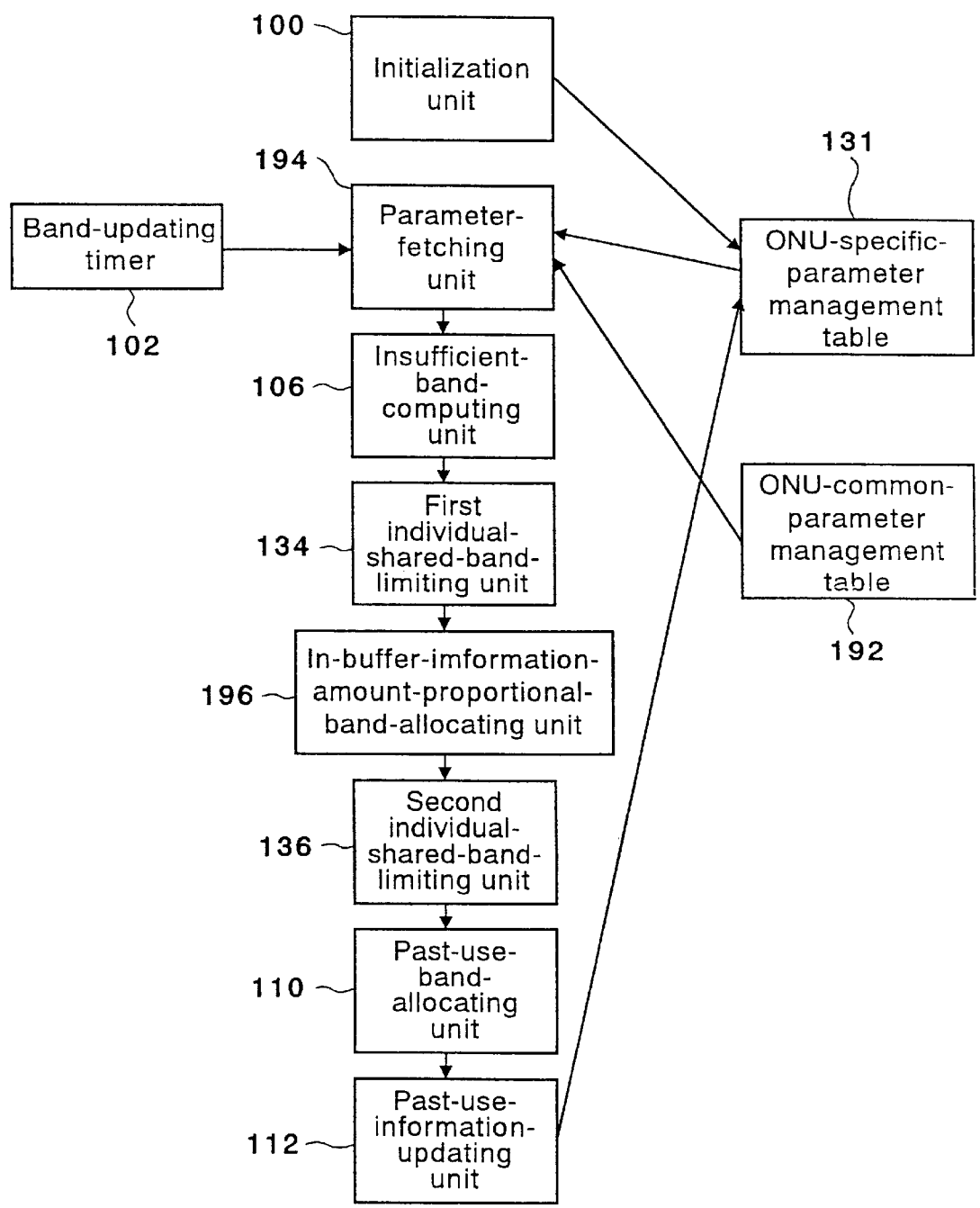
FIG. 27 is a functional block diagram showing a shared-band control unit employed in the ATM-PON IF unit shown in FIG. 26.

FIG. 27 is a functional block diagram showing a shared-band control unit 190 employed in the ATM-PON IF unit 189 shown in FIG. 26. Components of the shared-band control unit 190 virtually identical with those employed in the shared-band control unit 170 shown in FIG. 21 are denoted by the same reference numerals as the latter. An in-buffer-information-amount-proportional-band-allocating unit 196 corrects a limited insufficient band portion obtained by calculation for each of the ONUs 26#ij where j=1 to n by using a coefficient y=h(x) expressed by Eq. (6) as follows:

$$h(x)=1/(x/\text{MAX\_RATIO}+1/\text{CMAX}) \tag{6}$$

where the symbol x represents a ratio of a sum of the insufficient band portions to the upper limit of the total shared band, 0<MAX_RATIO<1 and CMAX>0.

Figure 28:
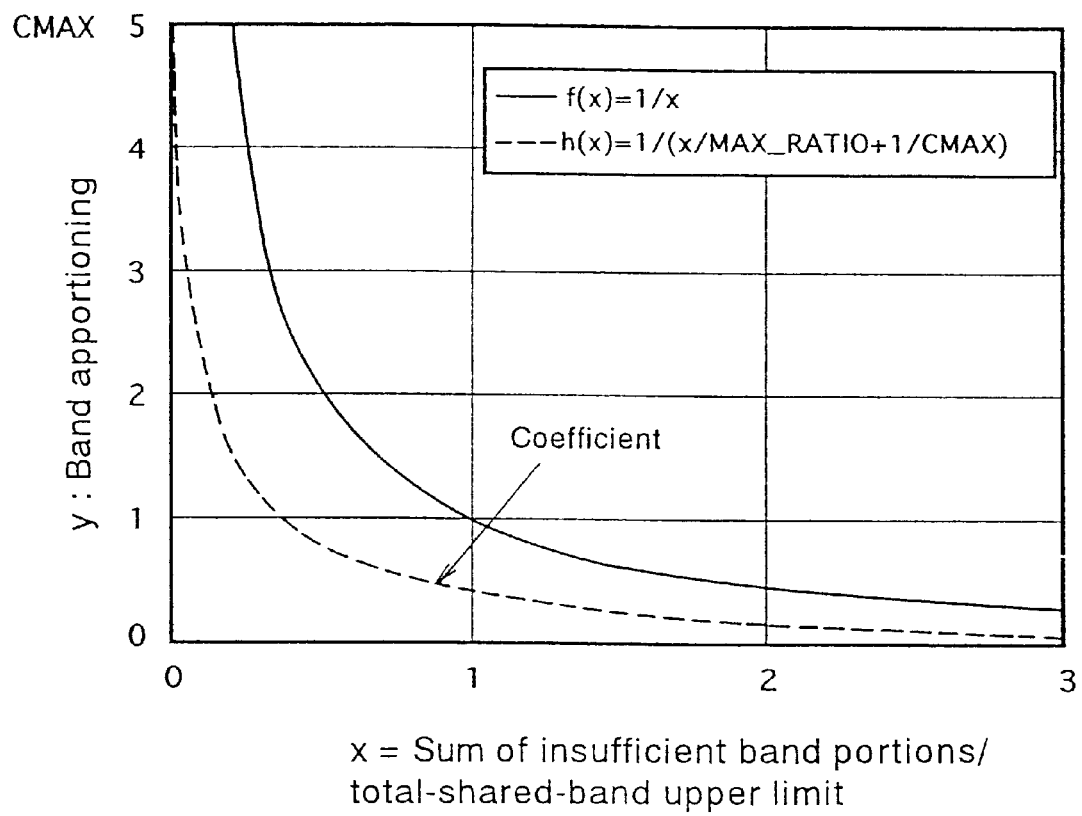
FIG. 28 is a diagram showing curves each representing the value of a coefficient y as a function of a variable.

FIG. 28 is a diagram showing a curve representing the value of h as a function of x for CMAX=5 and MAX_RATIO=0.5. CMAX determines a rate of increase in band portion proportional to an in-buffer-information amount according to the degree of congestion (x=a ratio of a sum of the insufficient band portions to the upper limit of the total shared band). Let i (x) be equal to h(x)/f(x) where f(x)=1/x. Thus, $$i(x)=1/(1/\text{MAX\_RATIO}+1/x*\text{CMAX})<\text{MAX\_RATIO}$$

Since i (x), which is equal to h(x)/f(x), represents a relative ratio of a sum of band portions proportional to in-buffer-information amounts to the total shared band with f(x) taken as a reference, MAX_RATIO determines a maximum value of the insufficient band portion relative to an insufficient band portion computed by using f(x). For example, a MAX_RATIO value of 0.5 indicates that a ratio of a sum of band portions proportional to in-buffer-information amounts to the total shared band is smaller than 0.5 (50%) of a ratio of a sum of in-buffer-information-amount-proportional band portions computed by using a coefficient determined by f(x) to the total shared band no matter how large the sum of the insufficient band portions is.

FIG. 29 is a diagram showing the configuration of an ONU-common-parameter management table 192 used in the ATM-PON IF unit 189 shown in FIG. 26. As shown in FIG. 29, the ONU-common-parameter management table 192 includes the MAX_RATIO parameter of typically 0.5 in addition to a variety of parameters cataloged in the ONU-common-parameter management table 172 shown in FIG. 23.

FIG. 30 shows a flowchart representing operations of the shared-band control unit 190. Since the operations of the blocks employed in the ATM-PON IF unit 189 shown in FIG. 26 except the shared-band control unit 190 and the ONU-common-parameter management table 192 are virtually the same as their counterparts shown in FIG. 21, only the operation of the shared-band control unit 190 shown in FIG. 27 is explained by referring to the flowchart shown in FIG. 30 as follows.

1: Initialization of First Past-Use Band Variables

The flowchart shown in FIG. 30 begins with a step S100 at which the initialization unit 100 employed in the shared-band control unit 190 initializes the first past-use band variables and stores the initialized variables in the ONU-specific-parameter management table 131.

2: Allocation of the Shared Band 2-1: For each band-updating period, the band-updating timer 102 informs the parameter-fetching unit 194 that the band-updating period has lapsed.

2-2: At a step S102 of the flowchart shown in FIG. 30, the parameter-fetching unit 194 retrieves a total band of 5,000, a total shared band upper limit of 2,000, a band-updating slot count of 1,500, a weight of 1 for a presently allocated individual shared band portion, a weight of 3 for a previously calculated first past-use band variable, CMAX of 10 and MAX_RATIO of 0.5 from the ONU-common-parameter management table 172 shown in FIG. 29. The parameter-fetching unit 194 also retrieves an ONU number, an upper limit of an individual shared band, an in-buffer-information amount and a first past-use band variable for each of the ONUs 26#ij where j=1 to n from the ONU-specific-parameter management table 131 shown in FIG. 14.

2-3: At a step S104 of the flowchart shown in FIG. 30, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S106 of the flowchart shown in FIG. 30, the first individual-shared-band-limiting unit 134 sets the insufficient band portion to be allocated to each of the ONUs 26#ij where j=1 to n at the upper limit of the individual shared band portion if the portion exceeds the limit.

2-5: At a step S108 of the flowchart shown in FIG. 30, the in-buffer-information-amount-proportional-band-allocating unit 196 carries out the following processing. First of all, the in-buffer-information-amount-proportional-band-allocating unit 196 computes a sum of the insufficient band portions allocated to all of the ONUs 26#ij where j=1 to n. Then, the in-buffer-information-amount-proportional-band-allocating unit 196 finds a coefficient y from a band-correcting function h(x) given by Eq. (6) where x is a ratio of the sum of the insufficient band portions allocated to all the ONUs 26#ij where j=1 to n to the upper limit of the total shared band. Then, the in-buffer-information-amount-proportional-band-allocating unit 196 multiplies each insufficient band portion by the coefficient y, which is found from the band-correcting function h(x). The product of the insufficient band of each of the ONUs 26#ij where j=1 to n and the coefficient y is used as an in-buffer-information-amount-proportional band portion, which is proportional to the in-buffer-information amount, to each of the ONUs 26#ij where j=1 to n.

2-6: At a step S110 of the flowchart shown in FIG. 30, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-7: If the sum of the insufficient band portions allocated to all the ONUs 26#ij where j=1 to n is smaller than the upper limit of the total shared band, the past-use-band-allocating unit 110 carries out the following processing at a step S112 of the flowchart shown in FIG. 30. First of all, the past-use-band-allocating unit 110 computes a band part of past use as a difference between the upper limit of the total shared band and the sum of the insufficient band portions allocated to all the ONUs 26#ij where j=1 to n. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. At that time, the sum of the band portion proportional to the in-buffer-information amount and the band portion proportional to a first past-use band variable is limited so as not to exceed the upper limit of the individual shared band portion allocated to the ONU 26#ij.

Figure 31:
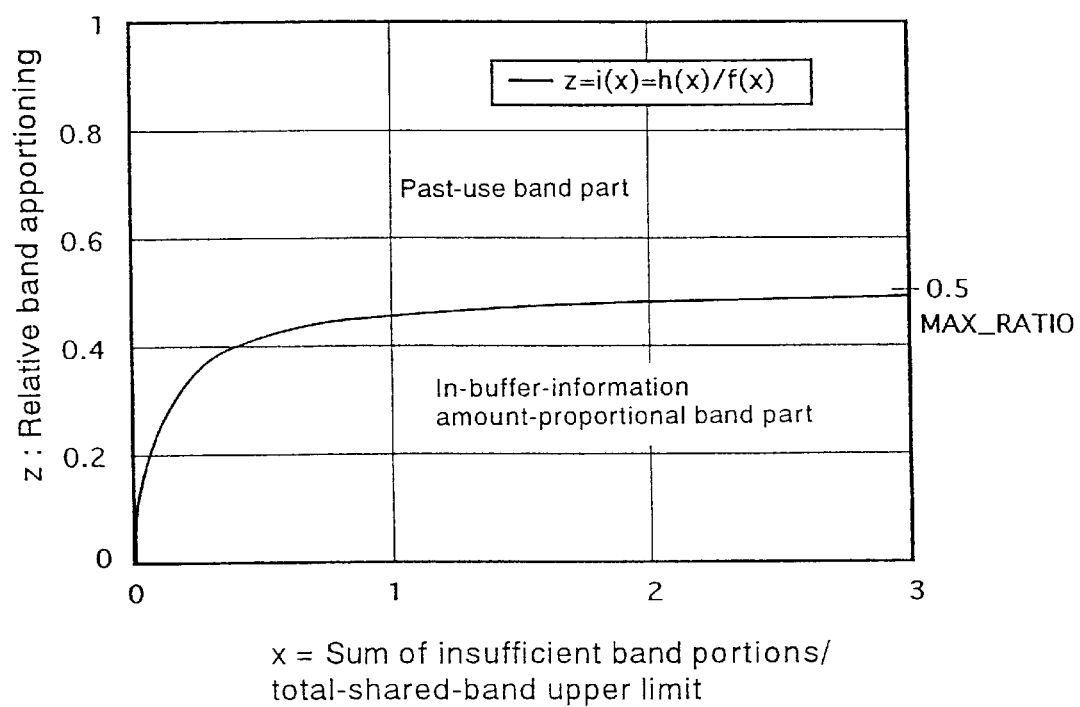
FIG. 31 is a diagram showing apportioning of a shared band.

FIG. 31 is a diagram showing apportioning of the shared band. The horizontal axis x represents the ratio of the sum of the insufficient band portions allocated to all the ONUs 26#ij where j=1 to n to the upper limit of the total shared band whereas the horizontal axis z represents the relative ratio of the band part proportional to the in-buffer-information amounts to the total shared band with f(x) taken as a reference. As described above, the total band is the sum of the band part proportional to the in-buffer-information amount and the band part of past use. As shown in FIG. 31, the ratio of a sum of band portions proportional to in-buffer-information amounts to the total shared band is smaller than MAX_RATIO of 0.5 (50%) no matter how large the value of x is. Thus, the past-use band part is assured.

2-8: At a step S114 of the flowchart shown in FIG. 30, the past-use-information-updating unit 112 computes a weighted average of a first past-use band variable computed in the past and an individual shared band portion allocated this time for each of the ONUs 26#ij where j=1 to n in accordance with Eq. (4). As described earlier, the individual shared band portion is the sum of a band portion proportional to the in-buffer-information amount and a band portion proportional to a first past-use band variable. The weighted averages are stored each as an updated first past-use band variable in the ONU-specific-parameter management table 76. Also as described earlier, the individual shared band portion, that is, the sum of a band portion proportional to the in-buffer-information amount and a band portion proportional to a first past-use band variable, which are allocated to each of the ONUs 26#ij where j=1 to n, is reported to the shared-band-polling-information-generating unit 78.

As described above, in addition to the effects provided by the fourth embodiment, the fifth embodiment also exhibits the following effect. A residual band portion proportional to a weighted average of individual shared band portions allocated in the past is always allocated without regard to whether or not a sum of the insufficient band portions computed from the in-buffer-information amounts of ONUs is greater or smaller than the upper limit of the total shared band. To put it concretely, (1−MAX_RATIO)×100% of the total shared band is allocated to ONUs as a band part of part use. Thus, a shared band portion allocated to each terminal is always greater than (1−MAX_RATIO) of a previously allocated band portion, which is about equal to the first past-use band variable. For MAX RATIO of 0.5, for example, a shared band portion allocated to each terminal is greater than 50% of the band portion proportional to a first past-use band variable. It should be noted that h(x) can be used in the fourth embodiment in place of g(x).

Sixth Embodiment

Figure 32:
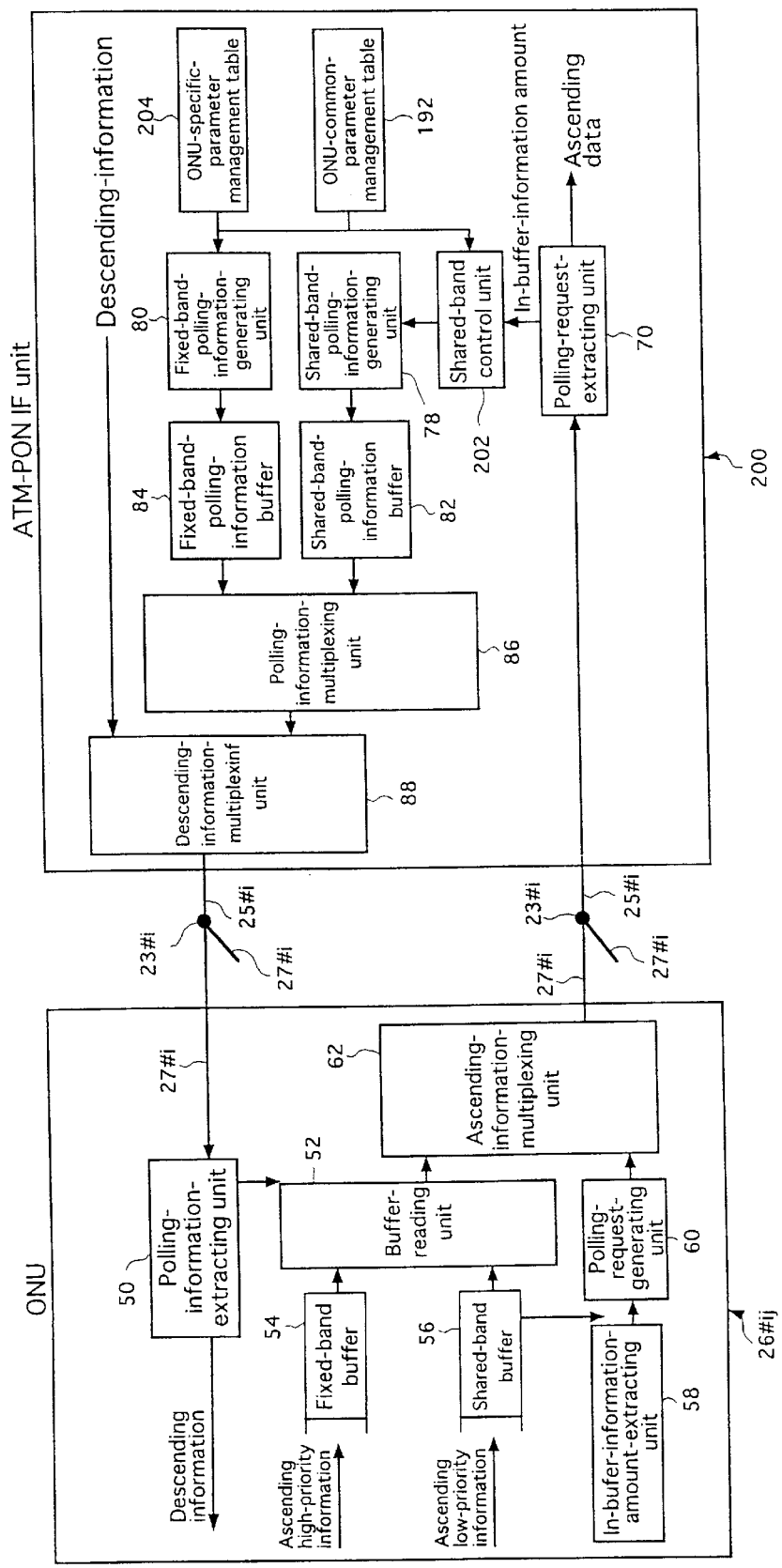
FIG. 32 is a functional block diagram showing an ATM-PON IF unit implemented by a sixth embodiment of the present invention.

FIG. 32 is a functional block diagram showing an ATM-PON IF unit 200 implemented by a sixth embodiment of the present invention. Components of the fifth embodiment virtually identical with those employed in the fifth embodiment shown in FIG. 26 are denoted by the same reference numerals as the latter. The ATM-PON IF unit 200 implemented by the sixth embodiment provides a guaranteed minimum band portion for each of the ONUs 26#ij where j=1 to n.

Figure 33:
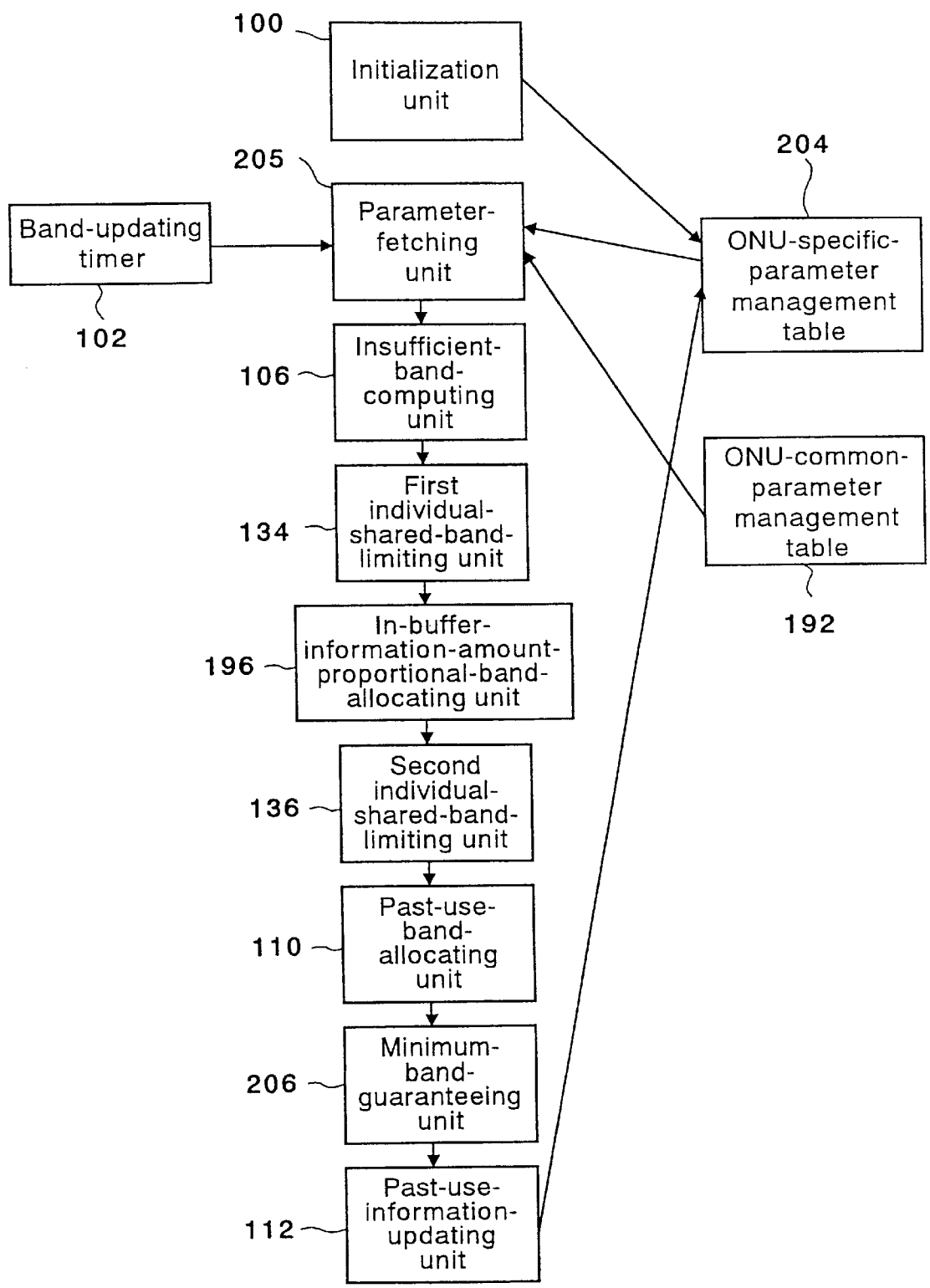
FIG. 33 is a functional block diagram showing a shared-band control unit employed in the ATM-PON IF unit shown in FIG. 32.

FIG. 33 is a functional block diagram showing a shared-band control unit 202 employed in the ATM-PON IF unit 200 shown in FIG. 32. Components of the shared-band control unit 202 virtually identical with those employed in the shared-band control unit 190 shown in FIG. 27 are denoted by the same reference numerals as the latter. A parameter-fetching unit 205 fetches a guaranteed minimum band portion for each of the ONUs 26#ij where j=1 to n from the ONU-specific-parameter management table 204 in addition to a variety of parameters fetched by the parameter-fetching unit 194 shown in FIG. 27.

A minimum-band guaranteeing unit 206 multiplies a sum of a band portion proportional to an in-buffer-information amount and a band portion proportional to a first past-use band variable by a third coefficient for each of the ONUs 26#ij where j=1 to n if a sum of the insufficient band portions exceeds the upper limit of the total shared band where the third coefficient is given as f(x), which is a function of x expressed by Eq. 3. The minimum-band guaranteeing unit 206 then calculates a guaranteed minimum band part in accordance with the following equation:

Guaranteed minimum band part=Upper limit of total shared band−(Sum of band portions proportional to in-buffer-information amounts+Sum of band portions proportional to first past-use band variables)×Third coefficient=Upper limit of total shared band×(1−Third coefficient)

The guaranteed minimum band part is allocated to the ONUs 26#ij where j=1 to n on a rationing basis. That is to say, a portion of the guaranteed minimum band part allocated to any of the ONUs 26#ij where j=1 to n is proportional to the smaller value of the guaranteed minimum band portion and the insufficient band portion of the ONUs 26#ij. A portion of the guaranteed minimum band part allocated to any of the ONUs 26#ij where j=1 to n is made proportional to the smaller value of the guaranteed minimum band portion and the insufficient band portion of the ONUs 26#ij because of the following reason. In order to avoid congestion, it will naturally be nice to allocate the shared band by increasing the insufficient band portion. To maintain fair band allocation among the ONUs 26#ij where j=1 to n, however, it is necessary to take the guaranteed minimum band into consideration.

FIG. 34 is a diagram showing the configuration of an ONU-specific-parameter management table 204 used in the ATM-PON IF unit 200 shown in FIG. 32. As shown in FIG. 34, the ONU-specific-parameter management table 204 includes a guaranteed minimum band portion for each of the ONUs 26#ij where j=1 to n in addition to a variety of parameters cataloged in the ONU-specific-parameter management table 131 shown in FIG. 14. The unit of the guaranteed minimum band portion is the same as the individual shared band.

Figure 35:
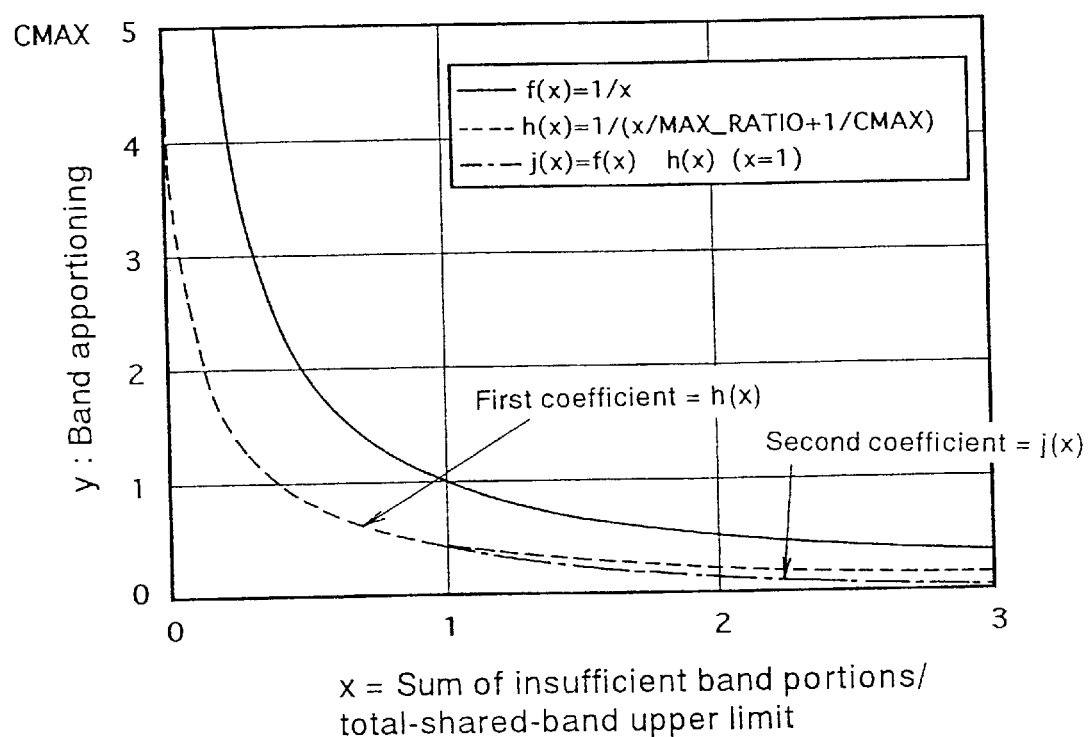
FIG. 35 is a diagram showing curves each representing the values of a coefficient y as a function of a variable.

FIG. 35 is a diagram showing curves representing the values y of first, second and third coefficients as a function of x for CMAX=5 and MAX_RATIO=0.5. The x axis represents a ratio of a sum of the insufficient band portions to the upper limit of the total share band whereas the y axis represents the values of the first and second coefficients or band-portion multipliers. The first coefficient is the function h(x) expressed by Eq. (6) and the second coefficient is a function j(x) expressed as a product of f(x)×h(x). As described earlier, the third coefficient is the function f(x) expressed by Eq. (3). For $0 \leq x \leq 1$, the first coefficient is used as a multiplier of an insufficient band portion. For $1 \leq x$, on the other hand, it is the second coefficient that is used as a multiplier of an insufficient band portion. For $1 \leq x$, $0 < f(x) = 1/x < 1$. Thus, the second coefficient is smaller than the first coefficient as shown in FIG. 35. In this case, the sum of band portions proportional to in-buffer-information amounts is equal to the product of the second coefficient and the upper limit of the total shared band. The product of (1−f(x)) and the upper limit of the total shared band is equal to the sum of band portions allocated as guaranteed minimums or the guaranteed minimum band part cited earlier. Since f(x) is a monotonously decreasing function, (1−f(x)) is a monotonously increasing function. Thus, a band part to be allocated as guaranteed minimum band portions also increases. The sum of band portions proportional to first past-use band variables is equal to the product of (f(x)−Second coefficient) and the upper limit of the total shared band. Thus, ratios of (Sum of band portions proportional to in-buffer-information amounts) to (Sum of band portions proportional to first past-use band variables) to (Sum of band portions allocated as guaranteed minimums) are equal to ratios of (Second coefficient) to (f(x)−Second coefficient) to (1−f(x)) respectively.

Figure 36:
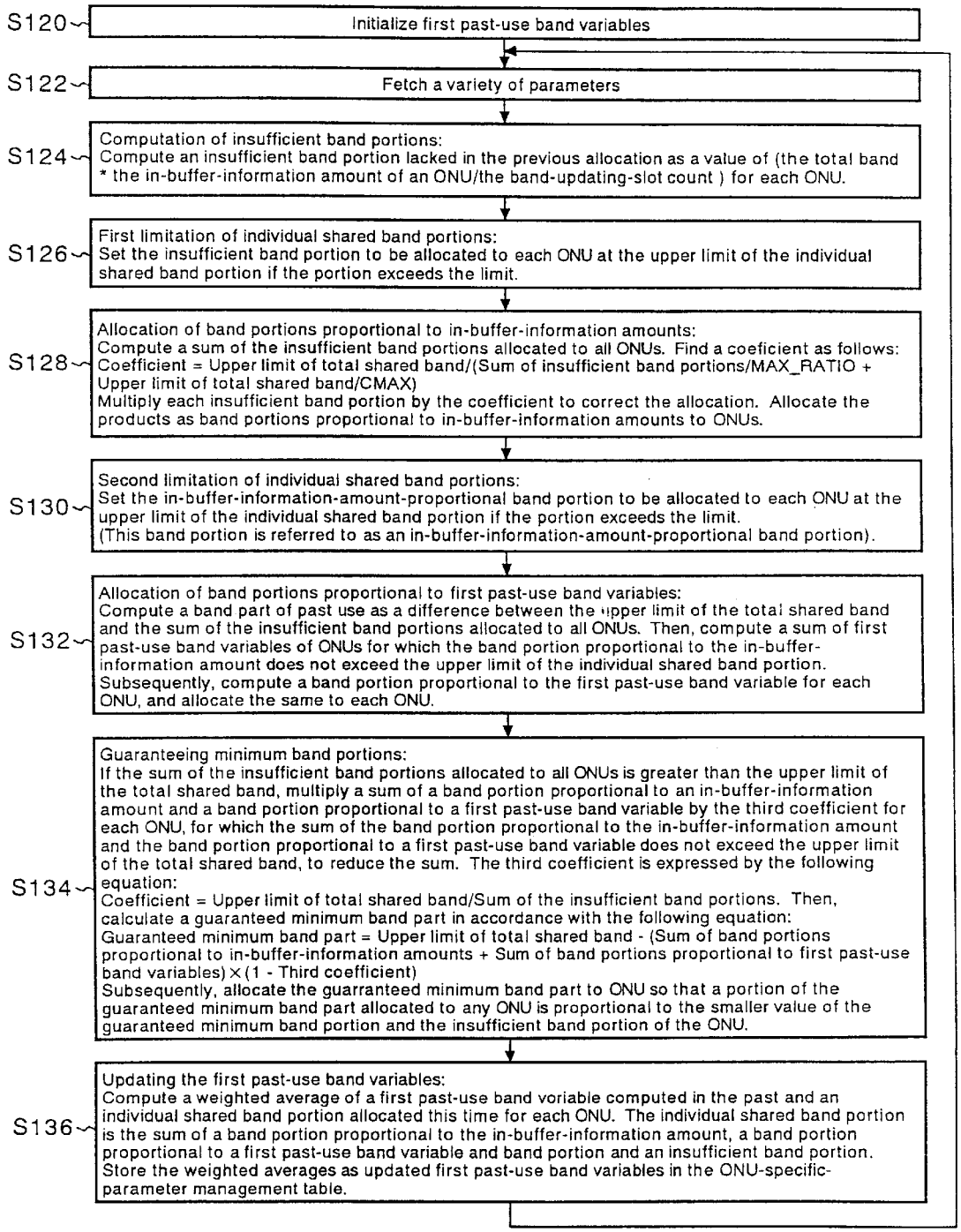
FIG. 36 shows a flowchart representing operations of the shared-band control unit.

FIG. 36 shows a flowchart representing operations of the shared-band control unit 202. Since the operations of the blocks employed in the ATM-PON IF unit 200 shown in FIG. 32 except the shared-band control unit 202 and the ONU-specific-parameter management table 204 are virtually the same as their counterparts shown in FIG. 26, only the operation of the shared-band control unit 202 shown in FIG. 33 is explained by referring to the flowchart shown in FIG. 36 as follows.

1: Initialization of First Past-Use Band Variables

The flowchart shown in FIG. 36 begins with a step S120 at which the initialization unit 100 employed in the shared-band control unit 202 initializes the first past-use band variables and stores the initialized variables in the ONU-specific-parameter management table 204.

2: Allocation of the Shared Band 2-1: For each band-updating period, the band-updating timer 102 informs the parameter-fetching unit 205 that the band-updating period has lapsed.

2-2: At a step S122 of the flowchart shown in FIG. 36, the parameter-fetching unit 205 retrieves a total band of 5,000, a total shared band upper limit of 2,000, a band-updating slot count of 1,500, a weight of 1 for a presently allocated individual shared band portion, a weight of 3 for a previously calculated first past-use band variable, CMAX of 10 and MAX_RATIO of 0.5 from the ONU-common-parameter management table 192 shown in FIG. 29. The parameter-fetching unit 205 also retrieves an ONU number, an upper limit of an individual shared band, an in-buffer-information amount, a first past-use band variable and a guaranteed minimum band portion for each of the ONUs 26#ij where j=1 to n from the ONU-specific-parameter management table 204 shown in FIG. 34.

2-3: At a step S124 of the flowchart shown in FIG. 36, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S126 of the flowchart shown in FIG. 36, the first individual-shared-band-limiting unit 134 sets the insufficient band portion to be allocated to each of the ONUs 26#ij where j=1 to n at the upper limit of the individual shared band portion if the portion exceeds the limit.

2-5: At a step S128 of the flowchart shown in FIG. 36, the in-buffer-information-amount-proportional-band-allocating unit 196 carries out the following processing.

First of all, the in-buffer-information-amount-proportional-band-allocating unit 196 computes a sum of the insufficient band portions allocated to all of the ONUs 26#ij where j=1 to n. Then, the in-buffer-information-amount-proportional-band-allocating unit 196 finds a coefficient y from a band-correcting function h(x) given by Eq. (6) where x is a ratio of the sum of the insufficient band portions allocated to all the ONUs 26#ij where j=1 to n to the upper limit of the total shared band. Then, the in-buffer-information-amount-proportional-band-allocating unit 176 multiplies each insufficient band portion by the coefficient y, which is found from the band-correcting function h(x). The product of the insufficient band of each of the ONUs 26#ij where j=1 to n and the coefficient y is used as an in-buffer-information-amount-proportional band portion, which is proportional to the in-buffer-information amount, to each of the ONUs 26#ij where j=1 to n.

2-6: At a step S130 of the flowchart shown in FIG. 36, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-7: If the sum of the insufficient band portions allocated to all the ONUs 26#ij where j=1 to n is smaller than the upper limit of the total shared band, the past-use-band-allocating unit 110 carries out the following processing at a step S132 of the flowchart shown in FIG. 36. First of all, the past-use-band-allocating unit 110 computes a band part of past use as a difference between the upper limit of the total shared band and the sum of the insufficient band portions allocated to all the ONUS 26#ij where j=1 to n. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n.

2-8: If the sum of the insufficient band portions allocated to all the ONUs 26#ij where j=1 to n is greater than the upper limit of the total shared band, the minimum-band guaranteeing unit 206 carries out the following processing at a step S130 of the flowchart shown in FIG. 36. First of all, the minimum-band guaranteeing unit 206 multiplies a sum of a band portion proportional to an in-buffer-information amount and a band portion proportional to a first past-use band variable by the third coefficient for each of ONUs 26#ij, for which the sum of the band portion proportional to the in-buffer-information amount and the band portion proportional to a first past-use band variable does not exceed the upper limit of the total shared band. The third coefficient is given as f(x) by Eq. (3) where x is a ratio of a sum of the insufficient portions to the upper limit of the total shared band. The minimum-band guaranteeing unit 206 then calculates a guaranteed minimum band part in accordance with the following equation:

Guaranteed minimum band part=Upper limit of total shared band−(Sum of band portions proportional to in-buffer-information amounts+Sum of band portions proportional to first past-use band variables)×Third coefficient=Upper limit of total shared band×(1−Third coefficient)

The guaranteed minimum band part is then allocated to the ONUs 26#ij where j=1 to n on a rationing basis. That is to say, a portion of the guaranteed minimum band part allocated to any of the ONUs 26#ij where j=1 to n is proportional to the smaller value of the guaranteed minimum band portion and the insufficient band portion of the ONU 26#ij.

Figure 37:
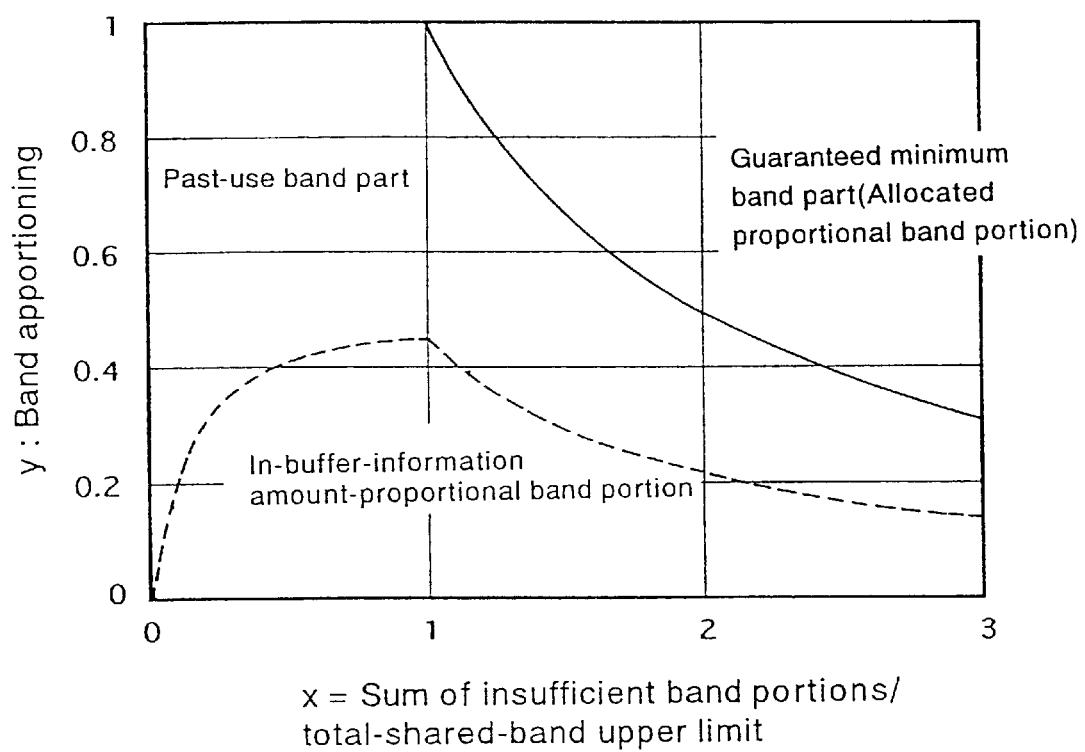
FIG. 37 is a diagram showing apportioning of a shared band.

FIG. 37 is a diagram showing apportioning of the shared band. For x>1, the shared band is apportioned into a band part proportional to in-buffer-information amounts (the bottom band part), a band part proportional to first past-use band variables (the middle band part) and a guaranteed minimum band part proportional to guaranteed minimum band portions or insufficient band portions as will be described later (the top band part). As is obvious from the figure, the larger the value of x, the greater the guaranteed minimum band part.

FIG. 38 is a diagram showing a typical result of allocation of band portions each proportional to the smaller value of a guaranteed minimum band portion and an insufficient band portion. The figure shows band portions allocated to ONUs 26#ij where j=1 to n (=4), namely, the ONU 26#i1, the ONU 26#i2, the ONU 26#i3 and the ONU 26#i4. The in-buffer-information amounts of the ONU 26#i1, the ONU 26#i2, the ONU 26#i3 and the ONU 26#i4 are 400, 800, 0 and 3,350 respectively. The total band, the upper limit of the total shared band and the buffer-updating period expressed in terms of time slots (or the buffer-updating-slot count) is 18,398, 18,350 and 3,816 respectively. The insufficient band portion allocated to each ONU can be found by using Eq. (2) as follows:

Insufficient band portion of an ONU=Total band×In-buffer-information amount the ONU/Band-updating-slot count Thus, an insufficient band portion allocated to the ONU 26#i1 is 18,398×400/3,816=1,928

In the same way, an insufficient band portion allocated to the ONU 26#i2 is 18,398×800/3,816=3,857

By the same token, an insufficient band portion allocated to the ONU 26#i3 is 18,398×0/3,816=0

Likewise, an insufficient band portion allocated to the ONU 26#i4 is 18,398×3,350/3,816=16,151

The sum of the insufficient band portions is 21,936, which is greater than the total-shared-band upper limit of 18,350. Let a permitted band portion represent the smaller value of the insufficient band portion and the guaranteed minimum band portion. The permitted band portions of the ONU 26#i1, the ONU 26#i2, the ONU 26#i3 and the ONU 26#i4 are thus 1,928, 3,000, 0 and 2,000 respectively. A circle mark shown on the column of the permitted band portion in the figure indicates that the insufficient band portion is smaller than the guaranteed minimum band portion. On the other hand, a cross mark shown on the column of the permitted band portion in the figure indicates that the insufficient band portion is greater than the guaranteed minimum band portion.

As described above,

> Guaranteed minimum band part=Upper limit of total shared band× (1−Third coefficient)=Upper limit of total-shared-band upper limit of total shared band×Upper limit of total shared band/ Sum of the insufficient band portions=18,350−18,350×18,350/ 21,936=3,000.

Thus, the permitted band portion allocated to the ONU 26#i1 is 3,000×1,928(1,928+3,000+0+2,000)=835

In the same way, the permitted band portion allocated to the ONU 26#i2 is 3,000×3,000(1,928+3,000+0+2,000)=1,299

By the same token, the permitted band portion allocated to the ONU 26#i3 is 3,000×0(1,928+3,000+0+2,000)=0

Likewise, the permitted band portion allocated to the ONU 26#i4 is 3,000×2,000(1,928+3,000+0+2,000)=866.

2-9: At a step S136 of the flowchart shown in FIG. 36, the past-use-information-updating unit 112 computes a weighted average of a first past-use band variable computed in the past and an individual shared band portion allocated this time for each of the ONUs 26#ij where j=1 to n in accordance with Eq. (4). In this case, the individual shared band portion is the sum of a band portion proportional to the in-buffer-information amount, a band portion proportional to a first past-use band variable and a band portion proportional to the smaller one of a guaranteed minimum band portion and an insufficient band portion. The weighted averages are stored each as an updated first past-use band variable in the ONU-specific-parameter management table 204. Also as described earlier, the individual shared band portion, that is, the sum of a band portion proportional to the in-buffer-information amount, a band portion proportional to a first past-use band variable and a band portion proportional to the smaller one of a guaranteed minimum band portion and an insufficient band portion, which are allocated to each of the ONUs 26#ij where j=1 to n, is reported to the shared-band-polling-information-generating unit 78.

As described above, in addition to the effects provided by the fifth embodiment, the sixth embodiment also exhibits the following effect. If the sum of the insufficient band portions is greater than upper limit of the total shared band, the greater the sum of the insufficient band portions, the greater the band portion proportional to a guaranteed minimum. A band portion proportional to a guaranteed minimum is an allocation with a guaranteed minimum band portion taken into consideration. Since an insufficient band portion is proportional to the in-buffer-information amount, the more the congestion in an ONU, the greater the allocated band portion proportional to a guaranteed minimum. That is to say, a guaranteed minimum band portion can be surely allocated even if congestion occurs. Thus, since a minimum band portion can be guaranteed for each ONU, to a certain degree, this embodiment is capable of keeping up with a GFR service requiring that a minimum band portion be guaranteed for each connection.

Seventh Embodiment

Figure 39:
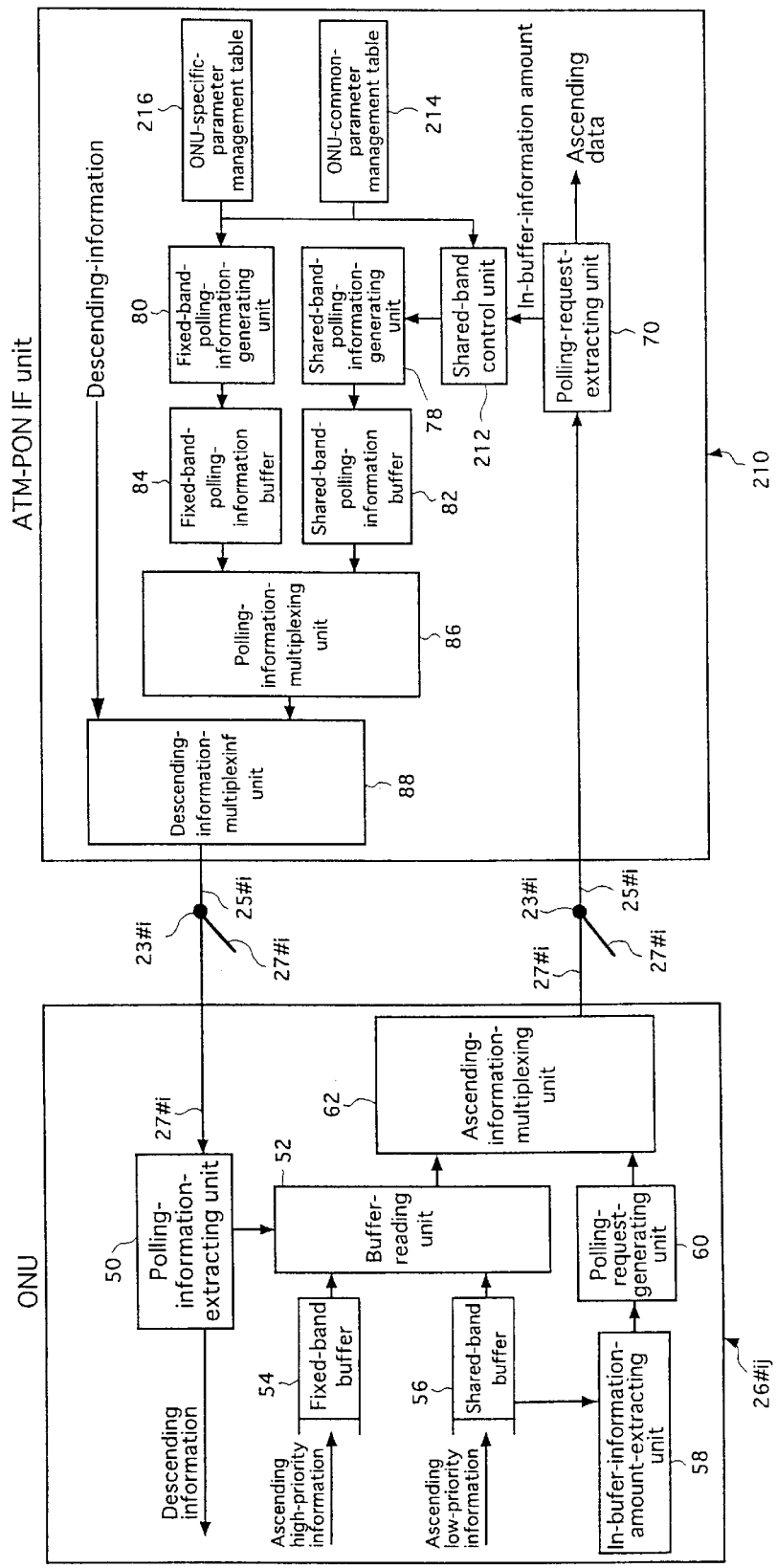
FIG. 39 is a functional block diagram showing an ATM-PON IF unit implemented by a seventh embodiment of the present invention.

FIG. 39 is a functional block diagram showing an ATM-PON IF unit 210 implemented by a seventh embodiment of the present invention. Components of the seventh embodiment virtually identical with those employed in the sixth embodiment shown in FIG. 32 are denoted by the same reference numerals as the latter. The ATM-PON IF unit 210 implemented by the seventh embodiment is different from the ATM-PON IF unit 200 implemented by the sixth embodiment in that the ATM-PON IF unit 210 reduces a guaranteed minimum band portion of an ONU, which has been receiving a band portion greater than the guaranteed minimum band portion for the ONU in the past, at a rate not exceeding an allowable rate of change in guaranteed minimum band portion but, reversely, the ATM-PON IF unit 210 increases a guaranteed minimum band portion of an ONU, which has been receiving a band portion smaller than the guaranteed minimum band portion for the ONU in the past, at a rate not exceeding the allowable rate of change in guaranteed minimum band portion.

Figure 40:
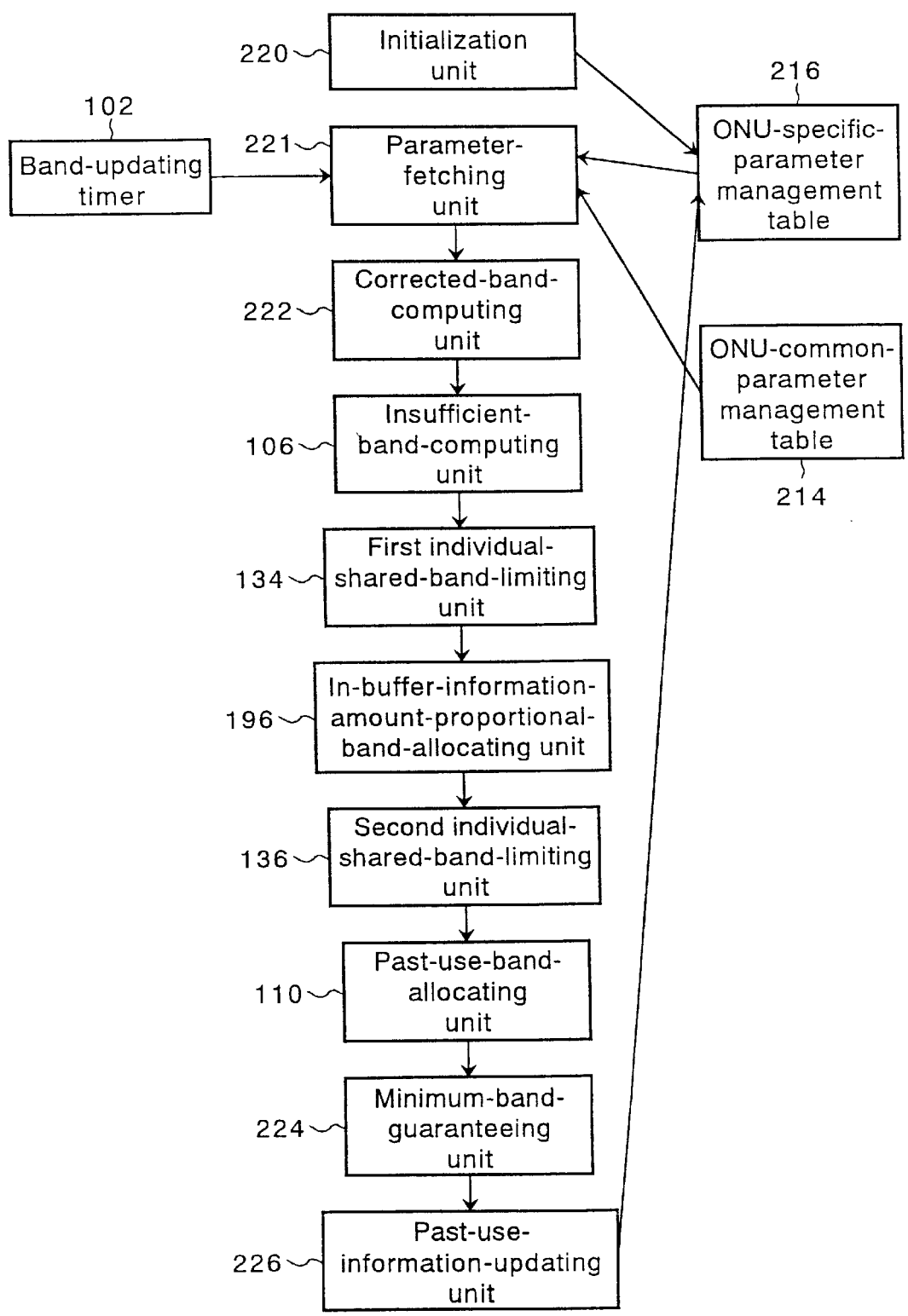
FIG. 40 is a functional block diagram showing a shared-band control unit employed in the ATM-PON IF unit shown in FIG. 39.

FIG. 40 is a functional block diagram showing a shared-band control unit 212 employed in the ATM-PON IF unit 210 shown in FIG. 39. Components of the shared-band control unit 212 virtually identical with those employed in the shared-band control unit 202 shown in FIG. 33 are denoted by the same reference numerals as the latter. An initialization unit 220 initializes a first past-use band variable and a second past-use band variable for each of the ONUs 26#ij where j=1 to n. The second past-use band variable is initialized at a value equal to that of the first past-use band variable. A parameter-fetching unit 221 fetches a weight of a presently allocated individual shared band portion and a weight of a previously calculated second past-use band variable, which are used for updating the previously calculated second past-use band variable, from an ONU-common parameter management table 214, and an allowable rate of change in guaranteed minimum band portion for each of the ONUs 26#ij where j=1 to n from an ONU-specific-parameter management table 216 in addition to a variety of parameters fetched by the parameter-fetching unit 205 shown in FIG. 33.

A corrected-band-computing unit 222 computes a corrected band portion for each of the ONUs 26#ij where j=1 to n from the following equation:

> Corrected band portion=Guaranteed minimum band portion−(Second past-value variable−Guaranteed minimum band portion)

Since the second past-value variable of any of the ONUs 26#ij where j=1 to n is an individual shared band portion allocated in the past to the ONU 26#ij, the term (Second past-value variable−Guaranteed minimum band portion) indicates an individual shared band portion allocated in the past to the ONU 26#ij in comparison with or relative to the guaranteed minimum band portion assigned to the ONU 26#ij. To be more specific, a positive term indicates that the individual shared band portion allocated in the past to the ONU 26#ij is greater than the guaranteed minimum band portion assigned to the ONU 26#ij. On the other hand, a negative term indicates that the individual shared band portion allocated in the past to the ONU 26#ij is smaller than the guaranteed minimum band portion assigned to the ONU 26#ij. Since a corrected band portion is used as a replacement of a guaranteed minimum band portion, the corrected band portion has an effect of reducing a guaranteed minimum band portion of an ONU26 #ij, which has been receiving an individual shared band portion greater than the guaranteed minimum band portion for the ONU 26#ij in the past, but, reversely increasing a guaranteed minimum band portion of an ONU 26#ij, which has been receiving an individual shared band portion smaller than the guaranteed minimum band portion for the ONU 26#ij in the past. If a corrected band portion goes beyond an allowable range of the guaranteed minimum band portion, the corrected band portion is set at a value on a limit of the range.

A minimum-band-guaranteeing unit 224 allocates band portions on a rationing basis as described above by using a corrected band portion computed by the corrected-band-computing unit 222 as a guaranteed minimum band. That is to say, a portion of the guaranteed minimum band part allocated to any of the ONUs 26#ij where j=1 to n is proportional to the smaller value of the corrected band portion and the insufficient band portion of the ONUs 26#ij.

A past-use-information-updating unit 226 updates the first past-use band variable in accordance with Eq. (4) and the second past-use band variable in accordance with Eq. (7) for each of the ONUs 26#ij where j=1 to n as follows:

The second past-use band variable=$(n\_new2 \times bw + w\_old2 \times rireki\_old2)/(w\_new2 + w\_old2)$ (7)

where notation bw denotes an individual shared band portion allocated to each of the ONUs 26#ij where j=1 to n this time, notation rireki_old2 denotes the second past-use band variable computed in a previous band-updating operation, notation w_new2 denotes a weight for the shared band portion bw and notation w_old2 denotes a weight for rireki_old2. The weights w_new2 and w_old2 are each a positive real number. In this case, the individual shared band portion bw is the sum of a band portion proportional to an in-buffer-information amount, a band portion proportional to a first past-use band variable and a band portion proportional to the smaller one of a corrected band portion and an insufficient band portion.

FIG. 41 is a diagram showing the configuration of the ONU-common parameter management table 214 used in the ATM-PON IF unit 210 shown in FIG. 39. As shown in FIG. 41, the ONU-common-parameter management table 214 includes a weight of a presently allocated individual shared band portion and a weight of a previously calculated second past-use band variable, which are used for updating the previously calculated second past-use band variable, in addition to the ONU-common parameters cataloged in the ONU-common-parameter management table 192 shown in FIG. 29. As shown in the figure, the weight of a presently allocated individual shared band portion and the weight of a previously calculated second past-use band variable have typical values of 1 and 9 respectively. On the other hand, the weight of a presently allocated individual shared band portion and the weight of a previously calculated first past-use band variable have typical values of 1 and 3 respectively. Thus, a more weight is placed on the individual shared band portion proportional to the second past-use band variable more than the first past-use band variable.

FIG. 42 is a diagram showing the configuration of the ONU-specific-parameter management table 216 used in the ATM-PON IF unit 210 shown in FIG. 39. As shown in FIG. 42, the ONU-specific-parameter management table 216 includes an allowable rate of change in guaranteed minimum band portion for each of the ONU 26#ij where j=1 to n in addition to the ONU-specific parameters cataloged in the ONU-specific-parameter management table 204 shown in FIG. 34.

Figure 43:
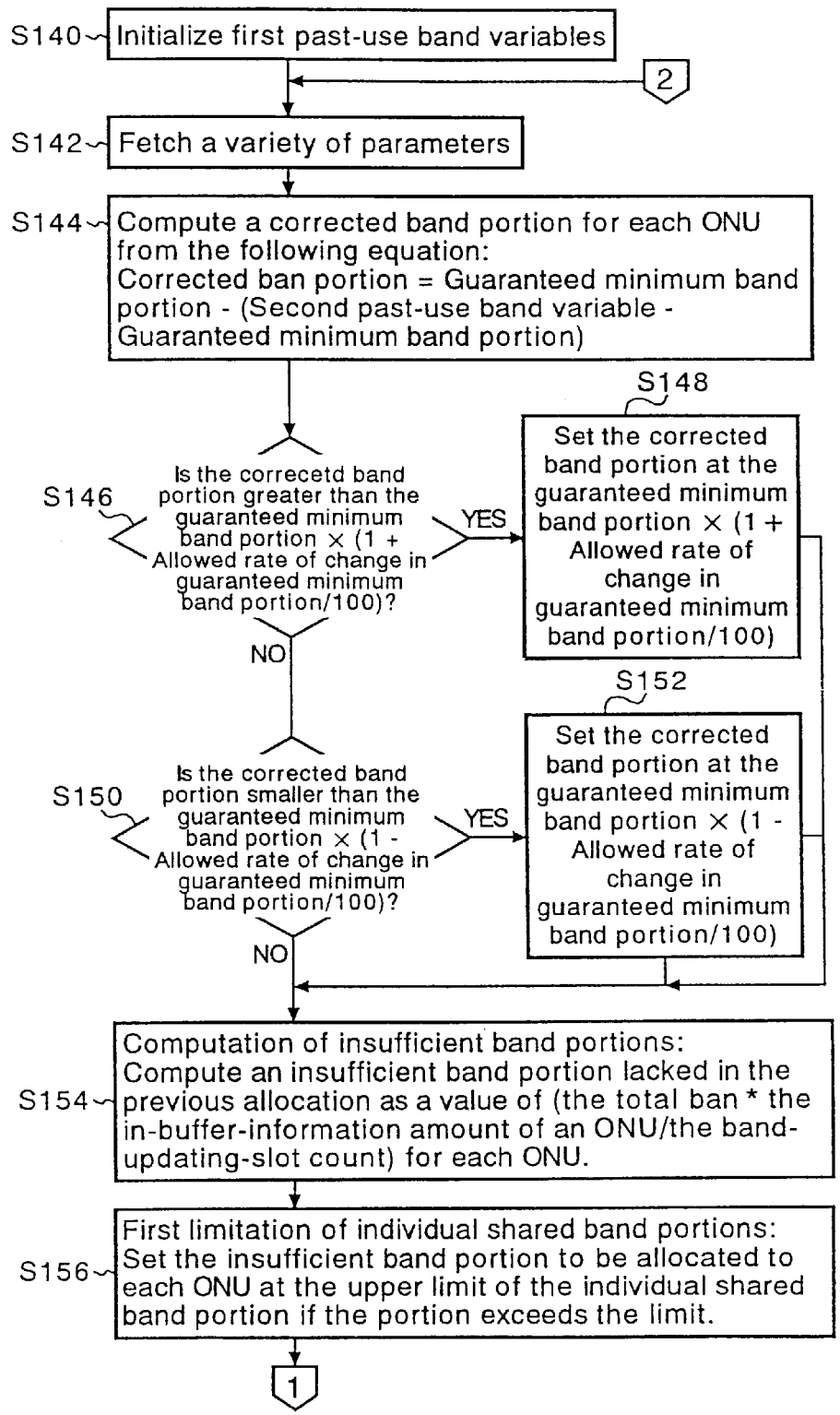
FIG. 43 shows a flowchart representing operations of the shared-band control unit.

FIGS. 43 and 44 show a flowchart representing operations of the shared-band control unit 212. Since the operations of the blocks employed in the ATM-PON IF unit 210 shown in FIG. 39 except the shared-band control unit 212, the ONU-common-parameter management table 214 and the ONU-specific-parameter management table 216 are virtually the same as their counterparts shown in FIG. 32, only the operation of the shared-band control unit 212 shown in FIG. 40 is explained by referring to the flowchart shown in FIGS. 43 ad 44 as follows.

1: Initialization of First and Second Past-Use Band Variables

The flowchart shown in FIG. 43 begins with a step S140 at which the initialization unit 220 employed in the ATM-PON IF unit 210 initializes the first and second past-use band variables and stores the initialized variables in the ONU-specific-parameter management table 216.

2: Allocation of the Shared Band 2-1: For each band-updating period, the band-updating timer 102 informs the parameter-fetching unit 221 that the band-updating period has lapsed.

2-2: At a step S142 of the flowchart shown in FIG. 43, the parameter-fetching unit 221 retrieves a total band of 5,000, a total shared band upper limit of 2,000, a band-updating slot count of 1,500, a weight of 1 assigned to a presently allocated individual shared band portion for updating a first past-use band variable, a weight of 3 for a previously calculated first past-use band variable, a weight of 1 assigned to a presently allocated individual shared band portion for updating a second past-use band variable, a weight of 9 for a previously calculated second past-use band variable, CMAX of 3 and MAX_RATIO of 0.5 from the ONU-common-parameter management table 214 shown in FIG. 41. The parameter-fetching unit 221 also retrieves an ONU number, an upper limit of an individual shared band, an in-buffer-information amount, a first past-use band variable, a guaranteed minimum band portion and an allowed rate of change in guaranteed minimum band portion for each of the ONUs 26#ij where j=1 to n from the ONU-specific-parameter management table 216 shown in FIG. 42.

2-3: At a step S144 of the flowchart shown in FIG. 43, the corrected-band-computing unit 222 computes a corrected band portion for each of the ONUs 26#ij where j=1 to n from the following equation:

Corrected band portion=Guaranteed minimum band portion−(Second past-value variable−Guaranteed minimum band portion)

At a step S146, the corrected-band-computing unit 222 forms a judgment as to whether or not the corrected band portion is greater than the guaranteed minimum band portion×(1+Allowed rate of change in guaranteed minimum band portion/100). If the corrected band portion is greater than the guaranteed minimum band portion×(1+Allowed rate of change in guaranteed minimum band portion/100), the flow of the processing goes on to a step S148. If the corrected band portion is not greater than the guaranteed minimum band portion×(1+Allowed rate of change in guaranteed minimum band portion/100), on the other hand, the flow of the processing goes on to a step S150. At the step S148, the corrected band portion is forcibly set at the guaranteed minimum band portion X (1+Allowed rate of change in guaranteed minimum band portion/100).

At a step S150, the corrected-band-computing unit 222 forms a judgment as to whether or not the corrected band portion is smaller than the guaranteed minimum band portion×(1−Allowed rate of change in guaranteed minimum band portion/100). If the corrected band portion is smaller than the guaranteed minimum band portion×(1−Allowed rate of change in guaranteed minimum band portion/100), the flow of the processing goes on to a step S152. If the corrected band portion is not smaller than the guaranteed minimum band portion×(1−Allowed rate of change in guaranteed minimum band portion/100), on the other hand, the flow of the processing goes on to a step S154. At the step S152, the corrected band portion is forcibly set at the guaranteed minimum band portion×(1−Allowed rate of change in guaranteed minimum band portion/100).

2-4: At a step S154 of the flowchart shown in FIG. 43, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-5: At a step S156 of the flowchart shown in FIG. 43, the first individual-shared-band-limiting unit 134 sets the insufficient band portion to be allocated to each of the ONUs 26#ij where j=1 to n at the upper limit of the individual shared band portion if the portion exceeds the limit.

2-6: At a step S158 of the flowchart shown in FIG. 44, the in-buffer-information-amount-proportional-band-allocating unit 196 carries out the following processing. First of all, the in-buffer-information-amount-proportional-band-allocating unit 196 computes a sum of the insufficient band portions allocated to all of the ONUs 26#ij where j=1 to n. Then, the in-buffer-information-amount-proportional-band-allocating unit 196 finds a coefficient y from a band-correcting function h(x) given by Eq. (6) where x is a ratio of the sum of the insufficient band portions allocated to all the ONUs 26#ij where j=1 to n to the upper limit of the total shared band. Then, the in-buffer-information-amount-proportional-band-allocating unit 176 multiplies each insufficient band portion by the coefficient y, which is found from the band-correcting function h(x). The product of the insufficient band of each of the ONUs 26#ij where j=1 to n and the coefficient y is used as an in-buffer-information-amount-proportional band portion, which is proportional to the in-buffer-information amount, to each of the ONUs 26#ij where j=1 to n.

2-7: At a step S160 of the flowchart shown in FIG. 44, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-8: If the sum of the insufficient band portions allocated to all the ONUs 26#ij where j=1 to n is smaller than the upper limit of the total shared band, the past-use-band-allocating unit 110 carries out the following processing at a step S162 of the flowchart shown in FIG. 44. First of all, the past-use-band-allocating unit 110 computes a band part of past use as a difference between the upper limit of the total shared band and the sum of the insufficient band portions allocated to all the ONUs 26#ij where j=1 to n. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use×the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n.

2-9: If the sum of the insufficient band portions allocated to all the ONUs 26#ij where j=1 to n is greater than the upper limit of the total shared band, the minimum-band guaranteeing unit 206 carries out the following processing at a step S164 of the flowchart shown in FIG. 44. First of all, the minimum-band guaranteeing unit 206 multiplies a sum of a band portion proportional to an in-buffer-information amount and a band portion proportional to a first past-use band variable by the third coefficient for each of ONUs 26#ij, for which the sum of the band portion proportional to the in-buffer-information amount and the band portion proportional to a first past-use band variable does not exceed the upper limit of the total shared band. The third coefficient is given as f(x) by Eq. (3) where x is a ratio of a sum of the insufficient portions to the upper limit of the total shared band. The minimum-band guaranteeing unit 206 then calculates a guaranteed minimum band part in accordance with the following equation:

> Guaranteed minimum band part=Upper limit of total shared band−(Sum of band portions proportional to in-buffer-information amounts+Sum of band portions proportional to first past-use band variables)×Third coefficient=Upper limit of total shared band×(1−Third coefficient)

The guaranteed minimum band part is allocated to the ONUs 26#ij where j=1 to n on a rationing basis. That is to say, a portion of the guaranteed minimum band part allocated to any of the ONUs 26#ij where j=1 to n is proportional to the smaller value of the guaranteed minimum band portion and the insufficient band portion of the ONUs 26#ij. It should be noted that the guaranteed minimum band portion is the corrected band portion computed by the corrected-band-computing unit 222 as described above.

FIG. 45 is a diagram showing a typical result of allocation of band portions proportional to the smaller value of the corrected guaranteed minimum band portion and the insufficient band portion. The figure shows band portions allocated to ONUs 26#ij where j=1 to n (=4), namely, the ONU 26#i1, the ONU 26#i2, the ONU 26#i3 and the ONU 26#i4. The in-buffer-information amounts of the ONU 26#i1, the ONU 26#i2, the ONU 26#i3 and the ONU 26#i4 are 400, 800, 0 and 3,350 respectively. The total band, the upper limit of the total shared band and the buffer-updating period expressed in terms of time slots (or the buffer-updating-slot count) is 18,398, 18,350 and 3,816 respectively. The insufficient band portion allocated to each ONU can be found by using Eq. (2) as follows:

> Insufficient band portion of an ONU=Total band×In-buffer-information amount the ONU/Band-updating-slot count Thus, an insufficient band portion allocated to the ONU 26#i1 is

> 18,398×400/3,816=1,928

In the same way, an insufficient band portion allocated to the ONU 26#i2 is

> 18,398×800/3,816=3,857

By the same token, an insufficient band portion allocated to the ONU 26#i3 is 18,398×0/3,816=0

Likewise, an insufficient band portion allocated to the ONU 26#i4 is 18,398×3,350/3,816=16,151

The sum of the insufficient band portions is 21,936, which is greater than the total-shared-band upper limit of 18,350.

Assume that the second past-use band variables of the ONUs 26#i1, 26#i2, 26#i3 and 26#i4 are 1,900, 3,500, 600 and 3,000 respectively whereas the guaranteed minimum band portions assigned to the ONUs 26#i1, 26#i2, 26#i3 and 26#i4 are 2,000, 3,000, 3,000 and 2,000 respectively. As described above, a corrected band portion is computed as follows:

Corrected band portion=Guaranteed minimum band portion−(Second past-value variable−Guaranteed minimum band portion)

Assuming that the allowable rate of change in guaranteed minimum band portion is 10% for the ONUs 26#i1, 26#i2, 26#i3 and 26#i4. As described above, the corrected band portion for an ONU 26#ij where j=1 to 4 must be within a range between the guaranteed minimum band portion of the ONU 26#ij+−10% and the guaranteed minimum band portion of the ONU 26#ij−10%. Thus, the corrected band portion of the ONU 26#i1 is:

2,000−(1,900−2,000)=2,100

In the same way, the corrected band portion of the ONU 26#i2 is:

3,000−(3,500−3,000)=2,500 which is raised to 2,700(=3,000×90%)

By the same token, the corrected band portion of the ONU 26#i3 is:

3,000−(600−3,000)=5,400 which is reduced to 3,300(=3,000× 110%)

Likewise, the corrected band portion of the ONU 26#i4 is:

2,000−(3,000−2,000)=1,000 which is raised to 1,800(=2,000×90%)

Let a permitted band portion represent the smaller value of the insufficient band portion and the corrected band portion. The permitted band portions of the ONU 26#i1, the ONU 26#i2, the ONU 26#i3 and the ONU 26#i4 are thus 1,928, 2,700, 0 and 1,800 respectively. A circle mark shown on the column of the permitted band portion in the figure indicates that the insufficient band portion is smaller than the guaranteed minimum band portion. On the other hand, a cross mark shown on the column of the permitted band portion in the figure indicates that the insufficient band portion is greater than the guaranteed minimum band portion.

As described above,

Guaranteed minimum band part=Upper limit of total shared band× (1−Third coefficient)=Upper limit of total-shared-band upper limit of total shared band×Upper limit of total shared band/ Sum of the insufficient band portions=18,350−18,350×18,350/ 21,936=3,000.

Thus, the permitted band portion allocated to the ONU 26#i1 is 3,000×1,928(1,928+2,700+0+1,800)=900

In the same way, the permitted band portion allocated to the ONU 26#i2 is 3,000×2,700(1,928+2,700+0+1,800)=1,260

By the same token, the permitted band portion allocated to the ONU 26#i3 is 3,000×0(1,928+2,700+0+1,800)=0

Likewise, the permitted band portion allocated to the ONU 26#i4 is 3,000×1,800(1,928+2,700+0+1,800)=840.

2-10: At a step S166 of the flowchart shown in FIG. 44, the past-use-information updating unit 226 computes a weighted average of a first past-use band variable computed in the past and an individual shared band portion allocated this time for each of the ONUs 26#ij where j=1 to n in accordance with Eq. (4). In this case, the individual shared band portion is the sum of a band portion proportional to the in-buffer-information amount, a band portion proportional to a first past-use band variable and a band portion proportional to the smaller one of a corrected band portion and an insufficient band portion. The weighted averages are stored each as an updated first past-use band variable in the ONU-specific-parameter management table 216. By the same token, the past-use-information updating unit 226 computes a weighted average of a second past-use band variable computed in the past and an individual shared band portion allocated this time for each of the ONUs 26#ij where j=1 to n in accordance with Eq. (7). The weighted averages are stored each as an updated second past-use band variable in the ONU-specific-parameter management table 216. Also as described earlier, the individual shared band portion, that is, the sum of a band portion proportional to the in-buffer-information amount, a band portion proportional to a first past-use band variable and a band portion proportional to the smaller one of a corrected band portion and an insufficient band portion, which are allocated to each of the ONUs 26#ij where j=1 to n, is reported to the shared-band-polling-information-generating unit 78.

As described above, in addition to the effects provided by the sixth embodiment, the seventh embodiment also exhibits the following effect. A guaranteed minimum band portion of an ONU, which has been receiving a band portion greater than the guaranteed minimum band portion for the ONU in the past, is reduced at a rate not exceeding an allowable rate of change in guaranteed minimum band portion. Reversely, a guaranteed minimum band portion of an ONU, which has been receiving a band portion smaller than the guaranteed minimum band portion for the ONU in the past, is increased at a rate not exceeding the allowable rate of change in guaranteed minimum band portion. Thus, an ONU, which has been receiving a band portion much greater than the guaranteed minimum band portion for the ONU never coexists with an ONU, which has been receiving a band portion much smaller than the guaranteed minimum band portion for the ONU. As a result, fair band allocation is maintained.

Eighth Embodiment

Figure 46:
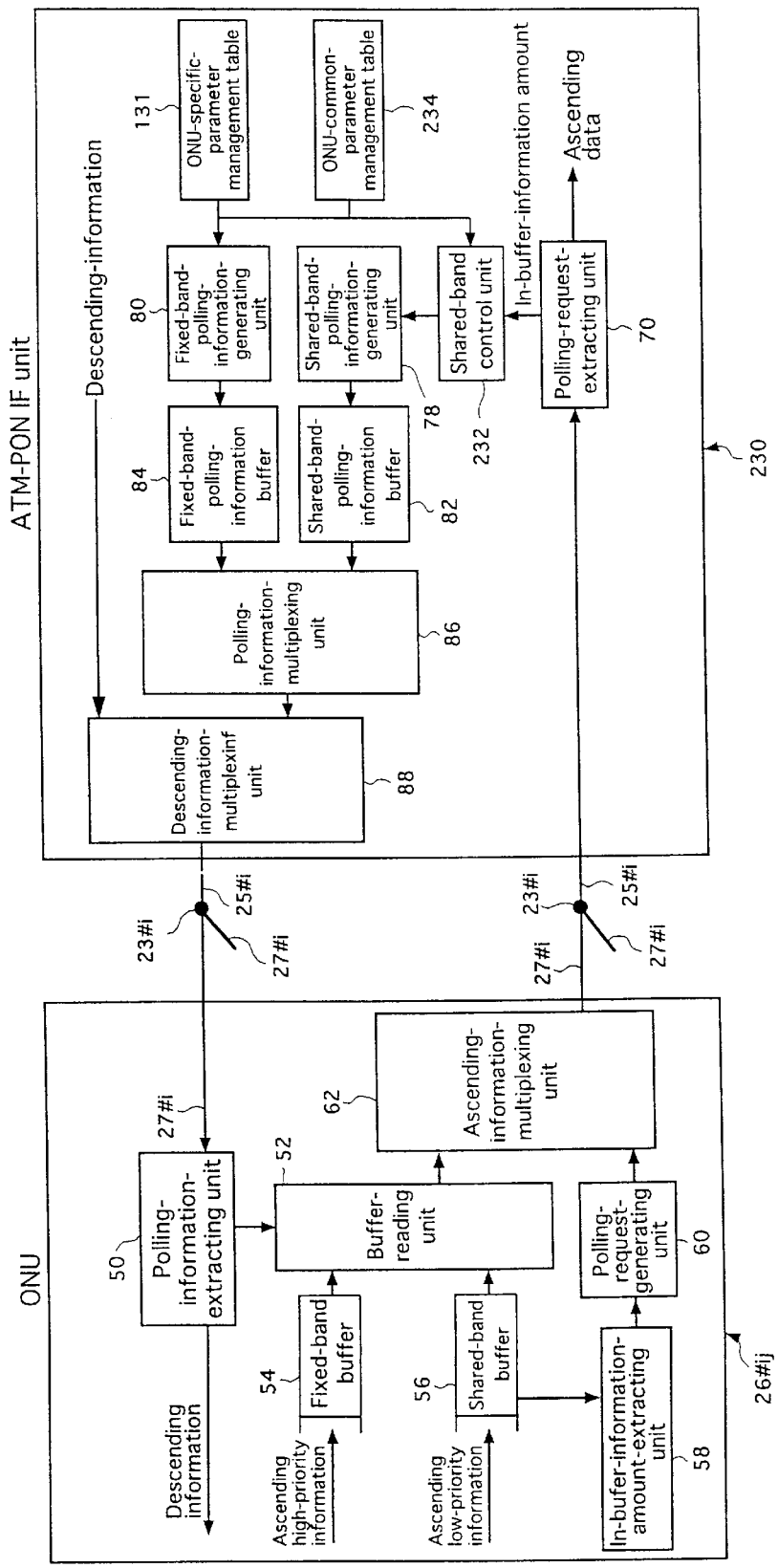
FIG. 46 is a functional block diagram showing an ATM-PON IF unit implemented by an eighth embodiment of the present invention.

FIG. 46 is a functional block diagram showing an ATM-PON IF unit 230 implemented by an eighth embodiment of the present invention. Components of the eighth embodiment virtually identical with those employed in the second embodiment shown in FIG. 12 are denoted by the same reference numerals as the latter. The ATM-PON IF unit 230 implemented by the eighth embodiment is different from the ATM-PON IF unit 129 implemented by the second embodiment in that, in the case of the ATM-PON IF unit 230, an upper limit of an individual shared band portion is reflected in the expression for computing a weighted average of a first past-use band variable for the following reason.

For example, if all ONUs stop communication with a specific ONU in a state in which an individual shared band portion allocated to this specific ONU is set at 0, the band portion allocated to the specific ONU will remain at 0 all the time. If the specific ONU starts communication in this state, it will take some time before a band portion is allocated to this ONU, causing a big delay. In order to solve this problem, a band portion greater than a predetermined size is allocated to each ONU even if all ONUs stop communication. To allocate such a band portion, parameters for computing a first past-use band variable include an upper limit of an individual shared band portion and a weight for the upper limit of the individual shared band portion that a band portion allocated to each ONU approaches the upper limit of the individual shared band portion allocated to the ONU. It should be noted that, while this technological concept can be applied to any of the first to ninth embodiments, the following description explains an application of the concept to the second embodiment.

Figure 47:
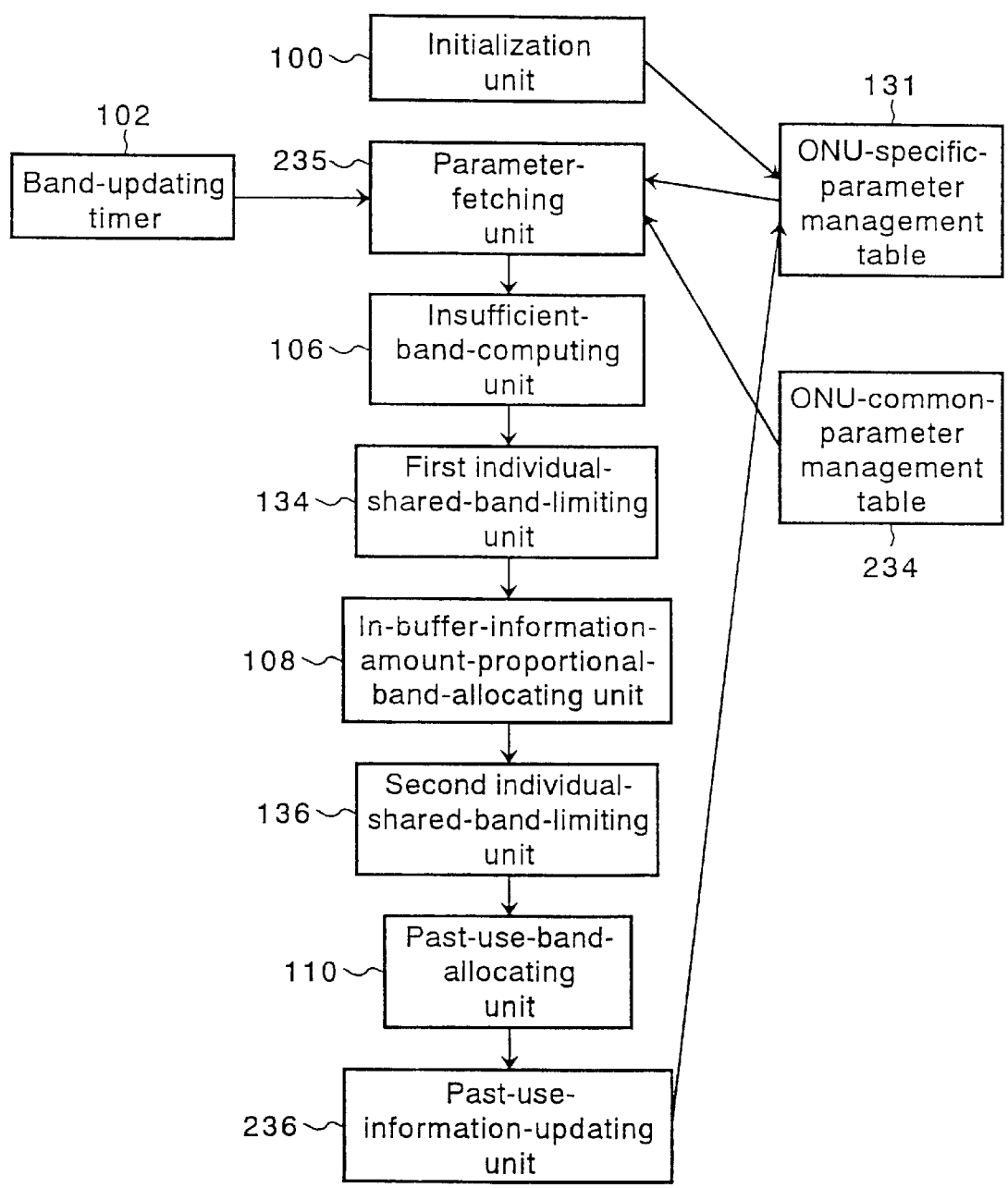
FIG. 47 is a functional block diagram showing a shared-band control unit employed in the ATM-PON IF unit shown in FIG. 46.

FIG. 47 is a functional block diagram showing a shared-band control unit 232 employed in the ATM-PON IF unit 230 shown in FIG. 46. Components of the shared-band control unit 232 virtually identical with those employed in the parameter-fetching unit 132 shown in FIG. 13 are denoted by the same reference numerals as the latter. A parameter-fetching unit 235 also fetches a weight for an upper limit of an individual shared band portion from an ONU-common parameter management table 234 shown in FIG. 48 in addition to a variety of parameters fetched by the parameter-fetching unit 132 shown in FIG. 13. A past-use-information-updating unit 236 updates a first past-use band variable for each of the ONUs 26#ij where j=1 to n in accordance with Eq. (8) as follows:

The first past-use band variable=$(w\_new1 \times bw + w\_old1 \times rireki\_old1 + w\_max \times bw\_max) / (w\_new1 + w\_old1 + w\_max)$ (8)

where notation bw denotes a shared band portion allocated to each of the ONUs 26#ij where j=1 to n this time, notation rireki_old1 denotes the first past-use band variable computed in a previous band-updating operation, notation bw_max is an upper limit of the shared band portion, notation w_new1 denotes a weight for the shared band portion bw, notation w_old1 denotes a weight for rireki_old1 and notation w_max denotes a weight for bw_max. The shared band portion bw is the sum of a band portion proportional to an in buffer-information amount proportional band portion and a band portion proportional to a first past-use band variable. The weights w_new1, w_old1 and w_max are each a positive real number.

FIG. 48 is a diagram showing the configuration of the ONU-common parameter management table 234 used in the ATM-PON IF unit 230 shown in FIG. 46. As shown in FIG. 48, the ONU-common-parameter management table 234 includes a weight for an upper limit of any individual shared band portion in addition to a variety of ONU-common parameters cataloged in the ONU-common-parameter management table 74 shown in FIG. 5. As shown in the figure, the weight of a presently allocated individual shared band portion and the weight of a previously calculated first past-use band variable have typical values of 2 and 6 respectively. On the other hand, the weight for an upper limit of any individual shared band portion has a value of 1. Thus, a less weight is placed on the upper limit of an individual shared band portion.

FIG. 49 shows a flowchart representing operations of the shared-band control unit 232. Since the operations of the blocks employed in the ATM-PON IF unit 230 shown in FIG. 46 except the shared-band control unit 232 and the ONU-common-parameter management table 234 are virtually the same as their counterparts shown in FIG. 12, only the operation of the shared-band control unit 232 shown in FIG. 47 is explained by referring to the flowchart shown in FIG. 49 as follows.

1: Initialization of the First Past-Use Band Variables

The flowchart shown in FIG. 49 begins with a step S170 at which an initialization unit 220 employed in the shared-band control unit 232 initializes the first past-use band variables and stores the initialized variables in the ONU-specific-parameter management table 131.

2: Allocation of the Shared Band 2-1: For each band-updating period, the band-updating timer 102 informs the parameter-fetching unit 235 that the band-updating period has lapsed.

2-2: At a step S172 of the flowchart shown in FIG. 49, the parameter-fetching unit 235 retrieves a total band of 5,000, a total shared band upper limit of 2,000, a band-updating slot count of 1,500, a weight of 2 for a presently allocated individual shared band portion, a weight of 6 for a previously calculated first past-use band variable and a weight of 1 for an upper limit of any individual shared band portion from the ONU-common-parameter management table 234 shown in FIG. 48. The unit 235 also retrieves an ONU number, an upper limit of an individual shared band, an in-buffer-information amount and a first past-use band variable for each of the ONUs 26#ij where j=1 to n from the ONU-specific-parameter management table 131 shown in FIG. 14.

2-3: At a step S174 of the flowchart shown in FIG. 49, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S176 of the flowchart shown in FIG. 49, the first individual-shared-band-limiting unit 134 sets the insufficient band portion to be allocated to each of the ONUs 26#ij where j=1 to 16 at the upper limit of the individual shared band portion if the portion exceeds the limit. In the case of the ONU 26#i1, for example, the upper limit of the individual shared band portion is 1,000 as shown in the ONU-specific-parameter management table 131 of FIG. 14. In this case, the first individual-shared-band-limiting unit 134 sets the insufficient band portion to be allocated to the ONU 26#i1 at 1,000.

2-5: At a step S178 of the flowchart shown in FIG. 49, the in-buffer-information-amount-proportional-band-allocating unit 108 carries out the following processing. First of all, the in-buffer-information-amount-proportional-band-allocating unit 108 computes a sum of the insufficient band portions allocated to all of the ONUs 26#ij where j=1 to n. If the sum of the insufficient band portions allocated to all the ONUs 26#ij where j=1 to n is greater than the upper limit of the total shared band, the in-buffer-information-amount-proportional-band-allocating unit 108 finds a coefficient y from a band-correcting function f(x)=1/x given by Eq. (3) where x is a ratio of the sum of the insufficient band portions allocated to all the ONUs 26#ij where j=1 to n to the upper limit of the total shared band. Then, the in-buffer-information-amount-proportional-band-allocating unit 108 multiplies each insufficient band portion by the coefficient y, which is found from the band-correcting function f, to limit the insufficient band portion so that the sum of the insufficient band portions for all the ONUs 26#ij where j=1 to n becomes equal to or smaller than the upper limit of the total shared band. The product of the insufficient band of each of the ONUS 26#ij where j=1 to n and the coefficient y is used as an in-buffer-information-amount-proportional band portion, which is proportional to the in-buffer-information amount, to each of the ONUS 26#ij where j=1 to n.

2-6: At a step S180 of the flowchart shown in FIG. 49, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-7: If the sum of the insufficient band portions allocated to all the ONUs 26#ij where j=1 to n is smaller than the upper limit of the total shared band, the past-use-band-allocating unit 110 carries out the following processing at a step S182 of the flowchart shown in FIG. 49. First of all, the past-use-band-allocating unit 110 computes a band part of past use as a difference between the upper limit of the total shared band and the sum of the band portion proportional to the in-buffer-information amount. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. At that time, the sum of the band portion proportional to the in-buffer-information amount and the band portion proportional to a first past-use band variable is limited so as not to exceed the upper limit of the individual shared band portion allocated to the ONU 26#ij.

2-8: At a step S184 of the flowchart shown in FIG. 49, the past-use-information-updating unit 236 computes a weighted average of a first past-use band variable computed in the past, an individual shared band portion allocated this time and the upper limit of an individual shared band portion for each of the ONUs 26#ij where j=1 to n in accordance with Eq. (8). As described earlier, the individual shared band portion is the sum of a band portion proportional to the in-buffer-information amount and a band portion proportional to a first past-use band variable. The weighted averages are stored each as an updated first past-use band variable in the ONU-specific-parameter management table 131. Also as described earlier, the individual shared band portion, that is, the sum of a band portion proportional to the in-buffer-information amount and a band portion proportional to a first past-use band variable, which are allocated to each of the ONUs 26#ij where j=1 to n, is reported to the shared-band-polling-information-generating unit 78.

Figure 50:
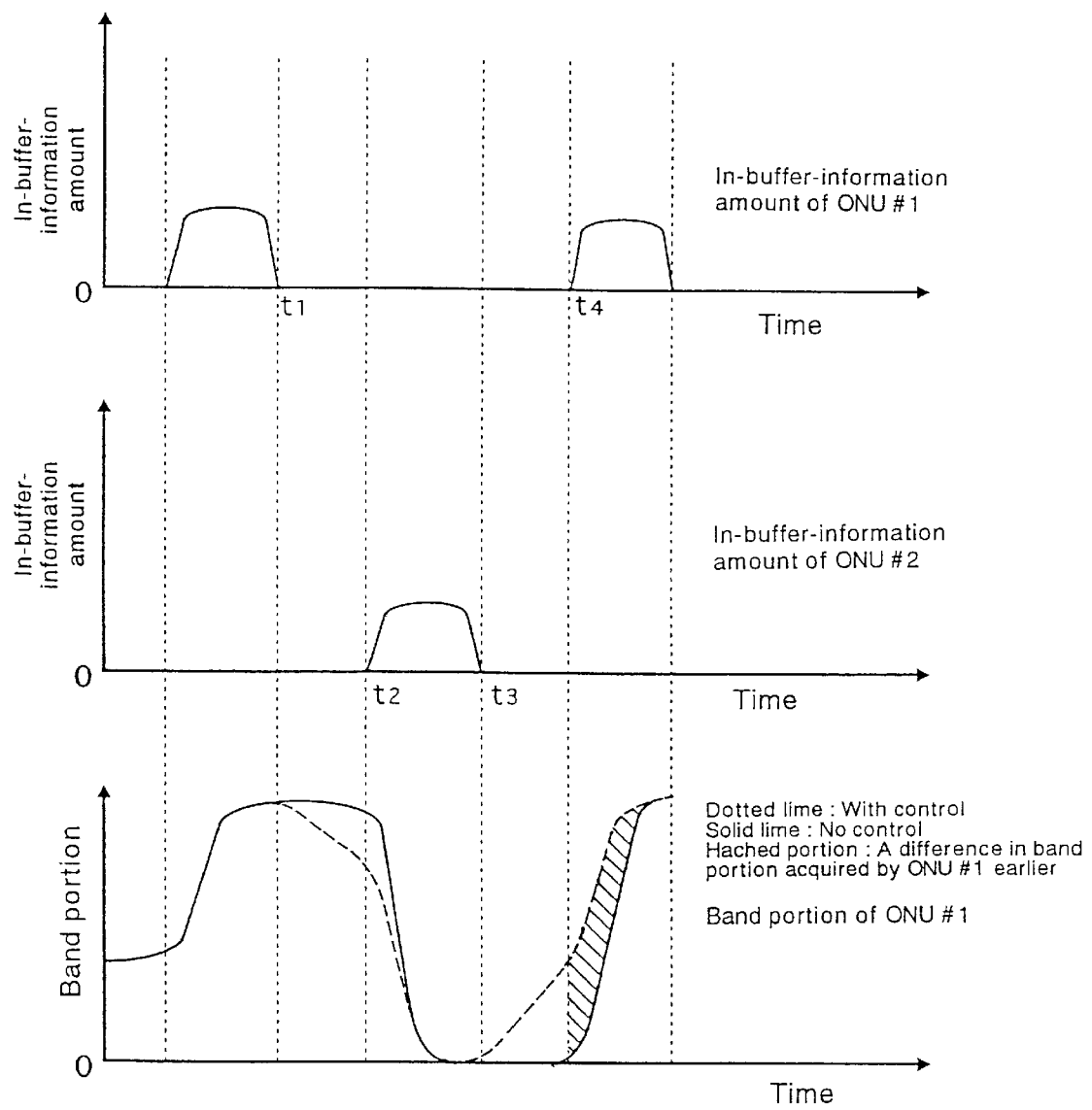
FIG. 50 are diagrams each showing a typical result of allocation of a shared band.

FIG. 50 is diagrams each showing a typical result of allocation of the shared band for ONU #1 and ONU #2 covered by an SLT. The horizontal axes of all the diagrams represent time. The vertical axis of the bottom diagram represents the band portion allocated to ONU #1. The vertical axes of the middle and top diagrams represent the in-buffer-information amounts of ONU #2 and ONU #1 respectively. In the bottom diagram, a dotted line represents a band portion allocated in accordance with the eighth embodiment. On the other hand, a solid line represents a band portion allocated in accordance with the second embodiment. During the period t1 to t4, ONU #1 stops communication and, during the period t2 to t3, ONU #2 carries out communication, where t1<t2<t3<t4.

As shown in the bottom diagram of FIG. 50, at the point of time t1, ONU #1 ceases communication. At that time, since the in-buffer-information amount becomes 0, the band portion allocated to ONU #1 gradually decreases. At the point of time t2, ONU #2 starts communication so that the in-buffer-information amount and the first past-use band variable increase. Thus, the band portion allocated to ONU #2 increases while the band portion allocated to ONU #1 decreases, approaching 0. At the point of time t3, ONU #2 ceases communication. Thus, almost no band portion is allocated to ONU #1 in accordance with the second embodiment at that time as shown by the solid line. In the case of the eighth embodiment, however, a band portion is allocated to ONU #1 to approach the upper limit of the individual shared band portion as shown by the dotted line. As a result, during a period starting from at the point of time t4, ONU #1 is capable of acquiring a larger band portion as indicated by a difference between the dotted and solid lines.

As described above, in addition to the effects provided by the second embodiment, the eighth embodiment also exhibits the following effect. An individual shared band portion is allocated to an ONU with which all other ONUs have stopped communication, gradually approaching the upper limit of the individual shared band portion so that data can be communicated without a delay even if communication is started all of a sudden.

Ninth Embodiment

Figure 51:
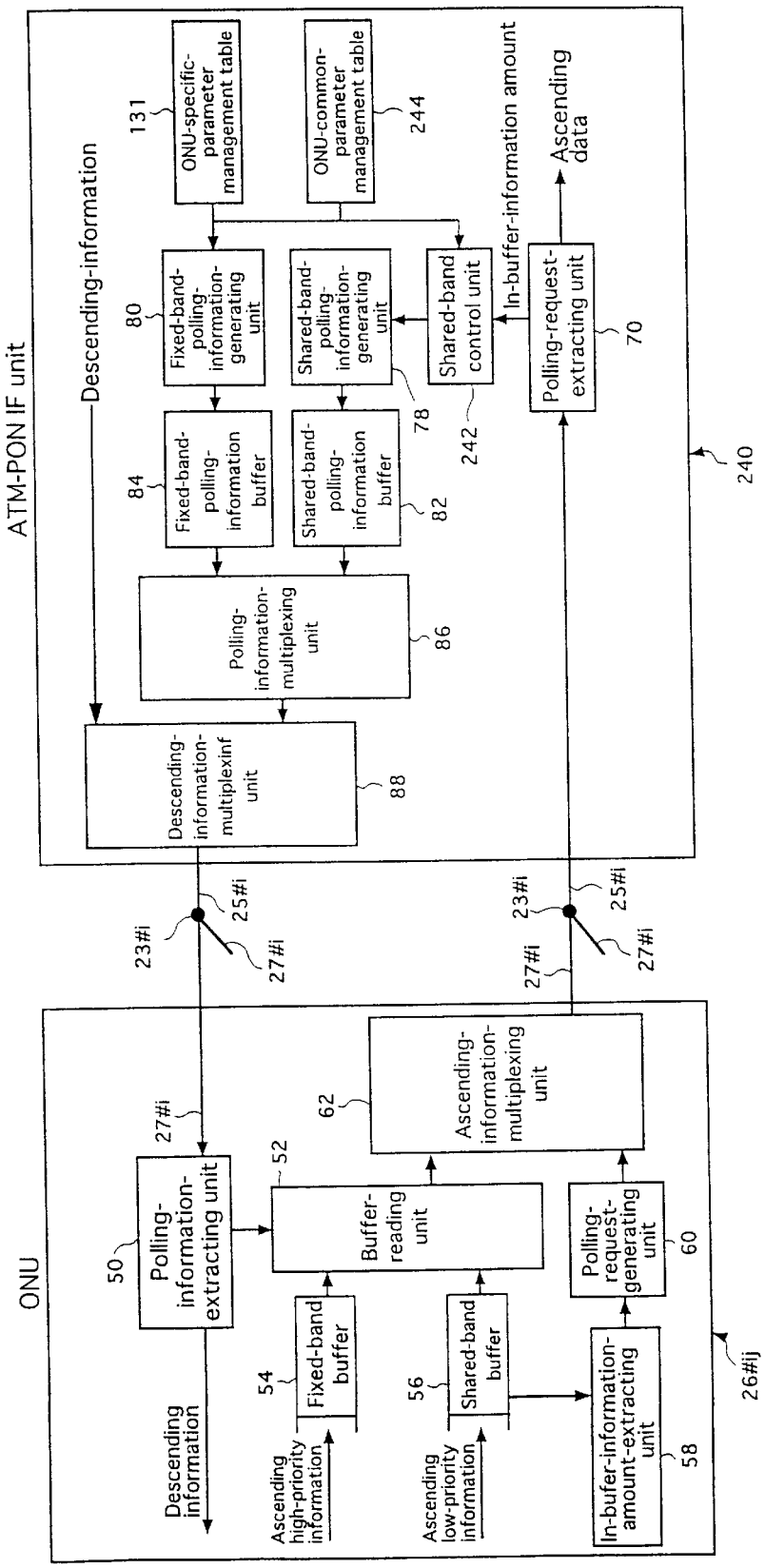
FIG. 51 is a functional block diagram showing an ATM-PON IF unit implemented by a ninth embodiment of the present invention.

FIG. 51 is a functional block diagram showing an ATM-PON IF unit 240 implemented by an ninth embodiment of the present invention. Components of the ninth embodiment virtually identical with those employed in the second embodiment shown in FIG. 12 are denoted by the same reference numerals as the latter. The ATM-PON IF unit 240 implemented by the ninth embodiment is different from the ATM-PON IF unit 129 implemented by the second embodiment in that, in the case of the IF unit 240, processing is carried out by setting specific parameters each at a fixed value in advance. It is thus not necessary to catalog the fixed values of the specific parameters in a ONU-common-parameter table 244. By assigning a fixed value to each of the specific parameters in advance, processing to fetch the specific parameters from the ONU-common-parameter management table 244 can be omitted. In addition, since the algorithm is simplified, the processing speed is increased. Even though a fixed value can be assigned to each of ONU-common parameters cataloged in the ONU-common-parameter tables used in the first to eighth embodiments, in the ninth embodiment, only parameters used in computation of a first past-use band variable are each taken as a specific parameter. To be more specific, the weight of an individual shared band portion allocated this time and the weight of a first past-use band variable computed in the past are set at 1 and 0 respectively.

Figure 52:
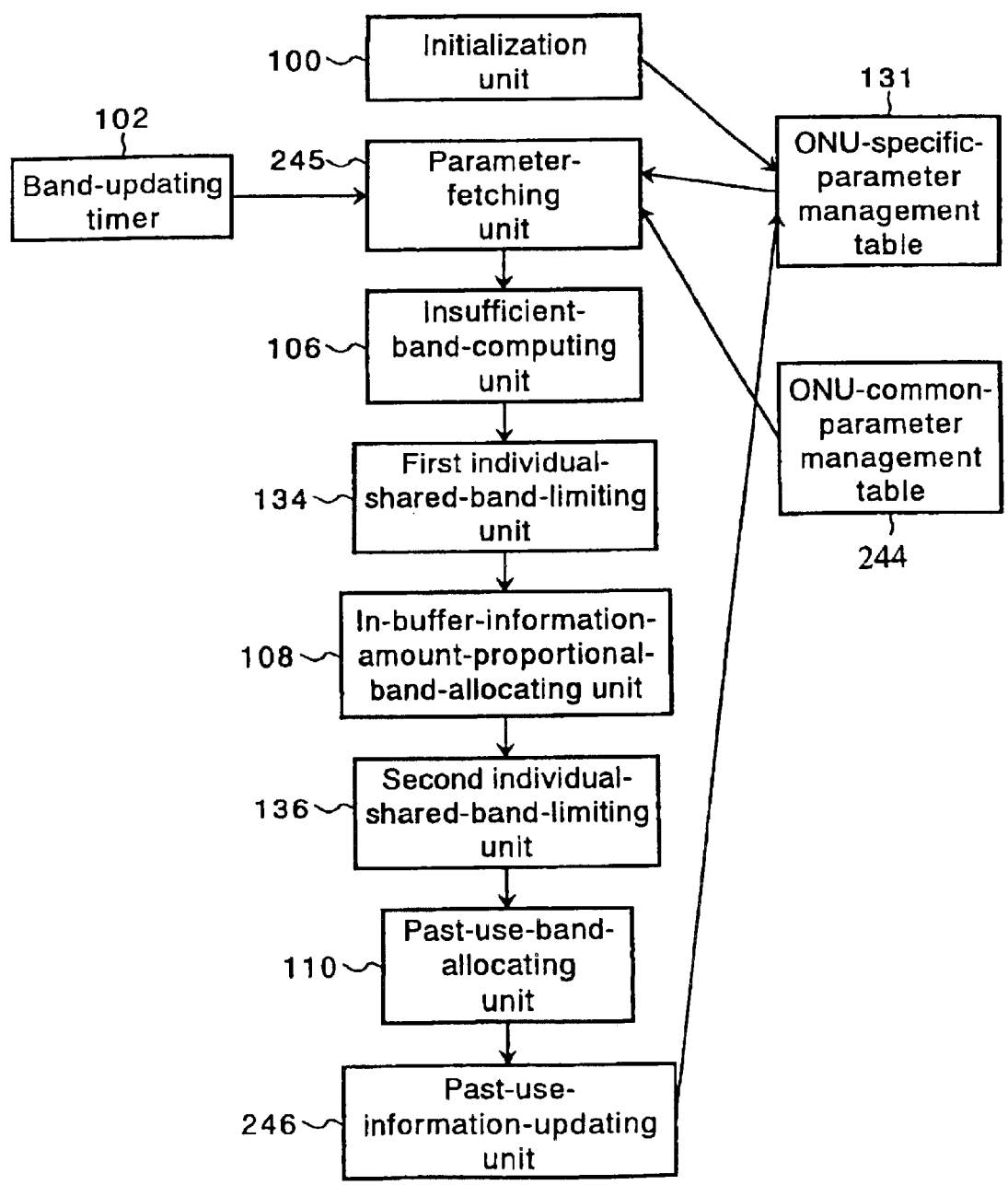
FIG. 52 is a functional block diagram showing a shared-band control unit employed in the ATM-PON IF unit shown in FIG. 51.

FIG. 52 is a functional block diagram showing a shared-band control unit 242 employed in the ATM-PON IF unit 240 shown in FIG. 51. Components of the shared-band control unit 242 virtually identical with those employed in the parameter-fetching unit 132 shown in FIG. 13 are denoted by the same reference numerals as the latter. A parameter-fetching unit 246 also fetches the same parameters as the parameter-fetching unit 132 shown in FIG. 13 except the weight of an individual shared band portion allocated this time and the weight of a first past-use band variable computed in the past from the ONU-common parameter management table 244. A past-use-information-updating unit 248 updates a first past-use band variable for each of the ONUs 26#ij where j=1 to n by setting the variable at a value equal to the individual shared band portion allocated this time.

FIG. 53 is a diagram showing the configuration of the ONU-common parameter management table 244 used in the ATM-PON IF unit 240 shown in FIG. 51. As shown in FIG. 53, the ONU-common-parameter management table 244 includes the same ONU-common parameters as the ONU-common-parameter management table 74 shown in FIG. 5 except the weight of an individual shared band portion allocated this time and the weight of a first past-use band variable computed in the past.

Figure 54:
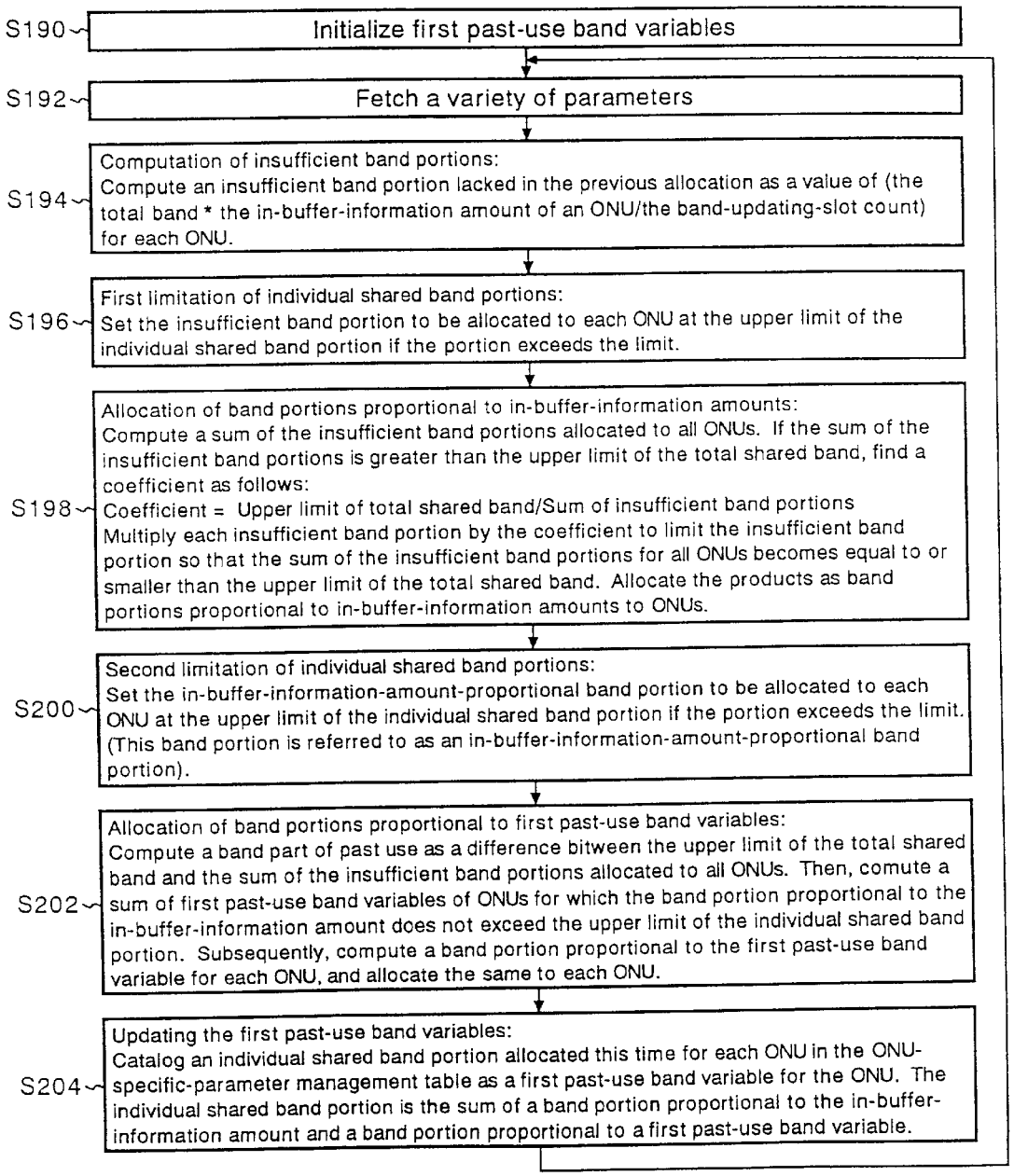
FIG. 54 shows a flowchart representing operations of the shared-band control unit.

FIG. 54 shows a flowchart representing operations of the shared-band control unit 242. Since the operations of the blocks employed in the ATM-PON IF unit 240 shown in FIG. 51 except the shared-band control unit 242 and the ONU-common-parameter management table 244 are virtually the same as their counterparts shown in FIG. 12, only the operation of the shared-band control unit 242 shown in FIG. 52 is explained by referring to the flowchart shown in FIG. 54 as follows.

1: Initialization of the First Past-Use Band Variables

The flowchart shown in FIG. 54 begins with a step S190 at which the initialization unit 100 employed in the shared-band control unit 242 initializes the first past-use band variables and stores the initialized variables in the ONU-specific-parameter management table 131.

2: Allocation of the Shared Band 2-1: For each band-updating period, the band-updating timer 102 informs the parameter-fetching unit 245 that the band-updating period has lapsed.

2-2: At a step S192 of the flowchart shown in FIG. 54, the parameter-fetching unit 245 retrieves a total band of 5,000, a total shared band upper limit of 2,000 and a band-updating slot count of 1,500 from the ONU-common-parameter management table 244 shown in FIG. 53. The parameter-fetching unit 245 also retrieves an ONU number, an upper limit of an individual shared band, an in-buffer-information amount and a first past-use band variable for each of the ONUs 26#ij where j=1 to n from the ONU-specific-parameter management table 131 shown in FIG. 14.

2-3: At a step S194 of the flowchart shown in FIG. 54, the insufficient-band-computing unit 106 computes an insufficient band portion from the total band, the in-buffer-information amount of an ONU 26#ij and the band-updating-slot count in accordance with Eq. (2) for each of the ONUs 26#ij where j=1 to n.

2-4: At a step S196 of the flowchart shown in FIG. 54, the first individual-shared-band-limiting unit 134 sets the insufficient band portion to be allocated to each of the ONUs 26#ij where j=1 to n at the upper limit of the individual shared band portion if the portion exceeds the limit. In the case of the ONU 26#i1, for example, the upper limit of the individual shared band portion is 1,000 as shown in the ONU-specific-parameter management table 131 of FIG. 14. In this case, the first individual-shared-band-limiting unit 134 sets the insufficient band portion to be allocated to the ONU 26#i1 at 1,000.

2-5: At a step S198 of the flowchart shown in FIG. 54, the in-buffer-information-amount-proportional-band-allocating unit 108 carries out the following processing. First of all, the in-buffer-information-amount-proportional-band-allocating unit 108 computes a sum of the insufficient band portions allocated to all of the ONUs 26#ij where j=1 to n. If the sum of the insufficient band portions allocated to all the ONUs 26#ij where j=1 to n is greater than the upper limit of the total shared band, the in-buffer-information-amount-proportional-band-allocating unit 108 finds a coefficient y from a band-correcting function $f(x)=1/x$ given by Eq. (3) where x is a ratio of the sum of the insufficient band portions allocated to all the ONUs 26#ij where j=1 to n to the upper limit of the total shared band. Then, the in-buffer-information-amount-proportional-band-allocating unit 108 multiplies each insufficient band portion by the coefficient y, which is found from the band-correcting function f, to limit the insufficient band portion so that the sum of the insufficient band portions for all the ONUs 26#ij where j=1 to n becomes equal to or smaller than the upper limit of the total shared band. The product of the insufficient band of each of the ONUs 26#ij where j=1 to n and the coefficient y is used as an in-buffer-information-amount-proportional band portion, which is proportional to the in-buffer-information amount, to each of the ONUs 26#ij where j=1 to n.

2-6: At a step S200 of the flowchart shown in FIG. 54, the second individual-shared-band-limiting unit 136 sets the in-buffer-information-amount-proportional band portion to be allocated to each of the ONUs 26#ij where j=1 to n at the upper limit of the individual shared band portion if the portion exceeds the limit. This band portion is referred to as an in-buffer-information-amount-proportional band portion, which is proportional to the in-buffer-information amount, without regard to whether or not the band portion has been limited to the upper limit.

2-7: If the sum of the insufficient band portions allocated to all the ONUs 26#ij where j=1 to n is smaller than the upper limit of the total shared band, the past-use-band-allocating unit 110 carries out the following processing at a step S202 of the flowchart shown in FIG. 54. First of all, the past-use-band-allocating unit 110 computes a band part of past use as a difference between the upper limit of the total shared band and the sum of the band portion proportional to the in-buffer-information amount. Then, the past-use-band-allocating unit 110 computes a sum of first past-use band variables of ONUs 26#ij for which the band portion proportional to the in-buffer-information amount does not exceed the upper limit of the individual shared band portion. Subsequently, the past-use-band-allocating unit 110 computes the value of the expression (the band part of past use X the first past-use band variable of an ONU 26#ij/the sum of first past-use band variables) as a band portion proportional to the first past-use band variable for each of the ONUs 26#ij where j=1 to n. Finally, the past-use-band-allocating unit 110 allocates the band portion proportional to a first past-use band variable to each of the ONUs 26#ij where j=1 to n. At that time, the sum of the band portion proportional to the in-buffer-information amount and the band portion proportional to a first past-use band variable is limited so as not to exceed the upper limit of the individual shared band portion allocated to the ONU 26#ij.

2-8: At a step S204 of the flowchart shown in FIG. 54, the past-use-information-updating unit 112 catalogs an individual shared band portion allocated this time for each of the ONUs 26#ij where j=1 to n in the ONU-specific-parameter management table 131 as a first past-use band variable for the ONU 26#ij. As described earlier, the individual shared band portion is the sum of a band portion proportional to the in-buffer-information amount and a band portion proportional to a first past-use band variable. Also as described earlier, the individual shared band portion, that is, the sum of a band portion proportional to the in-buffer-information amount and a band portion proportional to a first past-use band variable, which are allocated to each of the ONUs 26#ij where j=1 to n, is reported to the shared-band-polling-information-generating unit 78.

As described above, in addition to the effects provided by the second embodiment, the ninth embodiment also exhibits the following effects. First of all, since the algorithm is simplified, the processing speed is increased. In addition, since the number of variable parameters is reduced, the operation to initialize them is easier.

In the embodiments described above, a shared band left after allocation of insufficient band portions is allocated as band portions each proportional to a weighted average of shared band portions allocated in the past. Thus, an allocated shared band portion will not change all of a sudden. In addition, since an allocated band portion never exceeds an upper limit, fair allocation of band portions among ONUs can be assured. Moreover, since band portions are allocated with a guaranteed minimum band portion taken into consideration, the present invention can be applied to a service requiring that a minimum band portion be guaranteed.

It should be noted that the present invention is not limited to the details of the preferred embodiments described above. That is to say, the scope of the present invention is defined by the appended claims, and all changes and modifications falling within the scope of the claims are therefore to be embraced by the invention.

What is claimed is:

1. A subscriber-line-terminating apparatus for terminating lines of a plurality of terminal apparatuses and dynamically allocating band portions to said terminal apparatuses by dynamic allocation of time slots to be used by said terminal apparatuses for information-transmission use to said terminal apparatuses and transmission of polling information indicating allocation of time slots to said terminal apparatuses to said terminal apparatuses, said subscriber-line-terminating apparatus comprising:

an in-buffer-information-amount-receiving unit for receiving an in-buffer-information amount indicating an amount of information, which is stored in a predetermined buffer employed in each of said terminal apparatuses and remains to be transmitted, from each of said terminal apparatuses;

an insufficient-band-computing unit for computing an insufficient band portion required by each of said terminal apparatuses for transmitting information stored in said buffer on the basis of said in-buffer-information amount received from each of said terminal apparatuses;

an apparatus-specific-parameter management table for storing said in-buffer-information amount and a first past-use band variable indicating a band portion dynamically allocated in the past to one of said terminal apparatuses for each of said terminal apparatuses;

an in-buffer-information-amount-proportional-band-allocating unit for allocating a band portion corresponding to said in-buffer-information amount to each of said terminal apparatuses on the basis of said insufficient band portion for said terminal apparatus and a total-shared-band upper limit indicating an upper limit of a sum of band portions dynamically allocated to all said terminal apparatuses;

a past-use-band-allocating unit, which is used for apportioning a past-use band part into past-use band portions each to be allocated to one of said terminal apparatuses on the basis of said first past-use band variable of said terminal apparatus in case a sum of said band portions proportional to said in-buffer-information amounts of all said terminal apparatuses is smaller than said total-shared-band upper limit where said past-use band part is a difference between said sum of said band portions proportional to said in-buffer-information amounts of all said terminal apparatuses and said total-shared-band upper limit;

a first past-use-band-variable-updating unit for updating said first past-use band variable for each of said terminal apparatuses on the basis of a band portion, which is dynamically allocated to said terminal apparatus and includes said band portion proportional to said in-buffer-information amount as well as said past-use band portion, and storing said updated first past-use band variable for each of said terminal apparatuses into said apparatus-specific-parameter management table;

a shared-band-polling-information-generating unit for generating polling information showing allocation of time slots to said terminal apparatuses on the basis of band portions, which are dynamically allocated to said terminal apparatuses and each include said band portion proportional to said in-buffer-information amount as well as said past-use band portion; and a polling-information-transmitting unit for transmitting said polling information to said terminal apparatuses.

2. A subscriber-line-terminating apparatus for terminating lines of a plurality of terminal apparatuses and dynamically allocating band portions to said terminal apparatuses in accordance with claim 1 wherein said in-buffer-information-amount-proportional-band-allocating unit allocates a band portion corresponding to said in-buffer information amount proportionally to said insufficient band portion to each of said terminal apparatuses.

3. A subscriber-line-terminating apparatus for terminating lines of a plurality of terminal apparatuses and dynamically allocating band portions to said terminal apparatuses in accordance with claim 1 wherein said in-buffer-information-amount-proportional-band-allocating unit allocates a band portion corresponding to said in-buffer information amount to each of said terminal apparatuses by correcting each of said insufficient band portions so that a sum of said insufficient band portions for all said terminal apparatuses becomes equal to or smaller than said total-shared-band upper limit in case said sum of said insufficient band portions for all said terminal apparatuses is greater than said total-shared-band upper limit.

4. A subscriber-line-terminating apparatus for terminating lines of a plurality of terminal apparatuses and dynamically allocating band portions to said terminal apparatuses in accordance with claim 1 wherein said insufficient band portion to be allocated to any of said terminal apparatuses is found by dividing a product of said in-buffer-information amount of said terminal apparatus and a total band allocatable to said terminal apparatuses by the number of band-updating units per band-updating period for allocating said total band to said terminal apparatuses, where:

said insufficient band portion is expressed in terms of second predetermined units;

said in-buffer-information amount is expressed in terms of first predetermined units;

said total band is expressed in terms of said second predetermined units; and said band-updating unit is equal to said first predetermined unit.

5. A subscriber-line-terminating apparatus for terminating lines of a plurality of terminal apparatuses and dynamically allocating band portions to said terminal apparatuses in accordance with claim 1 wherein:

said past-use-band-allocating unit allocates said past-use band portions from said past-use band part, to said terminal apparatuses proportionally to said first past-use band variables stored in said apparatus-specific-parameter management table; and said first past-use-band-variable-updating unit updates said first past-use band variable of each of said terminal apparatuses with a weighted average of a band portion dynamically allocated to said terminal apparatus at the present time and said first past-use band variable of said terminal apparatus, with said weighted average obtained as a result of computing a sum of a product obtained as a result of multiplication of said dynamically allocated band portion by a first weight and a product obtained as a result of multiplication of said first past-use band variable by a second weight and includes said band portion corresponding to said in-buffer-information amount and said past-use band portion.

6. A subscriber-line-terminating apparatus for terminating lines of a plurality of terminal apparatuses and dynamically allocating band portions to said terminal apparatuses in accordance with claim 1 wherein said first past-use-band-variable-updating unit updates said first past-use band variable of each of said terminal apparatuses with a band portion, which is dynamically allocated to said terminal apparatus at the present time and includes said band portion corresponding to said in-buffer-information amount and said past-use band portion.

7. A subscriber-line-terminating apparatus for terminating lines of a plurality of terminal apparatuses and dynamically allocating band portions to said terminal apparatuses in accordance with claim 1 wherein, in case a sum of said insufficient band portions for all said terminal apparatuses is greater than said total-shared-band upper limit, said in-buffer-information-amount-proportional-band-allocating unit:

computes a coefficient as a quotient obtained by division of said total-shared-band upper limit by said sum of said insufficient band portions for all said terminal apparatuses;

multiplies each of said insufficient band portions for all said terminal apparatuses by said coefficient; and allocates products of said insufficient band portions for all said terminal apparatuses and said coefficient as band portions corresponding to said in-buffer-information amounts of said terminal apparatuses to said respective terminal apparatuses.

8. A subscriber-line-terminating apparatus for terminating lines of a plurality of terminal apparatuses and dynamically allocating band portions to said terminal apparatuses in accordance with claim 4, said subscriber-line-terminating apparatus further comprising an apparatus-common-parameter management table for storing said total band, the number of band-updating units and said total-shared-band upper limit.

9. A subscriber-line-terminating apparatus for terminating lines of a plurality of terminal apparatuses and dynamically allocating band portions to said terminal apparatuses in accordance with claim 1 wherein:

said apparatus-specific-parameter management table includes an individual-shared-band upper limit for each of said terminal apparatuses; and there is further provided an individual-shared-band-limiting unit for limiting a band portion to be allocated dynamically to each of said terminal apparatuses so that said allocated band portion does not exceed said individual-shared-band upper limit of said terminal apparatus.

10. A subscriber-line-terminating apparatus for terminating lines of a plurality of terminal apparatuses and dynamically allocating band portions to said terminal apparatuses in accordance with claim 1, said subscriber-line-terminating apparatus further comprising a threshold processing unit, which is used for raising an insufficient band portion computed by said insufficient-band-computing unit for any of said terminal apparatuses to a second threshold value of said terminal apparatus if said insufficient band portion is found greater than a first threshold value of said terminal apparatus and smaller than said second threshold value.

11. A subscriber-line-terminating apparatus for terminating lines of a plurality of terminal apparatuses and dynamically allocating band portions to said terminal apparatuses in accordance with claim 10 wherein said apparatus-specific-parameter management table includes said first and second threshold values for each of said terminal apparatuses.

12. A subscriber-line-terminating apparatus for terminating lines of a plurality of terminal apparatuses and dynamically allocating band portions to said terminal apparatuses in accordance with claim 1 wherein said in-buffer-information-amount-proportional-band-allocating unit increases insufficient band portions to be allocated to said terminal apparatuses by multiplying each of said insufficient band portions by a coefficient greater than 1 in case a sum of said insufficient band portions is smaller than said total-shared-band upper limit.

13. A subscriber-line-terminating apparatus for terminating lines of a plurality of terminal apparatuses and dynamically allocating band portions to said terminal apparatuses in accordance with claim 12 wherein said coefficient is the larger one of the value of an expression [said total-shared-band upper limit/(said sum of said insufficient band portions+said total-shared-band upper limit/CMAX)] and 1 where notation CMAX is a real number greater than 1.

14. A subscriber-line-terminating apparatus for terminating lines of a plurality of terminal apparatuses and dynamically allocating band portions to said terminal apparatuses in accordance with claim 1 wherein said in-buffer-information-amount-proportional-band-allocating unit:

computes a quotient obtained as a result of division of said total-shared-band upper limit by said sum of said insufficient band portions for all said terminal apparatuses;

multiplies each of said insufficient band portions for all said terminal apparatuses by a first coefficient smaller than said quotient; and allocates products of said insufficient band portions for all said terminal apparatuses and said first coefficient as band portions corresponding to said in-buffer-information amounts of said terminal apparatuses to said respective terminal apparatuses.

15. A subscriber-line-terminating apparatus for terminating lines of a plurality of terminal apparatuses and dynamically allocating band portions to said terminal apparatuses in accordance with claim 14 wherein said first coefficient is equal to the value of an expression (said total-shared-band upper limit/(said sum of said insufficient band portions/MAX_RATIO+said total-shared-band upper limit/CMAX)) where notation CMAX is a real number greater than 1 and notation MAX_RATIO is a real number greater than 0 but smaller than 1.

16. A subscriber-line-terminating apparatus for terminating lines of a plurality of terminal apparatuses and dynamically allocating band portions to said terminal apparatuses in accordance with claim 1 wherein:

said apparatus-specific-parameter management table includes a guaranteed minimum band portion for each of said terminal apparatuses;

there is further provided a minimum-band-guaranteeing unit which is used for computing a guaranteed minimum band part to be allocated to said terminal apparatuses as a product of said total-shared-band upper limit and a first coefficient smaller than 1 and apportioning said guaranteed minimum band part into individual guaranteed minimum band portions each to be allocated to one of said respective terminal apparatuses on the basis of said guaranteed minimum band portion cataloged in said apparatus-specific-parameter management table for said terminal apparatus in case a sum of said insufficient band portions for all said terminal apparatuses is greater than said total-shared-band upper limit;

in case a sum of said insufficient band portions for all said terminal apparatuses is greater than said total-shared-band upper limit, said in-buffer-information-amount-proportional-band-allocating unit multiplies each of said insufficient band portions for all said terminal apparatuses by a second coefficient smaller than the value of an expression [(said total-shared-band upper limit/said sum of said insufficient band portions for all said terminal apparatuses)×(1−said first coefficient)], and allocates products of said insufficient band portions for all said terminal apparatuses and said second coefficient as band portions corresponding to said in-buffer-information amounts of said terminal apparatuses to said respective terminal apparatuses; and in case a sum of said guaranteed minimum band portions allocated to said terminal apparatuses and said band portions corresponding to said in-buffer-information amounts for said terminal apparatuses is smaller than said total-shared-band upper limit, said past-use-band-allocating unit apportions a past-use band part into past-use band portions each to be allocated to one of said terminal apparatuses on the basis of said first past-use band variable of said terminal apparatus where said past-use band part is a difference between said total-shared-band upper limit and said sum of said guaranteed minimum band portions allocated to said terminal apparatuses and said band portions corresponding to said in-buffer-information amounts for said terminal apparatuses.

17. A subscriber-line-terminating apparatus for terminating lines of a plurality of terminal apparatuses and dynamically allocating band portions to said terminal apparatuses in accordance with claim 16 wherein said second coefficient is equal to a product of a factor (1−said first coefficient) and a factor (said total-shared-band upper limit/(said sum of said insufficient band portions/MAX_RATIO+said total-shared-band upper limit/CMAX)) where notation CMAX is a real number greater than 1 and notation MAX_RATIO is a real number greater than 0 but smaller than 1.

18. A subscriber-line-terminating apparatus for terminating lines of a plurality of terminal apparatuses and dynamically allocating band portions to said terminal apparatuses in accordance with claim 16 wherein said first coefficient is equal to the value of an expression (1−said total-shared-band upper limit/said sum of said insufficient band portions).

19. A subscriber-line-terminating apparatus for terminating lines of a plurality of terminal apparatuses and dynamically allocating band portions to said terminal apparatuses in accordance with claim 16 wherein:

said apparatus-specific-parameter management table includes second past-use band variables each relevant to a band portion dynamically allocated in the past to one of said terminal apparatuses;

there is further provided a guaranteed-minimum-band-correcting unit, which is used for correcting said guaranteed minimum band portion for each of said terminal apparatuses into a corrected band portion for said terminal apparatus by decreasing said guaranteed minimum band portion if said guaranteed minimum band portion is smaller than said second past-use band variable of said terminal apparatus or increasing said guaranteed minimum band portion if said guaranteed minimum band portion is greater than said second past-use band variable of said terminal apparatus;

there is further provided a second past-use band variable-updating unit for updating said second past-use band variable of each of said terminal apparatuses on the basis of said second past-use band variable stored in said apparatus-specific-parameter management table for said terminal apparatus and a band portion dynamically allocated at the present time to said terminal apparatus; and said minimum-band-guaranteeing unit allocates said guaranteed minimum band parts based on said corrected guaranteed minimum band portions produced by said guaranteed-minimum-band-correcting unit to said respective terminal apparatuses.

20. A subscriber-line-terminating apparatus for terminating lines of a plurality of terminal apparatuses and dynamically allocating band portions to said terminal apparatuses in accordance with claim 19 wherein:

said first past-use band variable of any of said terminal apparatuses is a weighted average of a band portion dynamically allocated to said terminal apparatus at the present time and said first past-use band variable of said terminal apparatus, with said weighted average obtained as a result of computing a sum of a product obtained as a result of multiplication of said dynamically allocated band portion by a first weight and a product obtained as a result of multiplication of said first past-use band variable by a second weight;

said second past-use band variable of any of said terminal apparatuses is a weighted average of a band portion dynamically allocated to said terminal apparatus at the present time and said second past-use band variable of said terminal apparatus, with said weighted average obtained as a result of computing a sum of a product obtained as a result of multiplication of said dynamically allocated band portion by a third weight and a product obtained as a result of multiplication of said second past-use band variable by a fourth weight; and a ratio of said second weight to said first weight is smaller than a ratio of said fourth weight to said third weight.

21. A subscriber-line-terminating apparatus for terminating lines of a plurality of terminal apparatuses and dynamically allocating band portions to said terminal apparatuses in accordance with claim 19 wherein:

said apparatus-specific-parameter management table includes an allowable rate (%) of change in guaranteed minimum band portion for each of said terminal apparatuses;

said guaranteed-minimum-band-correcting unit computes a corrected band portion as the value of an expression (said guaranteed minimum band portion−(said second past-use band variable−said guaranteed minimum band portion)); and said guaranteed-minimum-band-correcting unit sets said corrected band portion at a value equal to the value of an expression (said guaranteed minimum band portion×(100+said allowable rate of change in guaranteed minimum band portion)) if said corrected band portion is greater than the value of said expression (said guaranteed minimum band portion×(100+said allowable rate of change in guaranteed minimum band portion)); or said guaranteed-minimum-band-correcting unit sets said corrected band portion at a value equal to the value of an expression (said guaranteed minimum band portion×(100−said allowable rate of change in guaranteed minimum band portion)) if said corrected band portion is smaller than the value of said expression (said guaranteed minimum band portion×(100−said allowable rate of change in guaranteed minimum band portion)).

22. A subscriber-line-terminating apparatus for terminating lines of a plurality of terminal apparatuses and dynamically allocating band portions to said terminal apparatuses in accordance with claim 21 wherein said minimum-band-guaranteeing unit computes said individual guaranteed minimum band part to be allocated to each of said terminal apparatuses as a value according to the smaller one of said insufficient band portion allocated to said terminal apparatus and said corrected band portion corrected by said guaranteed-minimum-band-correcting unit for said terminal apparatus.

23. A subscriber-line-terminating apparatus for terminating lines of a plurality of terminal apparatuses and dynamically allocating band portions to said terminal apparatuses in accordance with claim 9 wherein said first past-use-band-variable-updating unit updates said first past-use band variable of each of said terminal apparatuses with a weighted average of a band portion dynamically allocated to said terminal apparatus at the present time, said first past-use band variable of said terminal apparatus and said individual-shared-band upper limit of said terminal apparatus, with said weighted average obtained as a result of computing a sum of a product obtained as a result of multiplication of said dynamically allocated band portion by a first weight, a product obtained as a result of multiplication of said first past-use band variable by a second weight and a product obtained as a result of multiplication of said individual-shared-band upper limit by a third weight.

* * * * *